US 6,651,136 B2

(12) United States Patent
Percival

(10) Patent No.: US 6,651,136 B2
(45) Date of Patent: Nov. 18, 2003

(54) METHOD AND SYSTEM FOR COHERENTLY CACHING I/O DEVICES ACROSS A NETWORK

(75) Inventor: James I Percival, Ilminster (GB)

(73) Assignee: SuperSpeed Software, Inc., Sudbury, MA (US)

(*) Notice: Subject to any disclaimer, the term of this patent is extended or adjusted under 35 U.S.C. 154(b) by 135 days.

(21) Appl. No.: 10/052,873

(22) Filed: Jan. 16, 2002

(65) Prior Publication Data

US 2002/0069323 A1 Jun. 6, 2002

Related U.S. Application Data

(63) Continuation of application No. 09/300,633, filed on Apr. 27, 1999, which is a continuation of application No. 08/657,777, filed on May 31, 1996, now Pat. No. 5,918,244, which is a continuation of application No. 08/238,815, filed on May 6, 1994, now Pat. No. 5,577,226.

(51) Int. Cl.[7] .............................................. G06F 12/00
(52) U.S. Cl. .................... 711/113; 711/138; 709/213; 709/214; 709/215; 709/216; 709/218; 709/224; 710/52; 710/55; 710/56
(58) Field of Search ................................ 711/113, 138; 709/213, 216, 218, 224, 214, 215; 710/52, 55, 56

(56) References Cited

U.S. PATENT DOCUMENTS

| 3,820,078 A | 6/1974 | Curley et al. ................ 711/118 |
| 4,755,930 A | 7/1988 | Wilson, Jr. et al. .......... 711/122 |
| 4,775,955 A | 10/1988 | Liu ............................... 711/145 |
| 4,849,879 A | 7/1989 | Chinnaswamy et al. ...... 706/45 |
| 5,025,366 A | 6/1991 | Baror .......................... 711/128 |
| 5,060,144 A | 10/1991 | Sipple et al. ................ 710/200 |
| 5,062,055 A | 10/1991 | Chinnaswamy et al. .... 362/466 |

(List continued on next page.)

FOREIGN PATENT DOCUMENTS

JP 64-36351 5/1989

OTHER PUBLICATIONS

"The Stanford Dash Multiprocessor", Lenoski et al., Computer, IEEE Computer Society, Mar. 1992, pp. 63–79.
"Cache–Coherency Protocols Keep Data Consistent", Gallant, J., Electronic Technology for Engineers and Engineering Managers, Mar. 14, 1991.
"Disk Cache Replacement Policies for Network Fileservers", Willick, D.L., Distributed Computing Systems, 1993 Int'l. Conf., pp.2–11.
"xFS; A Wide Area Mass Storage File System", Wang, Randolph Y. et al., Workstation Operating Systems, 1993, pp. 71–178.

(List continued on next page.)

Primary Examiner—Mano Padmanabhan
Assistant Examiner—Mehdi Namazi
(74) Attorney, Agent, or Firm—Bromberg & Sunstein LLP

(57) ABSTRACT

The cache keeps regularly accessed disk I/O data within RAM that forms part of a computer systems main memory. The cache operates across a network of computers systems, maintaining cache coherency for the disk I/O devices that are shared by the multiple computer systems within that network. Read access for disk I/O data that is contained within the RAM is returned much faster than would occur if the disk I/O device was accessed directly. The data is held in one of three areas of the RAM for the cache, dependent on the size of the I/O access. The total RAM containing the three areas for the cache does not occupy a fixed amount of a computers main memory. The RAM for the cache grows to contain more disk I/O data on demand and shrinks when more of the main memory is required by the computer system for other uses. The user of the cache is allowed to specify which size of I/O access is allocated to the three areas for the RAM, along with a limit for the total amount of main memory that will be used by the cache at any one time.

4 Claims, 48 Drawing Sheets

U.S. PATENT DOCUMENTS

| | | | |
|---|---|---|---|
| 5,067,071 A | 11/1991 | Schanin et al. | 710/113 |
| 5,091,846 A | 2/1992 | Sachs et al. | 711/130 |
| 5,136,691 A | 8/1992 | Baror | 711/139 |
| 5,185,878 A | 2/1993 | Baror et al. | 711/123 |
| 5,241,641 A | 8/1993 | Iwasa et al. | 711/122 |
| 5,265,235 A | 11/1993 | Sindhu et al. | 711/120 |
| 5,282,272 A | 1/1994 | Guy et al. | 710/116 |
| 5,301,290 A | 4/1994 | Tetzlaff et al. | 711/142 |
| 5,307,506 A | 4/1994 | Colwell et al. | 710/307 |
| 5,323,403 A | 6/1994 | Elliott | 714/757 |
| 5,335,327 A | 8/1994 | Hisano et al. | 711/131 |
| 5,347,648 A | 9/1994 | Stamm et al. | 714/15 |
| 5,353,430 A | 10/1994 | Lautzenheiser | 711/117 |
| 5,363,490 A | 11/1994 | Alferness et al. | 711/234 |
| 5,390,318 A | 2/1995 | Ramakrishnan et al. | 711/158 |
| 5,408,653 A | 4/1995 | Josten et al. | 707/8 |
| 5,426,747 A | 6/1995 | Weinreb et al. | 711/203 |
| 5,452,447 A | 9/1995 | Nelson et al. | 707/205 |
| 5,566,315 A | 10/1996 | Milillo et al. | 711/113 |
| 5,577,226 A * | 11/1996 | Percival | 711/119 |
| 5,606,681 A | 2/1997 | Smith et al. | 711/203 |
| 5,831,987 A * | 11/1998 | Spilo | 714/719 |
| 5,838,994 A * | 11/1998 | Valizadeh | 710/56 |
| 5,918,244 A * | 6/1999 | Percival | 711/119 |
| 5,974,518 A * | 10/1999 | Nogradi | 711/173 |
| 6,279,083 B1 * | 8/2001 | MacDonald | 711/138 |

OTHER PUBLICATIONS

"Linked List Cache Coherence for Scalable Shared Memory Multiprocessors", Thapar, Manu et al., Parallel Processing, 1993 Symposium, pp. 34–43.

"The S3.Manufacturing Procedure Scalable Shared Memory Multiprocessor", Nowatzyk, Andreas et al., System Sciences, 1994 Ann. Hawaii Int'l. Conf., vol. I, Jan. 4, 1994, pp. 144–153.

Turbocachet/Turbodisktm Software Product Description, EEC Systems, Incorporated, Revised Feb. 24, 1992.

Turbocachetm/Turbodisktm Quick Start Guide, EEC Systems Incorporated, Feb. 24, 1992.

Turbocachetm Software Product Description, EEC Systems, Incorporated, Revised:Feb. 24, 1992.

Turbocachetm/Turbodiskt', Cover Letter and Release Notes (*read me first*), EEC Systems, Incorporated, Feb. 24, 1992.

Turbocachetm/Turbodisk Software Installation and User's Guide, EEC Systems Incorporated, Feb. 24, 1992.

"SuperCacheTNI—Open VMS I/O Performance Accelerator", Software Product Description SuperCacherM, 1992, 1993 Turbo Systems International s.a.

"SuperCacheTM V.1.2 User and Installation Guide, a TurboWareTIwl Product", V1.2–08.

"VMS File System Internals" Kirby McCoy, Digital Press, Digital Equipment Corporation, 1990.

"The VAX/VMS Distributed Lock Manager", Snaman, Jr., William E et al., Digital.Technical Journal, No. 5, Sep. 1987.

"The Design and Implementation of a Distributed File System", Goldstein, Digital Technical Journal, No. 5, Sep. 1987.

"File System Operation in a VAXcluster Environment", Chapter 8, VMS File SystemInternals, McCoy, Digital Press, 1990.

Howard, John, "An Overview of the Andrew File System", USENIX Winter Conference, Feb. 9–12, 1988, Dallas, Texas.

Tanenbaum, Andrew S., "Operating Systems: Design and Implementation", Prentice–Hall, Inc., 1987.

Gray, Cary G. et al., "Leases: An Efficient Fault–Tolerant Mechanism for Distributed File Cache Consistency", 1989 ACM 089791–338–3/89/0012/0202.

Macklem, Rick, "Lessons Learned Tuning the 4.3BSD Reno Implementation of the NFS Protocol", USENIX, Winter'91, Dallas, Texas.

Kazar, Michael L., "Synchronization and Caching Issues in the Andrew File System", USENIX Winter Conference, Feb. 9–12, 1988, Dallas, Texas.

Sinniah, Raymond R., "An Introduction to the Andrew File System" http://homepages.uel.ac.uk/5291 n/afs/afsdoc.html.

Duncan, Ray, "Design Goals and Implementation of the New High Performance File System", Microsoft Systems Journal, Sep. 1989, vol. 4, No. 5.

Bell, Les, "OS/2 High Performance File System", http://www.lesbell.com.ati/hpfstest.html.

Kumar, Puneet et al., "Log–Based Directory Resolution in the Coda File System", 1993 IEEE 0–8186–3330–1/93.

Mogul, Jeffrey C., "A Recovery Protocol for Spritely NFS", USENIX Association File Systems Workshop, May 21–22, 1992, Ann Arbor, Michigan.

Seltzer, Margo et al., "An Implementation of a Log–Structured File System for UNIX", 1993 Winter USENIX, Jan. 25–29, 1993, San Diego, California.

McKusick, Marshall et al., "The Network Filesystem", Chapter 9 of "The Design and Implementation of the 4ABSD Operating System", 1996.

PC Tech, "Understanding the OS/2 Config–Sys File", PC Magazine.

Jang, Saqib, "NFS and DFS A Functional Comparison", Auspex Technical Report 15, Apr. 1997.

Transarc Corporation, "The AFS File System in Distributed Computing Environments", May 1, 1996.

Mena, Agustin et al., "Performance Characteristics of the DCE Distributed File Service", IBM Distributed Computing Environment White Paper.

"Global File Sharing", Sun Microsystems, Inc., 1996.

"NFS Performance", Sun Microsystems, Inc., 1996.

"OS/2's History and Purpose", http://sunsite.nus.sg/pub/os2/phamiacy/Should–Mstory–and Purpose.html.

"1.05a Cache Manager", AFS distributed tilesystem FAQ, http://www.cis.ohio state.edu/hypertext/faw/usenet/afs–faq/faw–doc–14.html.

"1.2.7 Distributed File System", IBM Book Manager Book Server, 1989, IBM Corporation, 1996.

"5.3.3 HPFS386 Architecture", IBM Book Manager Book Server, 1989, IBM Corporation; 1996.

"HPFS and Fat File Systems Description", http://www.022bbs.com/file–c/tips/DIHPFT.FAX.

Bowen, Ted S. "EEC ups ante in VMS disk caching arena with three–tiered package for VAXClusters." Digital Review, Cahners Publishing Co., Mar. 16, 1992 v9 n6 p6(1).

"I/O Express User's Guide", Executive Software International, Glendale, CA.; Jun. 1990.

"I/O Express Technical Reports", Executive Software International, Glendale, CA.; Feb. 1992–Jan. 1993.

"Field Test Guide for I/O Express Dynamic Data Caching for VAX/VMS", Executive Software, Glendale, CA.'Sep. 1989.

"Diskeeper User's Guide V2.1—Errata", Executive Software, Glendale, CA.; Apr. 1989.

"Executive Software's Newkeeper", Executive Software, Glendale, CA.; vol. 4 Issue 4, 1991.

"SuperCache—Open VMS I/O Performance Accelerator", TurboSystems International s.a., distributed by EEC Systems, Inc., Sudbury, MA. 1993.

"Executive Software's Newskeeper", Executive Software, Glendale, CA., vol. 3, Issue 8, May/Jun. 1990.

"Executive Software's Newskeeper", Executive Software, Glendale, CA., vol. 3, Issue 9, Jul./Aug. 1990.

"Executive Software's Newskeeper", Executive Software, Glendale, CA., vol. 4, Issue 1, 1991.

"Executive Software's Newskeeper", Executive Software, Glendale, CA., vol. 4, Issue 3, 1991.

* cited by examiner

CACHE DRIVER CODE:

METHOD AND SYSTEM FOR COHERENTLY CACHING I/O DEVICES ACROSS A NETWORK

This is a continuation of co-pending U.S. Ser. No. 09/300,633, filed Apr. 27, 1999 which is a continuation of U.S. Ser. No. 08/657,777, filed May 31, 1996, now U.S. Pat. No. 5,918,244, which is a continuation of U.S. Ser. No. 08/238,815, filed May 6, 1994, now U.S. Pat. No. 5,577,226.

BACKGROUND OF THE INVENTION

The present invention is directed to a disk caching technique using software, in particular, disk caching software for use on an OpenVMS operating system. OpenVMS is the operating system used on VAX and Alpha AXP computers.

Computer users are always looking for ways to speed up operations on their computers. One source of the drag on computer speed is the time it takes to conduct an input/output operation to the hard disk drive or other mechanical disk devices. Such devices are slowed by mechanical movement latencies and I/O bus traffic requirements. One conventional method for avoiding this speed delay is to cache frequently accessed disk data in the computer main memory. Access to this cached data in main memory is much quicker than always accessing the hard disk drive for the data. Access speed to a hard disk drive is replaced by main memory access speed to the data resident in the cache.

There is a significant down side to the conventional form of caching techniques. Caches are conventionally organised as to be made up of fixed sized areas, known as buckets, where the disk data is stored, with all the buckets added together making up the fixed total size of the computer main memory allocated for use by the cache. No matter what size the original disk access was this data has to be accommodated in the cache buckets. Thus, if the disk access size was very small compared to the cache bucket size, then most of the bucket storage area is wasted, containing no valid disk data at all. If the disk was accessed by many of these smaller accesses, then the cache buckets would get used up by these small data sizes and the cache would not apparently be able to hold as much data as was originally expected. If the disk access size was larger than the cache bucket size, either the data is not accommodated in the cache, or several cache buckets have to be used to accommodate the disk data which makes cache management very complicated. With this conventional approach to disk caching the computer user has to try to compromise with the single cache bucket size for all users on the computer system. If the computer is used for several different applications, then either the cache bucket size has to be biased to one type of application being at a disadvantage to all the other applications, or the cache bucket size has to averaged against all applications with the cache being at less an advantage as would be desired. It is an object of the present invention to reduce this down side of using a disk cache.

SUMMARY OF THE INVENTION

In accordance with the embodiment of the invention, the total cache is organised into three separate caches each having a different cache bucket size associated with it for small, medium, and large, disk access sizes. The computer user has control over the bucket sizes for each of the three cache areas.

In accordance with the embodiment of the invention, the computer user has control over which disks on the computer system will be included in the caching and which disks on the computer system are to be excluded from the caching.

In accordance with the embodiment of the invention, the total cache size contained in the computer main memory, being made up of the three cache areas, does not have a singular fixed size and will change dependent on the computer systems use. The total cache size is allowed to grow in response to high disk access demand, and to reduce when the available computer main memory becomes at a premium to the computer users. Thus the computer main memory used by the cache fluctuates dependent on disk data access and requirements of the computer main memory. The computer user has control over the upper and lower limits of which the total cache size occupies the computers main memory. The total cache will then be made up of mainly the small, or the medium, or the large bucket areas, or a spread of the three cache area sizes dependent on how the cached disks are accessed on the system.

In accordance with the embodiment of the invention, once the total cache size has grown to its upper limit further new demands on cache data are handled by cache bucket replacement, which operates on a least recently used algorithm. This cache bucket replacement will also occur if the total cache size is inhibited from growing owing to a high demand on computer main memory by other applications and users of the computer system.

In accordance with the embodiment of the invention, when a disk which is being cached is subject to a new read data access by some computer user, the required disk data is sent to the computer user and also copied into an available cache bucket dependent on size fit. This cache bucket is either newly obtained from the computer main memory or by replacing an already resident cache bucket using a least recently used algorithm. If this disk data, now resident in the cache, is again requested by a read access of some computer user, the data is returned to the requesting user directly from the cache bucket and does not involve any hard disk access at all. The data is returned at the faster computer main memory access speed, showing the speed advantage of using a disk cache mechanism.

In accordance with the embodiment of the invention, when a disk which is being cached is subject to a new read data access by some computer user and this disk access is larger than all three cache bucket sizes, the disk data is not copied to the cache. This oversize read access, along with other cache statistics are recorded allowing the computer user to interrogate the use of the cache. Using these statistics the computer user can adjust the size of the three cache buckets to best suit the disk use on the computer system.

In accordance with the embodiment of the invention, when a write access is performed to a disk which is being cached and the disk data area being written was previously read into the cache, i.e. an update operation on the disk data, the current cache buckets for the previous read disk data area are invalidated on all computers on the network.

Other objects and advantages of the invention will become apparent during the following description of the presently preferred embodiments of the invention taken in conjunction with the drawing.

DETAILED DESCRIPTION OF THE PREFERRED EMBODIMENTS

Figure 1A:
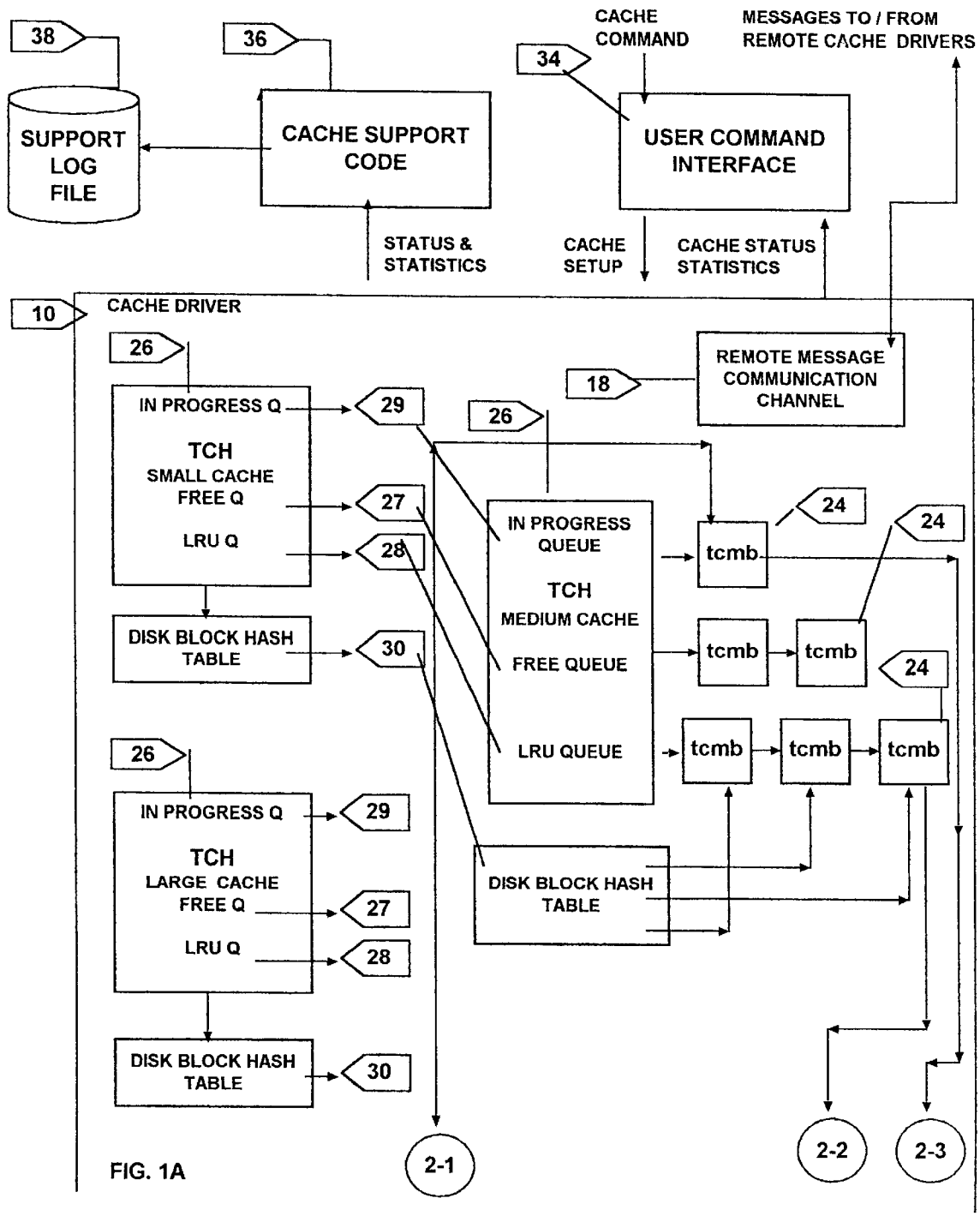
FIGS. 1A to 1B is a schematic block diagram of the disk cache software of the invention implemented on a computer running an OpenVMS operating system.
Figure 1B:
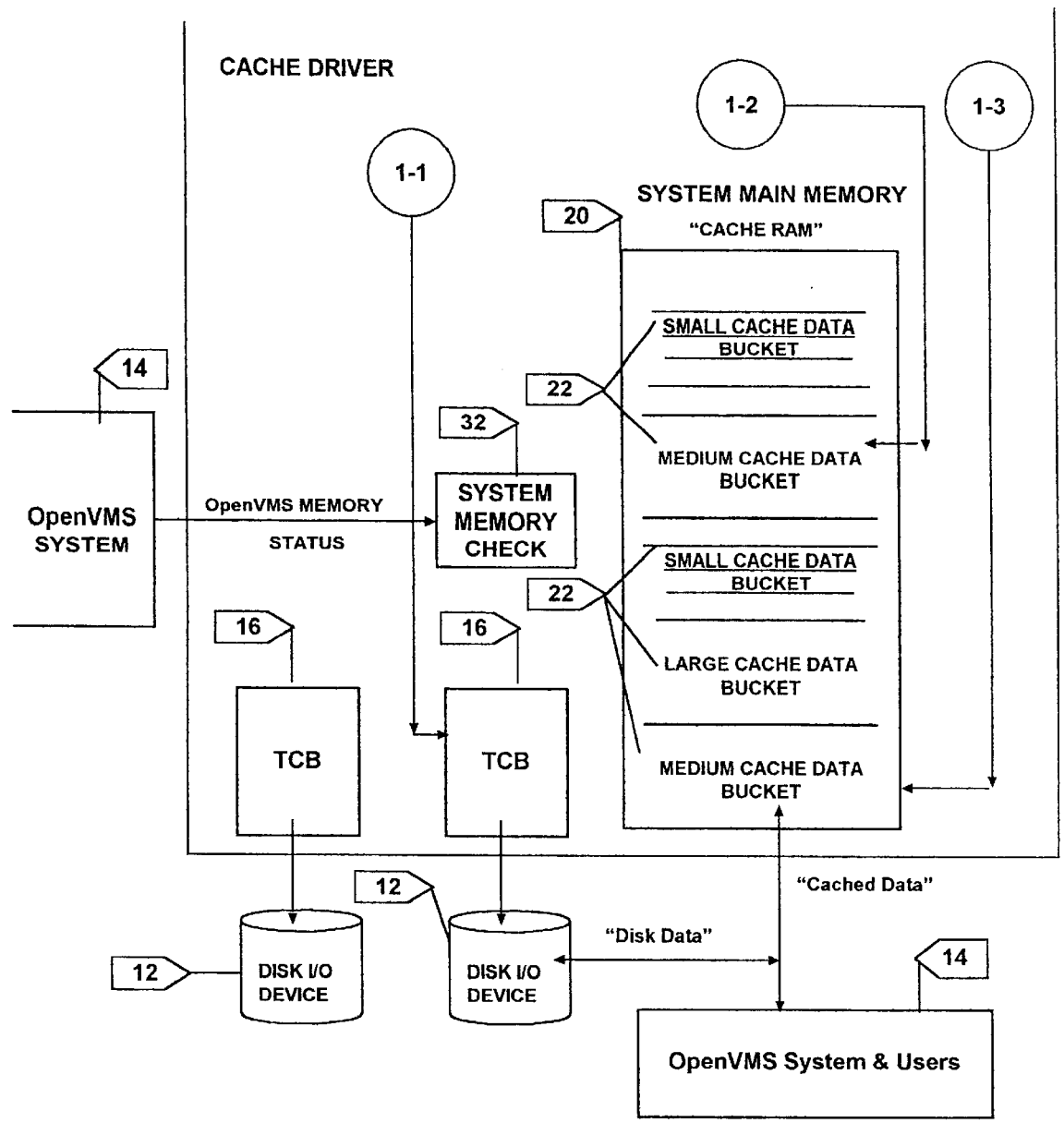

Referring now to the drawings, a disk cache (10) of the present invention is schematically shown in FIGS. 1A to 1B. All data accesses by the operating system of the associated computer to any of the disks (12) on the system are intercepted by the cache driver (10). The operating system may be any commonly available system, however, the presently preferred embodiment of the invention is implemented in conjunction with an OpenVMS system (14). When the cache driver (10) is first loaded on the operating system all the disks (12) present on the computer system are located and a disk control structure, referred to herein as a TCB ("the control block") (16), is built for each separate disk (12). The disks (12) can be locally connected to the computer containing this cache driver (10), or the disks (12) can be remotely connected to some other computer that this computer has a remote connection to. The presently preferred embodiment of the invention uses remote disks that are connected by the OpenVMS VMScluster and VAXcluster software. The VMS cluster software is operable on 64-bit or 32-bit architecture computer systems. The VAXcluster software only permits 32-bit computers. A TCB (16) disk control structure contains the cache status information for the disk (12), cache monitor statistics for the disk (12), and a list of remote computers containing their own copy of the cache driver (10) that can access the disk (12).

The cache driver (10) maintains remote message communication channels (18) with other cache drivers loaded on other computers that can access a common set of disks (12). Whenever the OpenVMS system (14) changes the data on the disk (12), for example by doing a write data access to the disk (12), the cache driver (10) uses its remote message communication channels (18) to send a message to each of the remote cache drivers in the list contained in the TCB (16) disk control structure. Conversely, a remote cache driver would send a message to this cache driver (10), via the remote message communication channels (18), to inform this cache driver (10) of a change in the data for some remotely connected disk (12). The cache driver (10) would use this incoming message to invalidate any possible previously locally cached data for the area on the remotely connected disk (12) that has been changed by the remote OpenVMS system.

The cached disk (12) data is held in computer RAM (20) allocated from OpenVMS systems (14) available free memory. This RAM (20) area is allocated on demand in chunks (22) that relate to the bucket size for which of the three caches, small, medium, or large, that the disk (12) read access size fits. For each cache data bucket (22) a corresponding bucket control structure, referred to herein as a TCMB ("the cache memory block") (24), is built with the TCMB (24) space allocated from the OpenVMS systems (14) pool. The TCMB (24) bucket control structure contains pointers to the RAM (20) area containing the cache data bucket (22). The TCMB (24) bucket control structure is held in one of three queues off a cache control structure, referred to herein as a TCH ("the cache hash")(26). There are three TCH (26) cache control structures, one for each of the three cache bucket sizes, small, medium and large Each TCH (26) cache control structure contains cache statistics for the particular sized cache, small, medium, or large, three queue list heads where TCMB (24) bucket control structures are held, these being the free queue (27), the LRU queue (28), and the in-progress queue (29). Each TCH (26) cache control structure also contains a disk block value hash table (30) which also points to TCMB's (24) for a set of disk block areas.

When the OpenVMS system (14) performs a read data I/O access to a disk (12) the cache driver (10) software intercepts the I/O. Using the size of the read data access the cache driver (10) selects which of the three caches, small, medium, or large, the data transfer fits. Having selected the appropriate sized cache the TCH (26) cache control structure is selected. Using the read data I/O access disk block as a pointer into the disk block value hash table (30) of the TCH (26), the cache driver (10) attempts to locate a matching TCMB (24) bucket control structure. If a matching TCMB (24) for the disk (12) and its disk area is found a cache hit is assumed and the data is returned to the OpenVMS system (14) from the cache data bucket (22) held in the computer RAM (20). The data is returned at the faster computer main memory access speed, showing the speed advantage of using a disk cache mechanism. If no matching TCMB (24) bucket control structure is found for the disk (12) and its disk area, a cache miss is assumed.

For a cache miss an unused TCMB (24) bucket control structure and its corresponding cache data bucket (22) is assigned for the read data I/O access. This unused TCMB (24) with its corresponding cache data bucket (22) is first attempted to be allocated from the TCMB free queue (27) off the associated TCH (26) cache control structure. How TCMB's (24) with their corresponding cache data buckets (22) get to the free queue (27) will be described later. If there are no TCMB's (24) on the free queue (27), the cache driver (10) attempts to allocate extra computer RAM (20) space for a new cache data bucket (22), matching the bucket size, with a new TCMB (24) bucket control structure. If the OpenVMS system (14) indicates there is insufficient available free memory for this new cache data bucket (22) and TCMB (24) assignment, or the cache driver has reached its memory limit set by the computer user when the cache was started, the cache driver (10) attempts to reuse a TCMB (24) with its corresponding cache data bucket (22) from the back of the TCMB least recently used, LRU, queue (28) off the appropriate TCH (26) cache control structure. How TCMB's (24) with their corresponding cache data buckets (22) get to the LRU queue (28) will be described later. If there are no TCMB (24) bucket control structures with their corresponding cache data bucket (22) on the LRU queue (28), no cache data space can be assigned to this read data I/O access and the disk (12) is accessed normally for the required read data. If a TCMB (24) bucket control structure with its corresponding cache data bucket (22) was obtained from one of the three sources described above, cache data space can be assigned for this disk (12) read data. The disk (12) is accessed normally, however the read data is not only sent to the requesting user on the OpenVMS system (14), but also copied to the cache data bucket (22). The corresponding TCMB (24) bucket control structure, for the cache data bucket (22), is filled in to contain a pointer to the corresponding TCB (16) disk control structure along with the disk block area that the cache data bucket (22) contains. Whilst the disk (12) read data I/O was in progress the TCMB (24) bucket control structure and its corresponding cache data bucket (22) was placed on the in-progress queue (29) of the associated TCH (26). This allows the cache driver (10) to deal with another disk cache access whilst current accesses are progressing, making the cache driver multithreaded. When the disk (12) read data I/O completes and the disk data has been copied to the cache data bucket (22), the corresponding TCMB (24) bucket control structure is placed at the front of the LRU queue (28) off the associated TCH (26) cache control structure. The starting disk block that this cached data bucket (22) and corresponding TCMB (24) bucket control structure is hashed, using the size of the cache bucket as the hash control, and the resulting hash value is used to place the TCMB (24) in a chain of similar hash values within the disk block value hash table (30) of the associated TCH (26) cache control structure.

When the OpenVMS system (14) performs a write data I/O access to a disk (12) the cache driver (10) software intercepts the I/O. The cache driver (10) will search for possible matching TCMB (24) bucket control structures with their corresponding cache data buckets (22) in all three TCH (26) cache control structures, for the disk and the range of disk blocks in the write data I/O access. Using the write data I/O access disk block as a pointer into the disk block value hash table (30) of each of the three TCH's (26), the cache driver (10) attempts to locate matching TCMB (24) bucket control structures. For each matching TCMB (24) bucket control structure found, the TCMB (24) and its corresponding cache data bucket (22) are invalidated. The invalidated TCMB (24) and its cache data bucket (22) are normally placed on the free queue (27) of the associated TCH (26) cache control structure to be used by some future cache data operation, however, if the OpenVMS system (14) indicates there are insufficient available free pages for the OpenVMS system (14), the cache data bucket (22) RAM space is returned to the OpenVMS system (14) free pages and the corresponding TCMB (24) space is returned to the OpenVMS system (14) pool. The TCB (16) disk control structure is located from invalidated TCMB (24) bucket control structure, with the TCMB (24) then disassociated with the TCB (16) disk control structure. The list of remote computers that can access the disk (12) is obtained from the TCB (16) disk control structure and a message is sent to all these remote computers using the remote message communication channels (18). On receipt of the message the cache driver (10) on the remote computers will invalidate any TCMB (24) bucket control structures and the corresponding cache data buckets (22) for the disk (12) and the disk block area range found in the write data I/O.

Every so often, using a timing mechanism present within the OpenVMS system (14), a system memory check (32) will run. This system memory check (32) looks at the available free pages and pool of the OpenVMS system (14). If the checks indicate there is insufficient memory available to the OpenVMS system (14) cache data buckets (22) are released, along with their corresponding TCMB (24) bucket control structures, back to the OpenVMS system (14) in a similar way to the write data I/O described above. The cache data buckets (22) are released by first using the free queue (27) of TCMB's (24) for the TCH's (26), then the LRU queue (28), and finally the in-progress queue (29), until the OpenVMS system (14) indicates that it again has sufficient available free pages.

In order to set the cache (10) characteristics and select disks (12) to include in the cache of the invention a user command interface (34) is provided. In the presently preferred embodiment, this is accessed via a CACHE command. The CACHE commands allow the cache (10) to start with selected characteristics such as the bucket size of the three caches for small, medium, and large, disk transfers, along with the upper and lower limits of computer RAM (20), which the cache driver (10) can use to accommodate the cache data buckets (22). The CACHE commands allow which disks (12) on the system are to be included in the cache and which disks (12) are to be excluded from the cache. The CACHE commands allow the computer user to view the status of the cache, along with the cache and disk statistics, either as a one shot display or continuously updated in a screen display bar chart.

The support code (36) for the cache of the invention periodically obtains cache and disk use statistics from the cache driver (10). This period is set from the CACHE command of the user interface (34). The cache and disk statistics obtained by the support code (36) is written to log files (38). These log files (38) contain cache statistics over a period of time, in order to be used by the computer user in adjusting the cache characteristics to best match the system on which the cache (10) of the invention is being used.

Figure 2A:
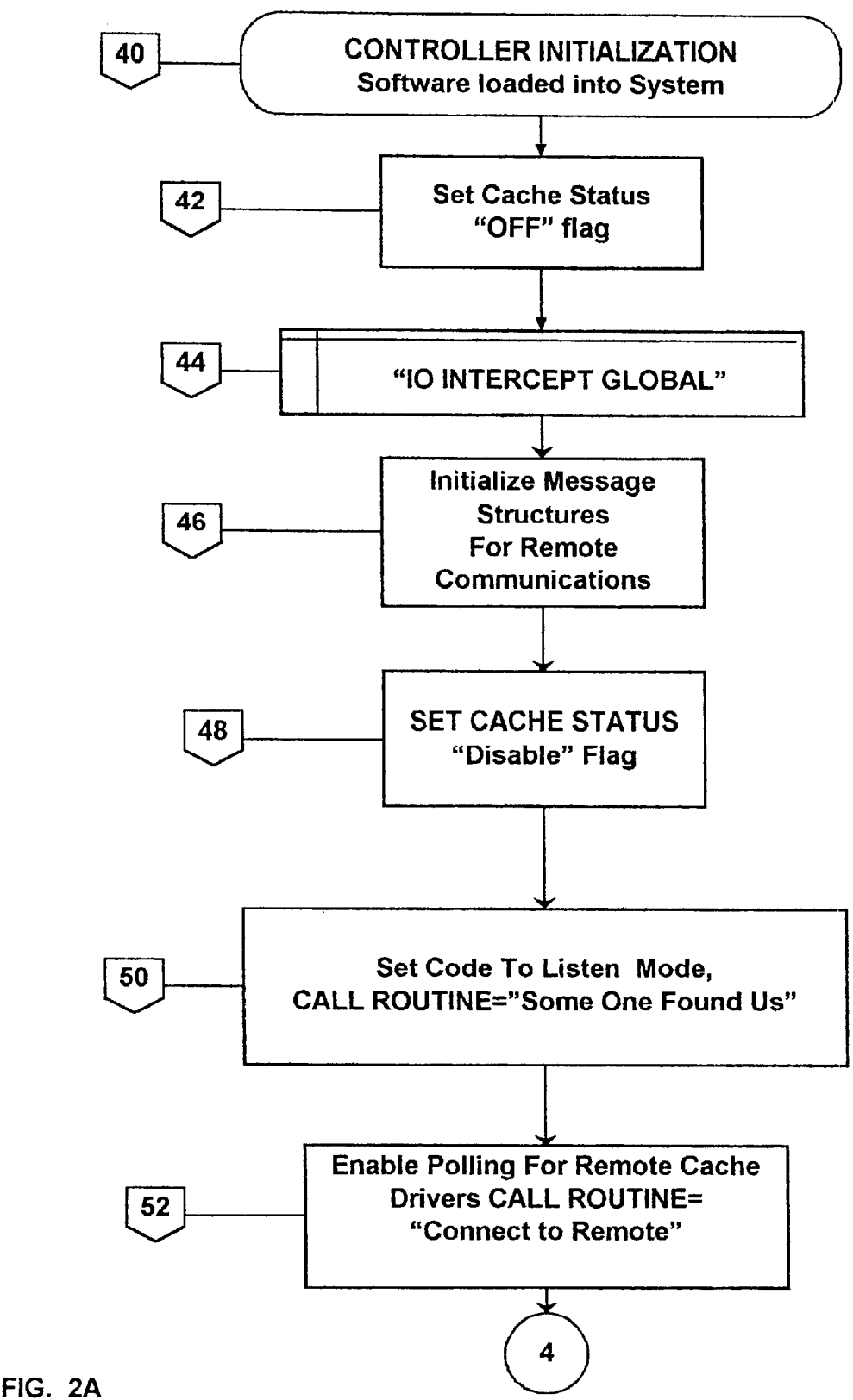
FIGS. 2A to 2D-1 are flow diagrams of the program steps for initial loading into the computer system for the disk cache software of the invention.
Figures 1, 2A:
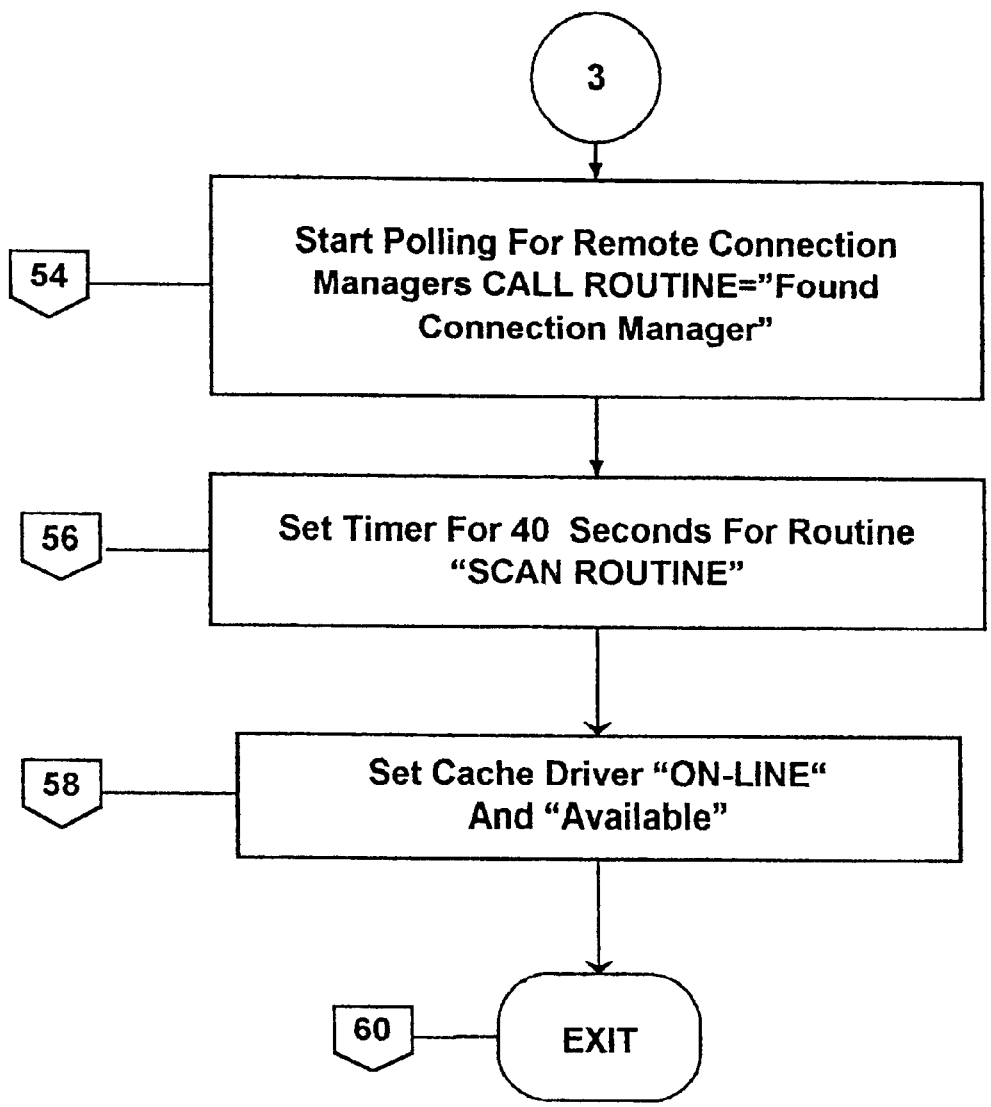
Figure 2B:
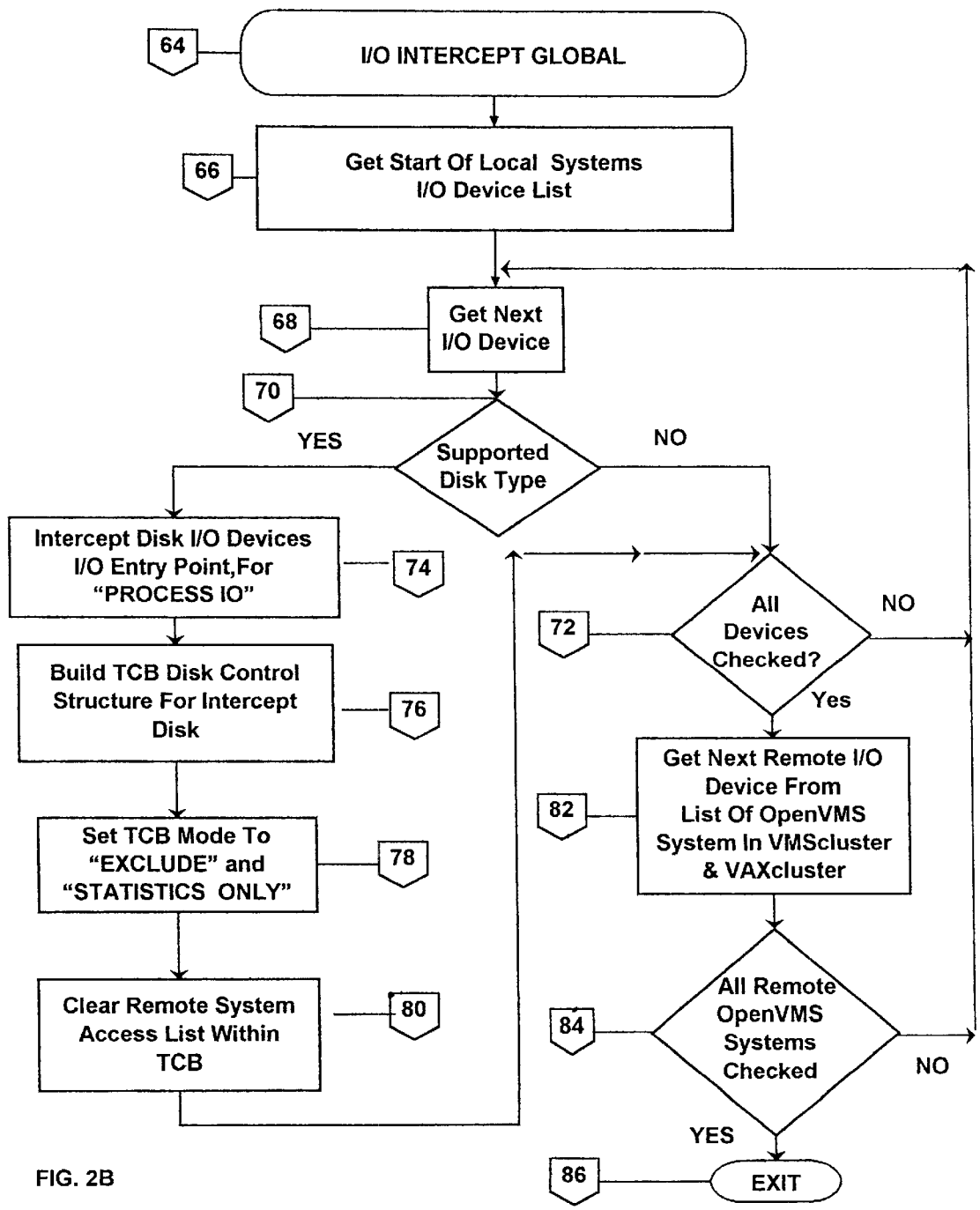

Referring now to FIGS. 2A to 2D-1, the instruction flow for the initial loading into the computer system of the cache software is illustrated. The operating software loads the cache software of the invention into the system (40) and calls the cache software at its controller initialisation entry point. The cache status is set to 'off' (42). The routine "io intercept global" is called (44). Referring to FIG. 2b for the "io intercept global" program flow (64), the program gets the start of the locally attached I/O device list for the computer system (66). The program gets the next I/O device from the I/O device list (68), which at this point will be the first I/O device in the list, and checks to see if the I/O device is one of the disk device types (70). If not, the program checks to see if all the I/O devices for the system have been checked (72). If there are further I/O devices connected to the system (72) the program repeats the loop by getting the next I/O device in the list (68) until all devices have been checked. When an I/O device is found to be one of the disk device types supported by the cache software of the invention (70), the program intercepts the I/O entry point for the I/O device (74) by replacing it with an entry into the program routine "process io" (400, FIG. 5A) within the cache software of the invention. A TCB (16, FIG. 1B) disk control structure for the disk I/O device is built (76). The TCB is set to 'exclude' mode and 'statistics only' mode (78), this stops the disk I/O device from being cached when the user starts the cache, until the user selectively includes this disk I/O device in the set of cached disks by the appropriate CACHE user command (34, FIG. 1A). The list of remote computers in the TCB (16, FIG. 1B) that will contain their own copy of the cache driver (10, FIG. 1A) that access the disk I/O device is cleared (80). The program flow then returns to the loop to see if there are further I/O devices attached to this computer system (72). Having searched through all the I/O devices connected to this computer system (72), the program will get the I/O device list of the next remote computer system that this local computer system can access (82). The presently preferred embodiment of the invention is implemented in conjunction with an OpenVMS system and uses the VMS cluster and VAX cluster software, within the OpenVMS system, to access remote I/O devices and computer systems. The program will check to see if all the remote computer systems have been searched (84), if not, the program repeats the loop searching for disk I/O devices supported by the cache software of the invention (68). When the program has searched through all the remote computer system I/O devices, the "io intercept global" program flow exits (86).

Returning now to FIG. 2A, once all the disk I/O devices that the cache software of the invention supports have been intercepted (44), the program continues to set-up the remote computer communication channels. The presently preferred embodiment of the invention is implemented in conjunction with an OpenVMS system and uses the VMScluster and VAXcluster software, within the OpenVMS system, for the remote computer communications. The message structures for the remote computer communications are initialised (46). The cache status flag 'disable' is set (48), the 'disable' flag is used to indicate that the remote computer connections are inconsistent, which will temporarily disable caching operations until the remote computer connections are completely formed in a consistent state. Using the OpenVMS VMScluster and VAXcluster programs, the cache software of the invention is set to listen for incoming requests for connections from remote computer systems (50). On receipt of an incoming connection request, the program routine "someone found us" (104, FIG. 2C) within the cache software of the invention will be called. Using the OpenVMS VMScluster and VAXcluster programs, the cache software of the invention is set to poll for remote computer systems that are running the cache software of the invention (52). When a remote system running the cache software of the invention is found, the program routine "connect to remote" (90, FIG. 2C) within the cache software of the invention will be called. The program routines "connect to remote" (90, FIG. 2C) and "someone found us" (104, FIG. 2C) will form the remote computer communications channels down which cache software message communications of the invention will be sent. To enable the cache software of the invention to identify OpenVMS computer systems joining the network of VMScluster and VAXcluster systems, the cache software of the invention is set to poll for remote computer systems running the OpenVMS VMScluster and VAXcluster program "connection manager" (54). The OpenVMS VMScluster and VAXcluster program "connection manager" has to be run by all OpenVMS computer systems participating in the network of computers of a VMScluster and VAXcluster. When a remote system running the OpenVMS VMScluster and VAXcluster program "connection manager" is found, the program routine "found connection manager" (110, FIG. 2C) within the cache software of the invention will be called. The timer program "scan routine" (120, FIG. 2D) within the cache software of the invention is set to run in 40 seconds from this point, using a timer mechanism within OpenVMS (56). The cache driver (10, FIG. 1A) is set to be on-line and available to the OpenVMS system (58). The load initialisation for the cache software of the invention then exits (60).

Figure 2C:
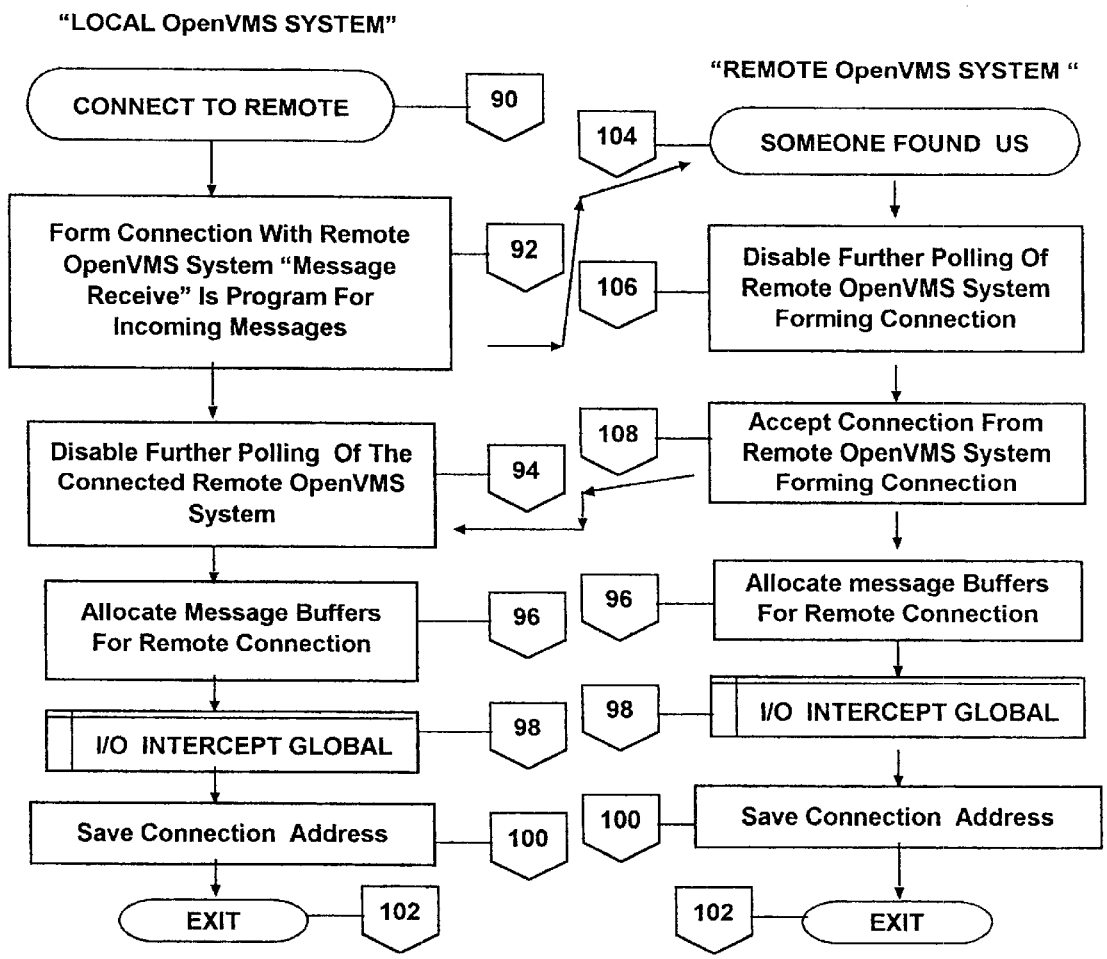
Figures 1, 2C:
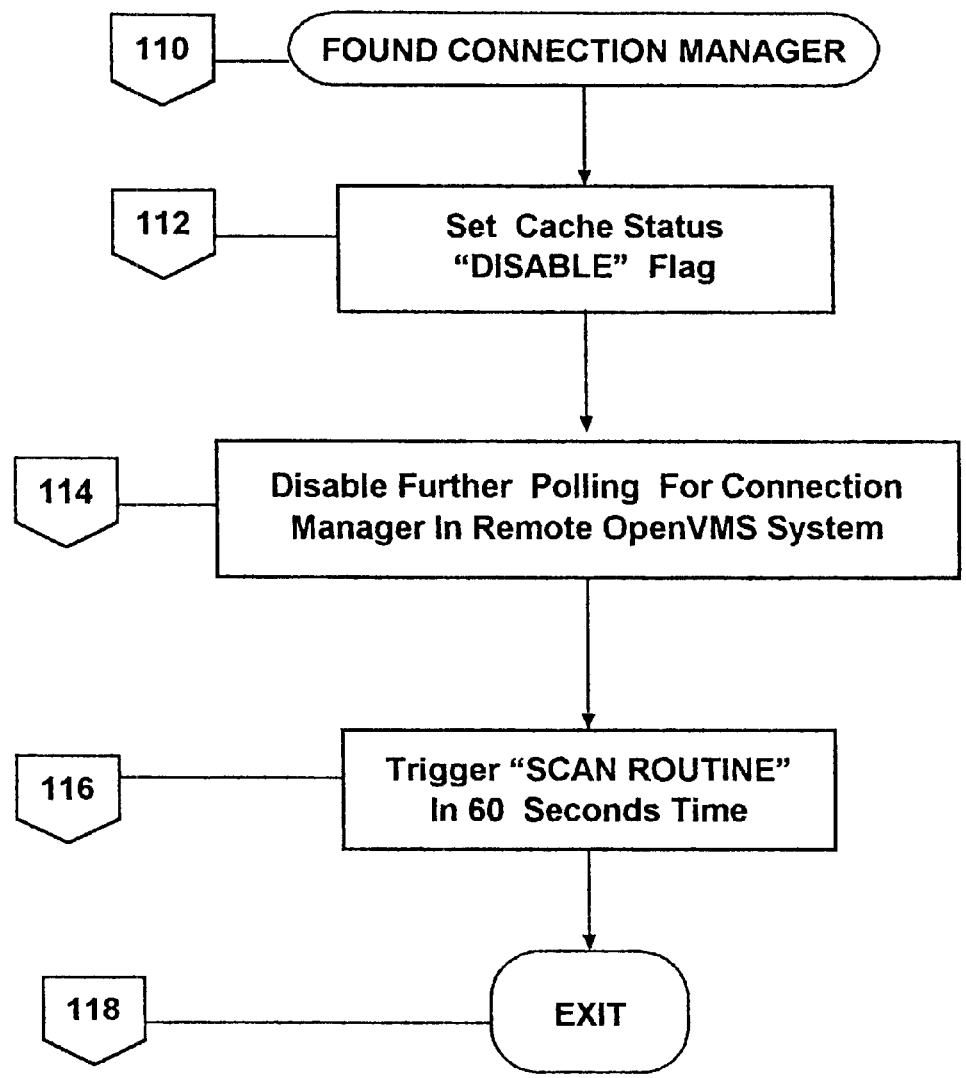

Referring to FIG. 2C, the remote communication connection program routines "connect to remote" and "someone found us" along with "found connection manager", will be described. When the OpenVMS VMScluster and VAXcluster system finds that a remote system is running the cache software of the invention, it calls the program routine "connect to remote" (90). The program requests the OpenVMS VMScluster and VAXcluster system to attempt to form a connection with the remote system (92). When a message is received from a remote system running the cache software of the invention, the program routine "message receive" (286 FIG. 4D, 372 FIG. 4H, 644 FIG. 5N) within the cache software of the invention will be called. When the remote system running the cache software of the invention accepts the connection, the program proceeds by disabling the OpenVMS VMScluster and VAXcluster system from polling for this remote system again, in order that only one connection is formed between the two systems (94). Extra message buffers are allocated for this new remote connection (96). The program then calls "io intercept global" (FIG. 2B) to look for any new disk I/O devices that may have come available to cache with the presence of this new remote system (98). The remote connection address is then saved within the cache software of the invention (100) and the "connect to remote" program exits. On the remote system running the cache software of the invention, when a connect request is received the OpenVMS VMScluster and VAXcluster system calls the "someone found us" program (104). The program disables the OpenVMS VMScluster and VAXcluster system from polling for this remote system again, in order that only one connection is formed between the two systems (106). The program then requests that the OpenVMS VMScluster and VAXcluster system accepts the connection from the remote system (108). When a message is received from a remote system running the cache software of the invention, the program routine "message receive" (286 FIG. 4D, 372 FIG. 4H, 644 FIG. 5N) within the cache software of the invention will be called. The program then proceeds to its exit in the same way as "connect to remote" (96–102).

When a new OpenVMS system joins the network of computer systems in the VMScluster and VAXcluster system, the cache software of the invention on each of the current OpenVMS systems will be called at its "found connection manager" (110) program entry point. The program firstly sets the cache 'disable' status flag (112) The 'disable' flag is used to indicate that the remote computer connections are inconsistent, which will temporarily disable caching operations until these connections are completely formed in a consistent state. The program disables the OpenVMS VMScluster and VAXcluster system from polling for the "connection manager" on this remote system again (114), as the cache software of the invention is now aware of this new system. The timer program "scan routine" (120, FIG. 2D) within the cache software of the invention is set to run in 60 seconds from this point. The "found connection manager" program then exits (118).

Figure 2D:
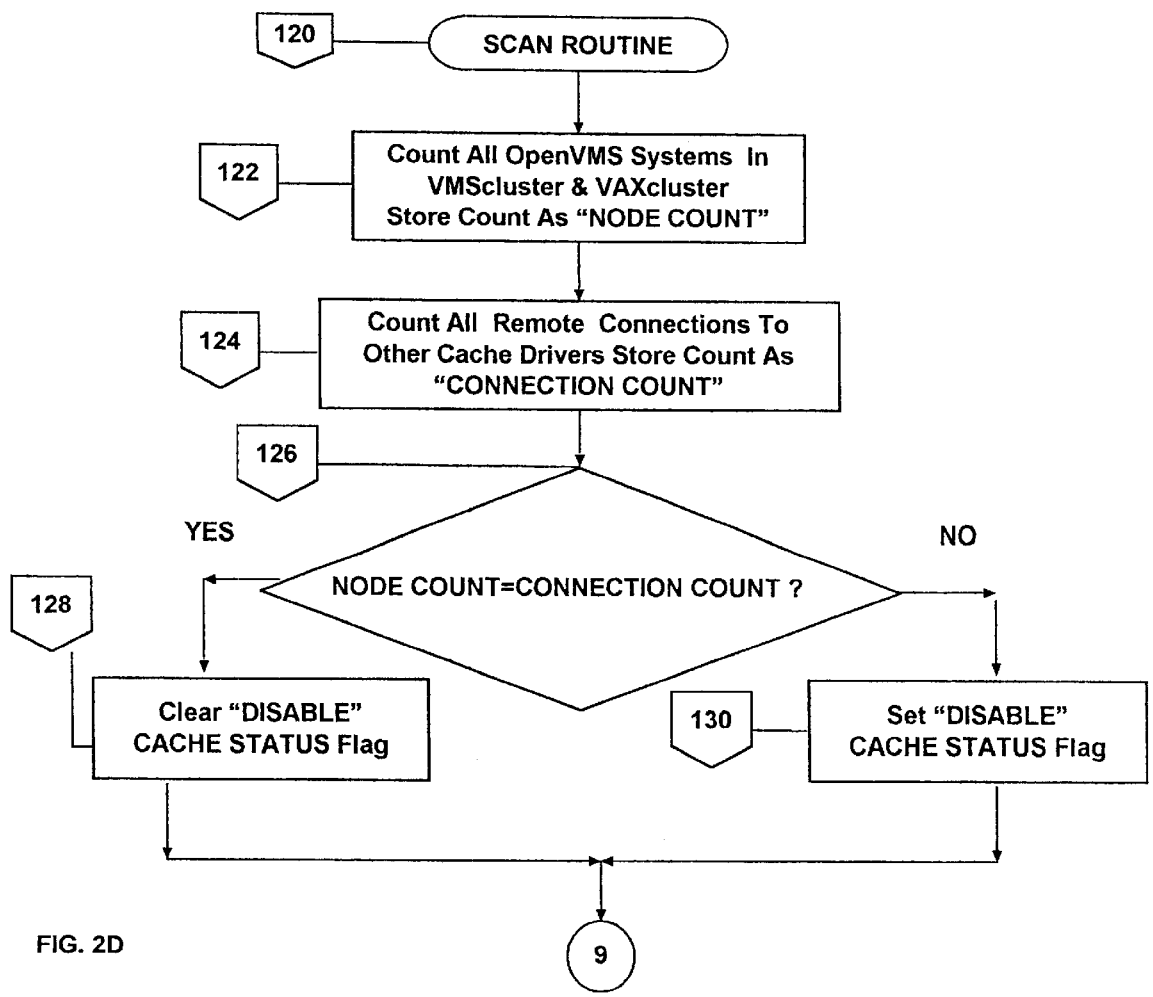
Figures 1, 2D:
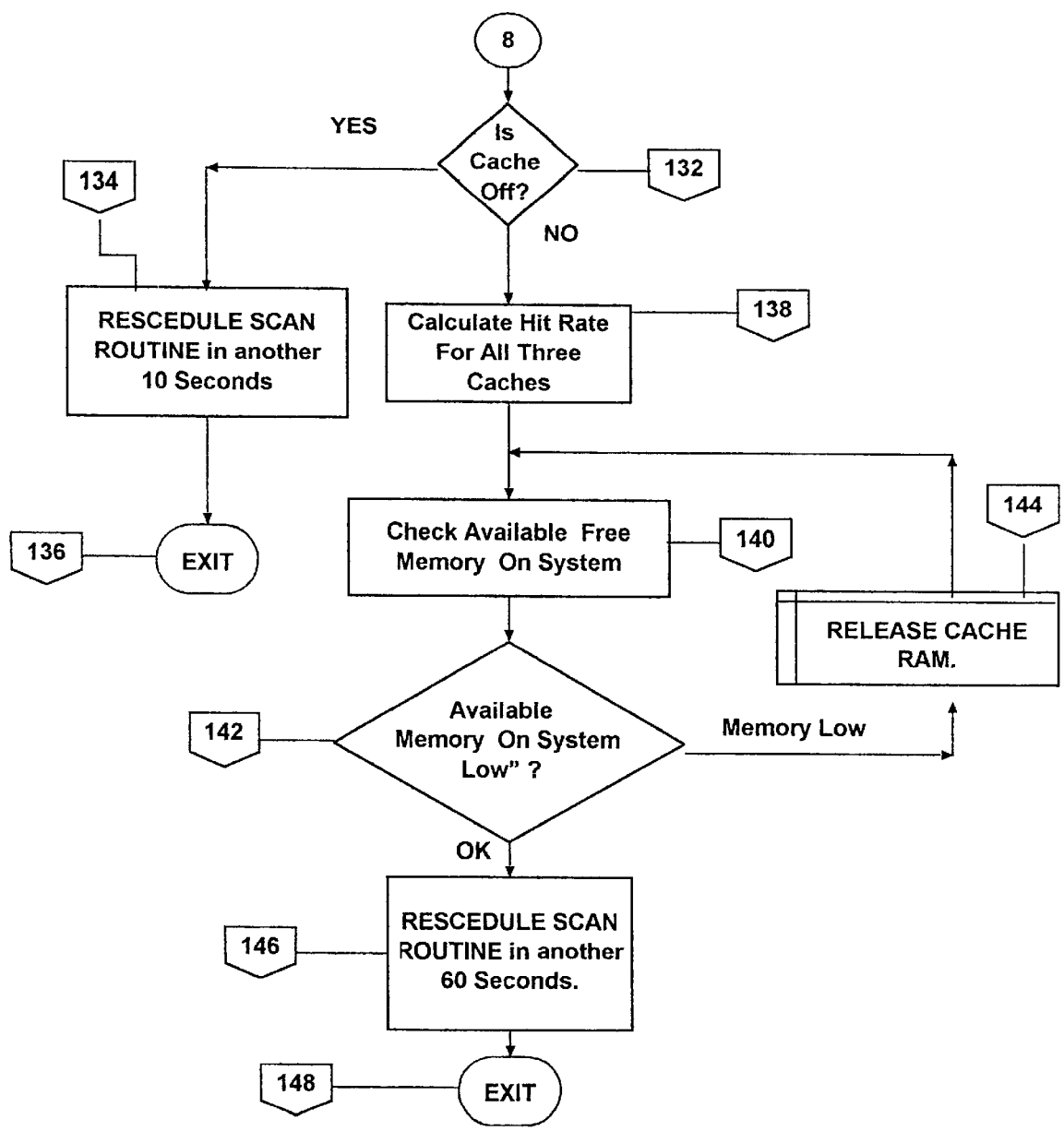

Referring now to FIG. 2D, the timer program "scan routine" (120) will be described. The program looks into the OpenVMS system database and counts all the computer systems present in the network of computer systems in the VMScluster and VAXcluster systems, storing this count as the 'node count' (122). The program counts all the remote connections this cache software of the invention has to other cache software of the invention present on other computer systems in the VMScluster and VAXcluster system, storing this count as the 'connection count' (124). The program then compares the 'node count' against the 'connection count' for equality (126). If the counts are equal the cache 'disable' status flag is cleared (128), allowing cache operations to proceed. Otherwise the cache 'disable' status flag is set (130), disabling cache operations until the counts become equal. The program then looks to see if the cache is off (132), if so, the "scan routine" is scheduled to run again in 10 seconds from this point (134) and the program exits (136). The cache is set to off when the cache software of the invention is loaded into the operating software. The cache is set to on by the user CACHE command. If the cache is turned on, the program proceeds to calculate the hit rate of the three caches, small, medium, and large, based on the number of hits over time (138). The program checks the available free memory of the OpenVMS system (140). If the available free memory is low (142), the cache software of the invention will release some of the memory held by the cache back to the OpenVMS system (144). The memory will be chosen from the cache with the lowest hit rate, then the next lowest, etc., until the OpenVMS systems available free memory is nominal. The detailed program flow for the release of memory is not included in these descriptions. The "scan routine" is scheduled to run again in 60 seconds from this point (146) and the program exits (148).

Figure 3A:
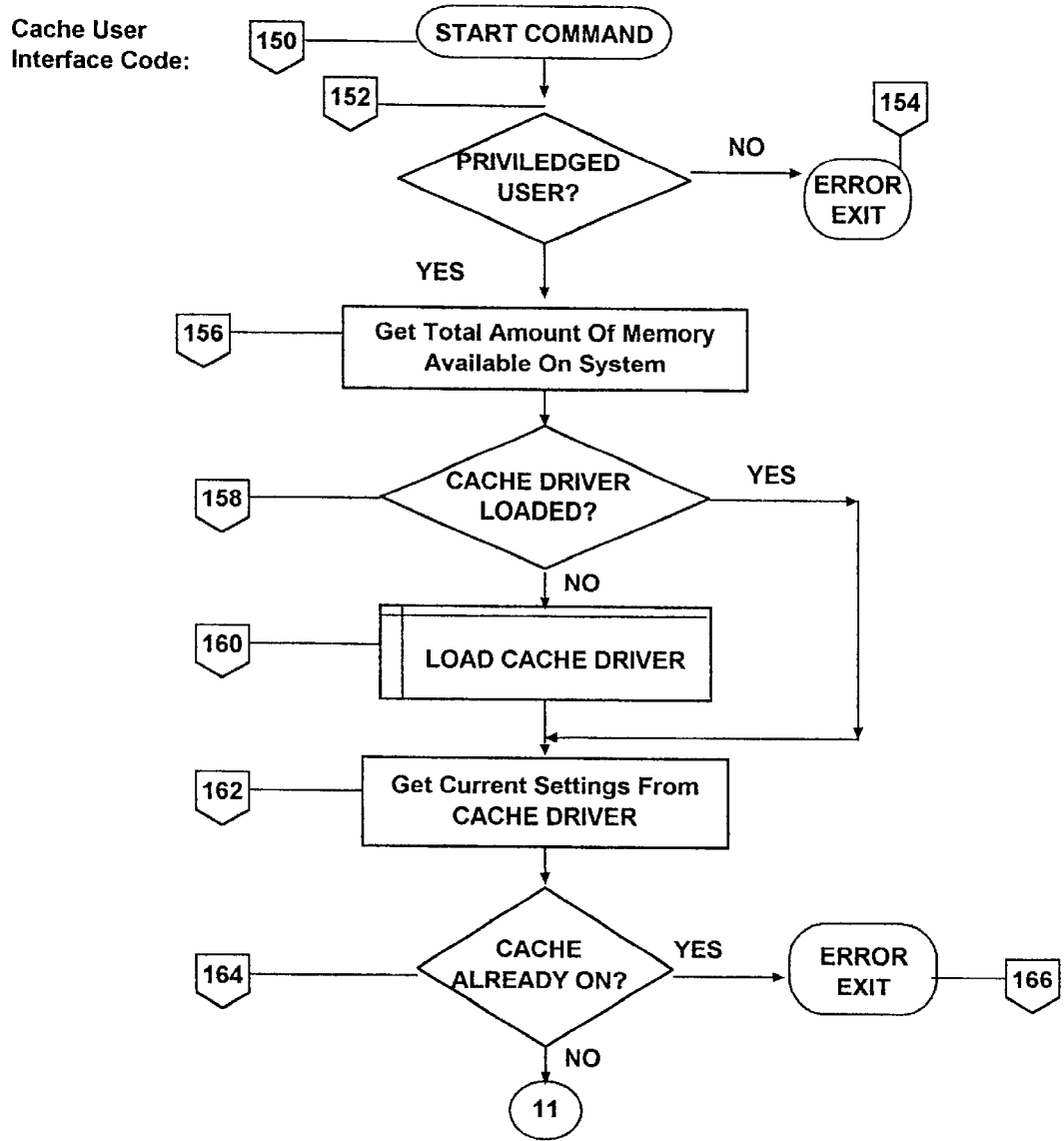
FIGS. 3A to 3C are flow diagrams of the program steps performed when the disk cache software is started for the present invention.
Figures 1, 3A:
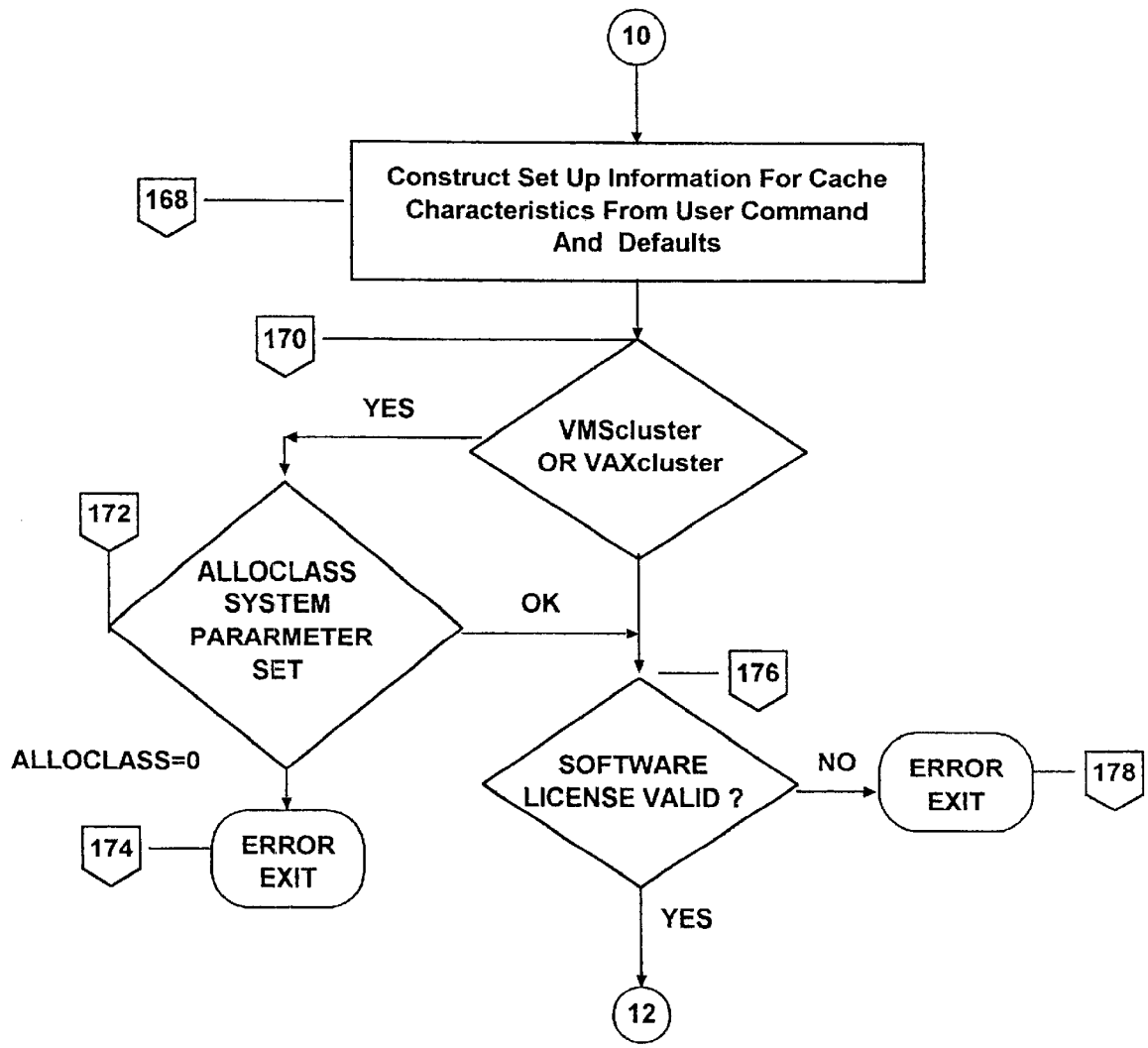
Figure 3B:
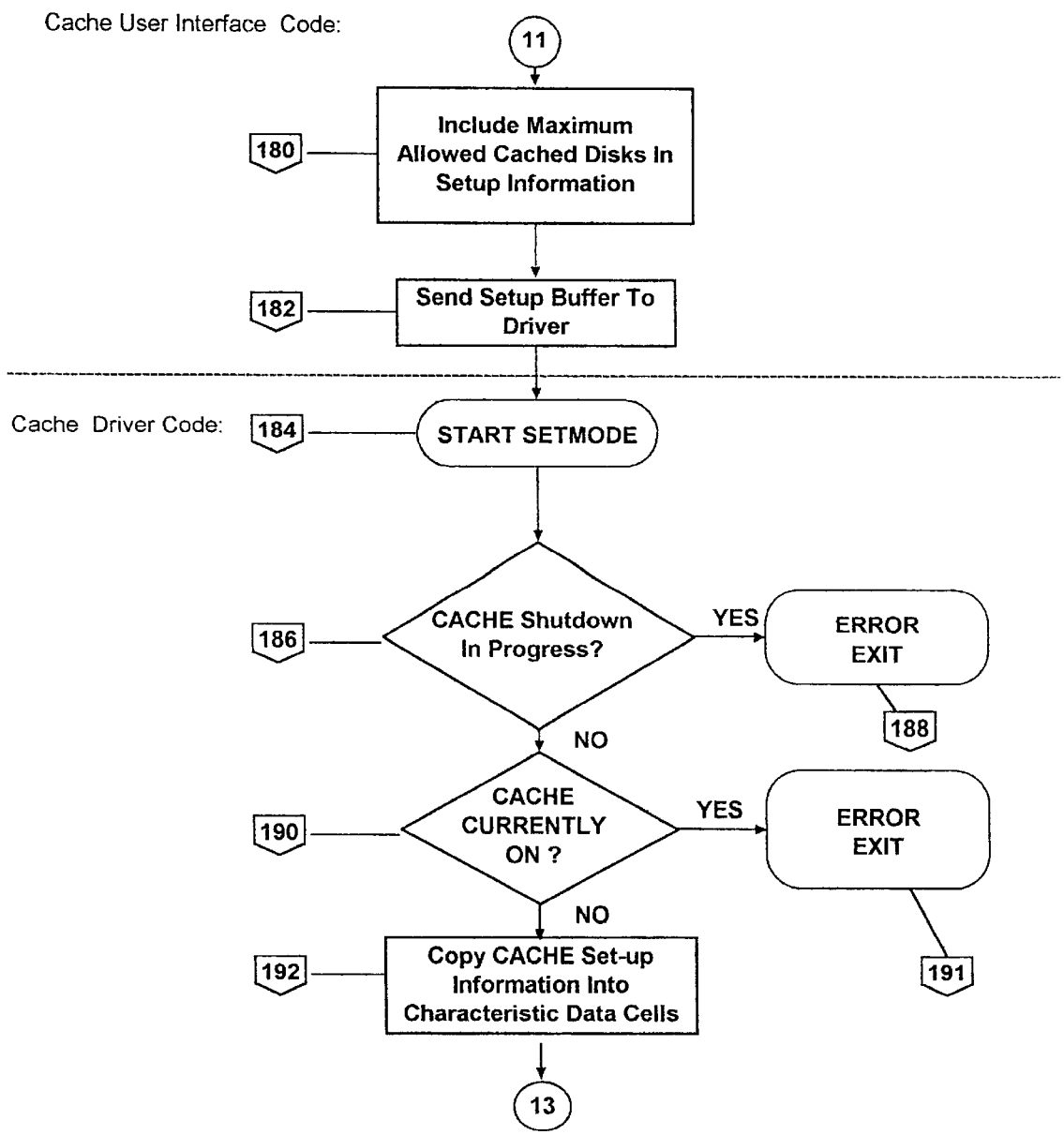
Figure 3C:
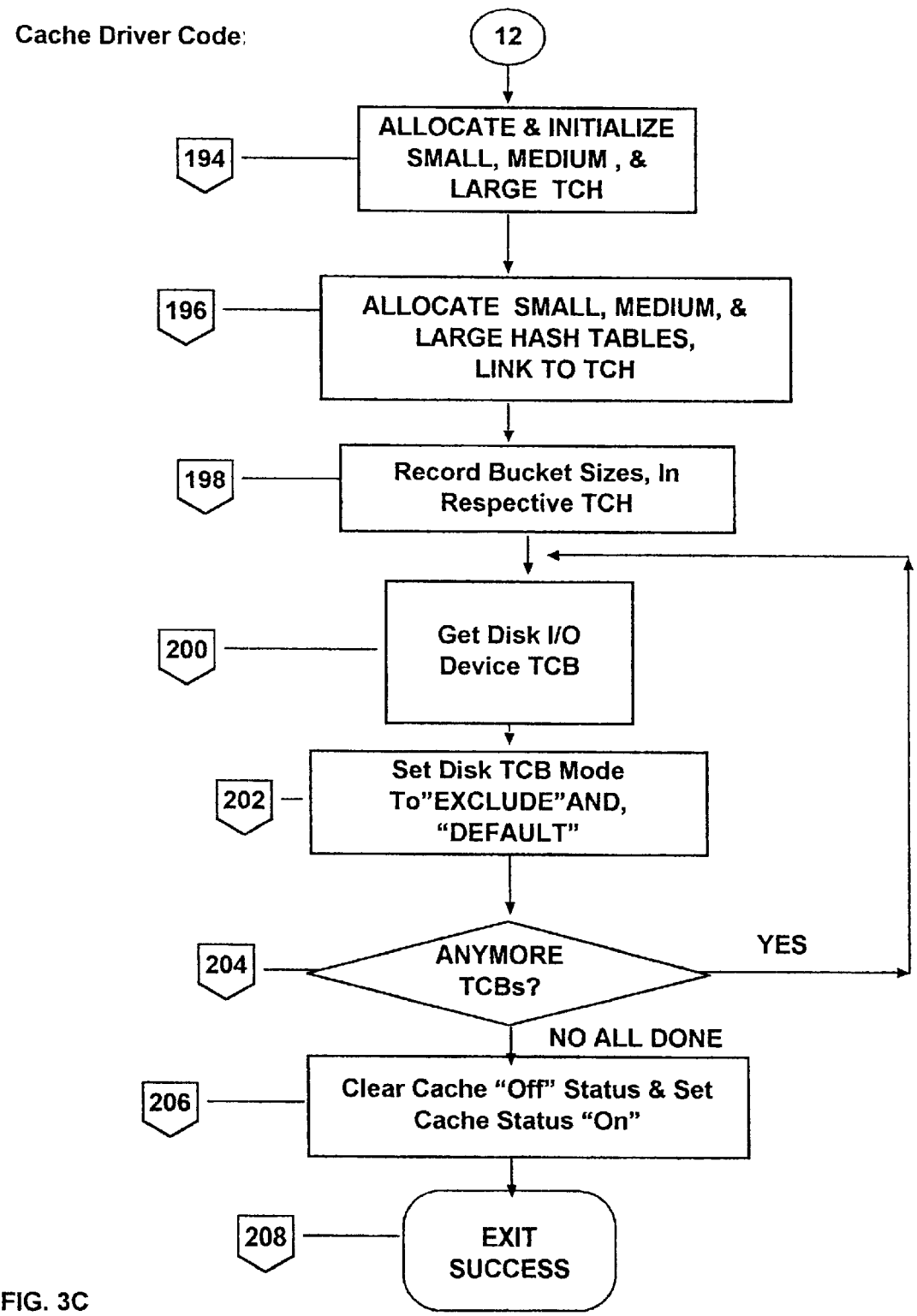

Referring now to FIGS. 3A to 3C, the program steps performed when the disk cache software is started for the present invention will be described. The cache is started from the user CACHE command interface (34, FIG. 1A). The CACHE command can work either as a menu driven interactive display mode, or as a single command line input for which the presently preferred embodiment defines as the CACHE START command. When starting the cache the user can specify the bucket sizes for the three caches, small, medium, and large, along with other factors, such as the maximum amount of memory the cache software of the invention is allowed to use for the cached data. Default values will be used for any of the factors not specified by the user when the cached is started. From the CACHE START command the program starts executing in the user interface code (34, FIG. 1A), called at the "start command" entry point (150). The program begins by checking that the user has sufficient operating system privilege to alter the cache state (152). If not, the program exits in error (154). The program obtains the total amount of memory in the system from OpenVMS (156). The program checks whether cache driver (10, FIG. 1A) has been loaded into the system (158). If not, the cache driver is loaded (160) into the computer system. The current settings for the cache is obtained from the cache driver characteristics and status (162). These settings will be used as the defaults for any factors not specified by the user in the CACHE command, allowing the cache to be restarted with the same characteristics between successive starting and stopping of the cache, except for those that the user explicitly changes. From the obtained current cache status the program checks whether the cache is already on (164), having already been started and if so, exits in error (166). The program sets all the required cache characteristics from those explicitly specified by the user in the CACHE command and the defaults for any not specified (168), into a set-up buffer. If the OpenVMS system is cooperating in a VMScluster and VAXcluster (170), the program verifies that the OpenVMS system 'alloclass' parameter is set to some non-zero value (172). If the OpenVMS system 'alloclass' parameter is currently set to O, the program exits in error (174). The OpenVMS system 'alloclass' parameter forms part of the disk I/O device name, allowing consistent multipath accesses for the disk I/O devices in the VMScluster and VAXcluster environment. The program checks that the software licence for the cache software of the invention is valid (176). If not, the program exits in error (178). The maximum amount of disk I/O devices allowed to be cached is obtained from the software licensing information, the value is placed into the cache set-up buffer (180). The cache set-up buffer is then sent (182) by the user command interface code (34, FIG. 1A) to the cache driver (10, FIG. 1A). The remaining cache start and set up takes place in the cache driver, which runs at a high privilege on the system, allowing the code to directly interface into the OpenVMS system. On receipt of the cache start set-up information, the cache driver begins execution at its "start setmode" entry point (184). The program checks to see if the cache is currently shutting down (186), from a previous user request to stop the cache software of the invention. If so, the program exits in error (188) and the user is requested to wait until caching is fully stopped. The program will check to see if the cache is currently on (190), having already been started from a previous request. If so, the program exits in error (191). The program copies the set-up buffer information from the user start request into the characteristic data cells for the cache (192). The program allocates and initialises the three TCH (26, FIG. 1A) cache control structures from the system pool (194), for the three caches, small, medium and large. For each TCH cache control structure, the program allocates the disk block value hash table (30, FIG. 1A), dependent on the cache size (196). Each disk block value hash table (30, FIG. 1A) is allocated from the systems available free memory. The cache bucket size for each of the three caches, small, medium, and large, from the user set-up buffer are recorded in the associated TCH (198) The program then gets the first TCB (16, FIG. 1A) disk control structure (200), setting the TCB to 'exclude' mode and 'default' mode (202). If there are more TCB's (204), the program gets the next TCB and repeats the loop (200–204), setting each TCB to 'exclude' mode and 'default' mode until all TCB's are acted upon. The TCB 'exclude' mode inhibits the disk I/O device associated with that TCB to have its data cached, until the user explicitly includes that disk I/O device. The TCB 'default' mode operates as an indicator to the active caching "process io" program (400, FIG. 5A) that caching has been started. The cache is turned on by clearing the cache 'off' status flag and setting the cache 'on' status flag (206). The program then exits in success (208).

Referring now to FIGS. 4A to 4H-2, the program steps for selecting a disk to be included into, or excluded from, the cache software of the invention will be described. The user selects a disk I/O device to be included, or excluded, from the cache software of the invention via the user CACHE command interface (34, FIG. 1A). The CACHE command can work either as a menu driven interactive display mode, or as a single command line input for which the presently preferred embodiment defines as the CACHE DISK command. When using the CACHE DISK command, the user specifies the name of the disk I/O device as known by the OpenVMS system and whether the disk is to included, or excluded from, the cache software of the invention. From the CACHE DISK command the program starts executing in the user interface code (34, FIG. 1A), called at the "disk command" entry point (210). The program begins by checking that the user has sufficient operating system privilege to alter the cache state (212). If not, the program exits in error (214). The program checks to see if the disk I/O device does in fact exist on the OpenVMS system, by attempting to assign an I/O channel to the disk I/O device. (216). Failure to assign an I/O channel to the disk I/O device results in the program exiting in error (218). The program gets the characteristics of the disk I/O device (220) and from these characteristics, checks that the disk I/O device is one of the disk I/O device types that are supported by the cache software of the invention (222). If not, the program exits in error (224). The presently preferred embodiment of the invention supports all mechanical disk I/O devices and solid state disk I/O devices that can exist on an OpenVMS system. The presently preferred embodiment of the invention does not support pseudo disk I/O devices that can exist on an Open VMS system, such as a RAMdisk. These pseudo disk I/O devices do not exist on an I/O bus channel, but totally within the physical memory of the Open VMS system Caching these pseudo disk I/O devices in physical memory achieves little, if no, speed advantage on the read I/O and write I/O data transfers to these devices and further reduces the amount of available physical memory to the OpenVMS system unnecessarily. Having verified that the disk I/O device specified in the CACHE DISK command is one of the supported types by the cache software of the invention, the program then checks the CACHE DISK command for an exclude request (226). If the CACHE DISK command requests that the disk I/O device be excluded from the cache software of the invention, the program sends an "exclude disk" I/O command (228) to the cache driver (10, FIG. 1A), specifying the name of the disk I/O device to be excluded from the cache software of the invention. If the CACHE DISK command is not an exclude request, the program checks whether this is an include request (230). If neither an exclude or include request was specified with the CACHE DISK command, the program exits in error (232). For a CACHE DISK include request command, the program checks whether the OpenVMS system is participating in a VMScluster and VAXcluster (234). If not, the program sends an "include disk" I/O command (236) to the cache driver (10, FIG. 1A), specifying the name of the disk I/O device to be included in the active cache operations of the invention. If the OpenVMS system is participating in a VMScluster and VAXcluster (234), the program checks whether the disk I/O device specified in the CACHE DISK include request command is the quorum disk for the VMScluster and VAXcluster (238). If the disk I/O device is the quorum disk for the VMScluster and VAXcluster, the program exits in error (240), else the program sends an "include disk" I/O command (236) to the cache driver (10, FIG. 1A), specifying the name of the disk I/O device to be included in the cache software of the invention. Caching the quorum disk of a VMScluster and VAXcluster could cause possible VMScluster and VAXcluster problems. Not all VMScluster and VAXcluster configurations use a quorum disk. Those VMScluster and VAXcluster configurations that do use a quorum disk use a file on the quorum disk to identify new OpenVMS systems joining the VMScluster and VAXcluster. The new OpenVMS system joining the VMScluster and VAXcluster would not have the cache software of the invention running in its system memory. A write to the file on the quorum disk by this new OpenVMS system would not be intercepted by the cache software of the invention, running on the present OpenVMS systems in the VMScluster and VAXcluster. The cache for the quorum disk data blocks that contain the file for the quorum disk of a VMScluster and VAXcluster would not get altered, and the present OpenVMS systems in the VMScluster and VAXcluster would not notice this new OpenVMS system attempting to join the VMScluster and VAXcluster. For this reason the cache software of the invention will not include the quorum disk of a VMScluster and VAXcluster in its caching operations.

Figure 4A:
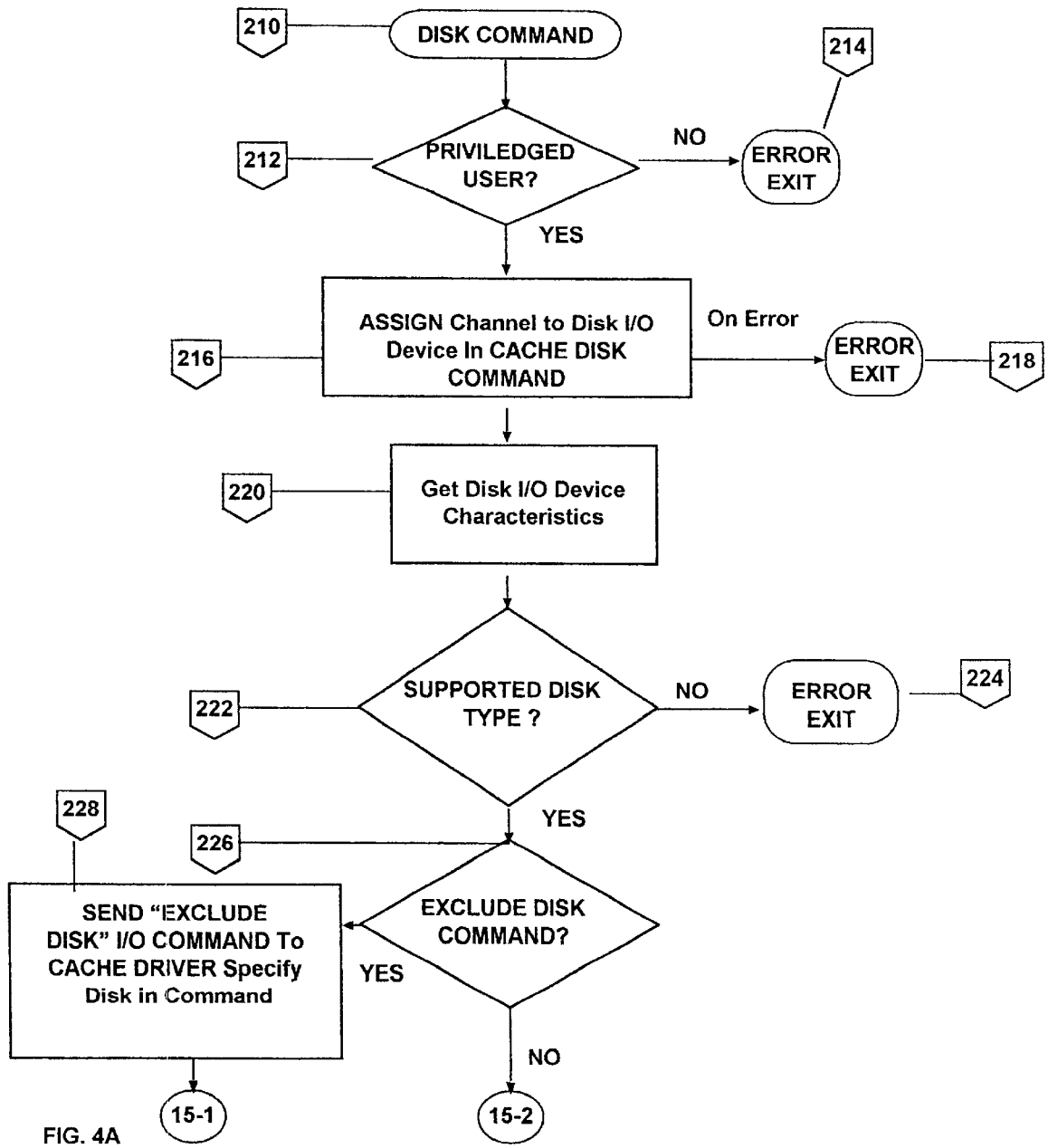
FIGS. 4A to 4H-2 are flow diagrams on the program steps for selecting a disk I/O device to be included into, or excluded from, the cache software of the invention.
Figures 1, 4A:
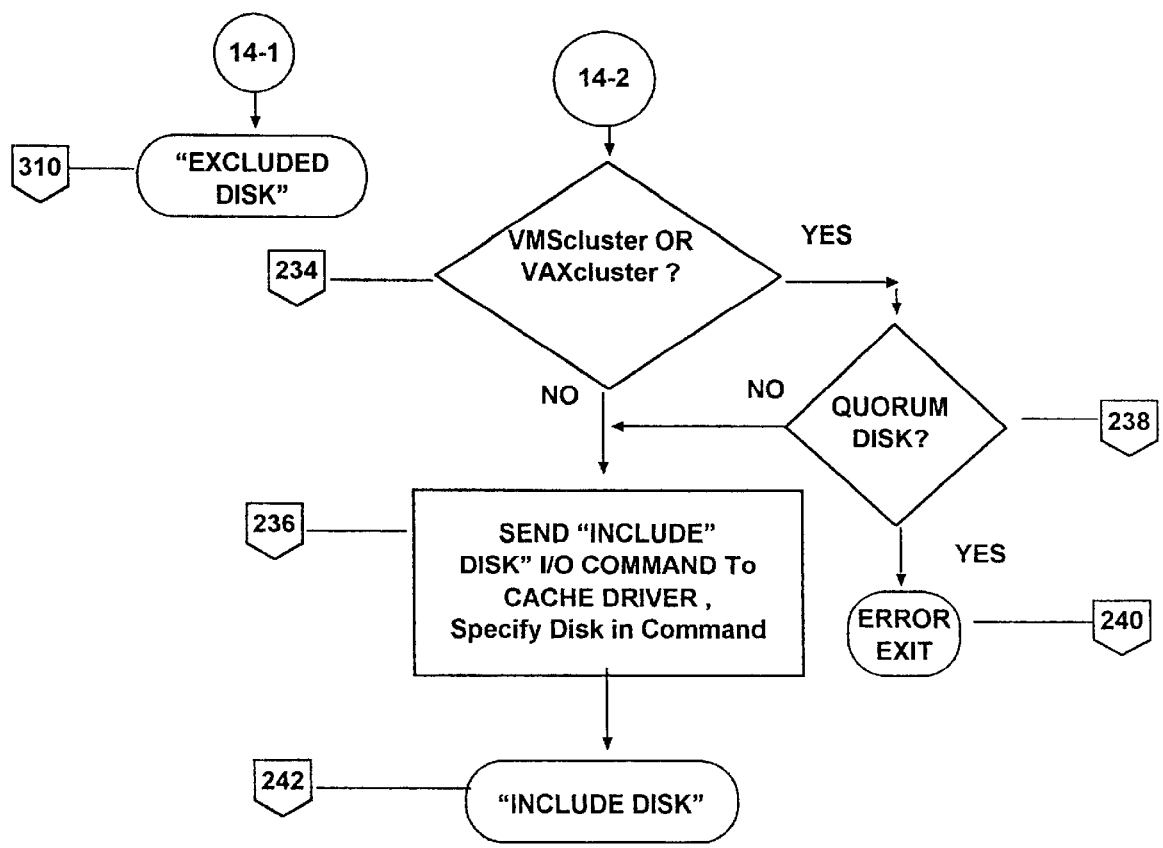
Figure 4B:
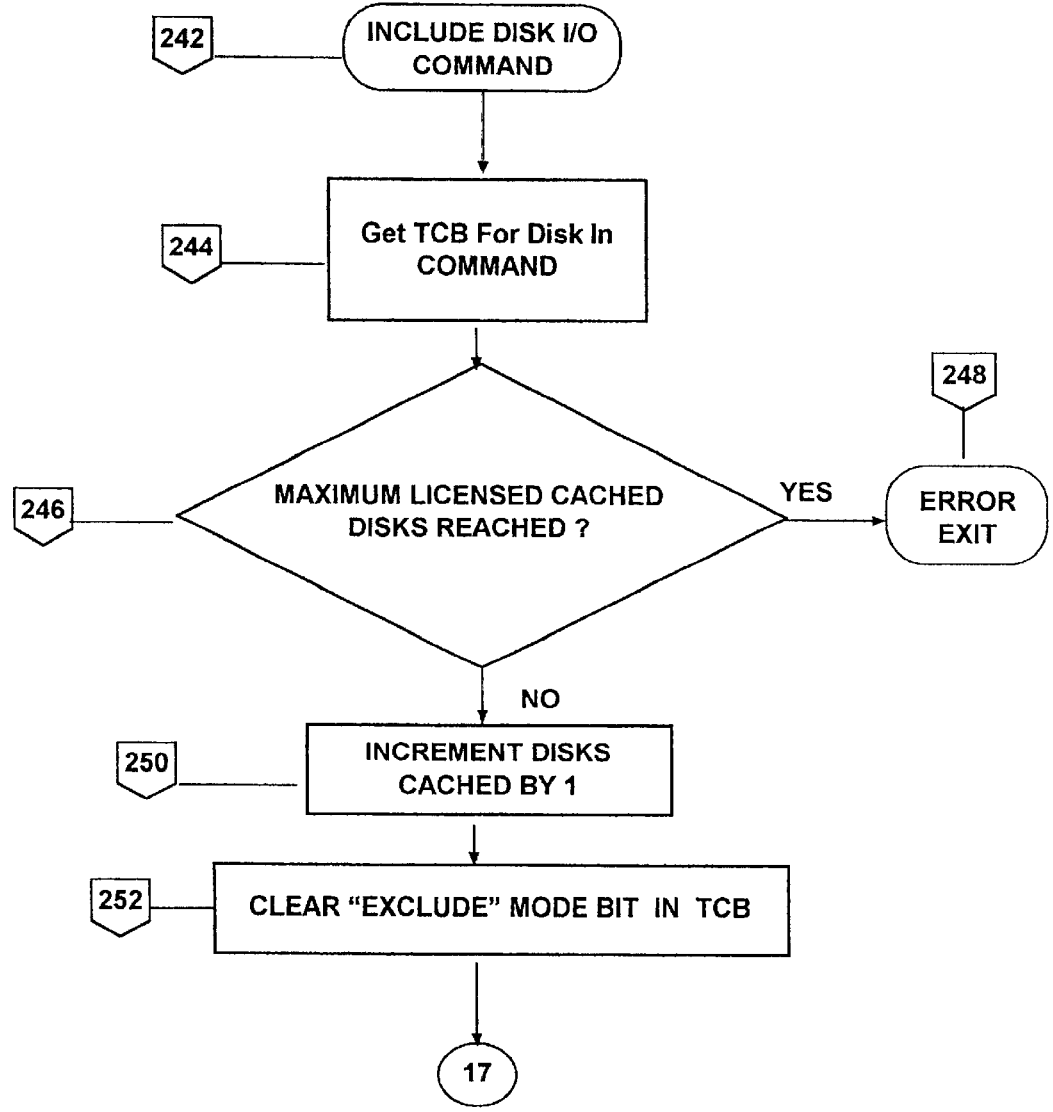
Figures 1, 4B:
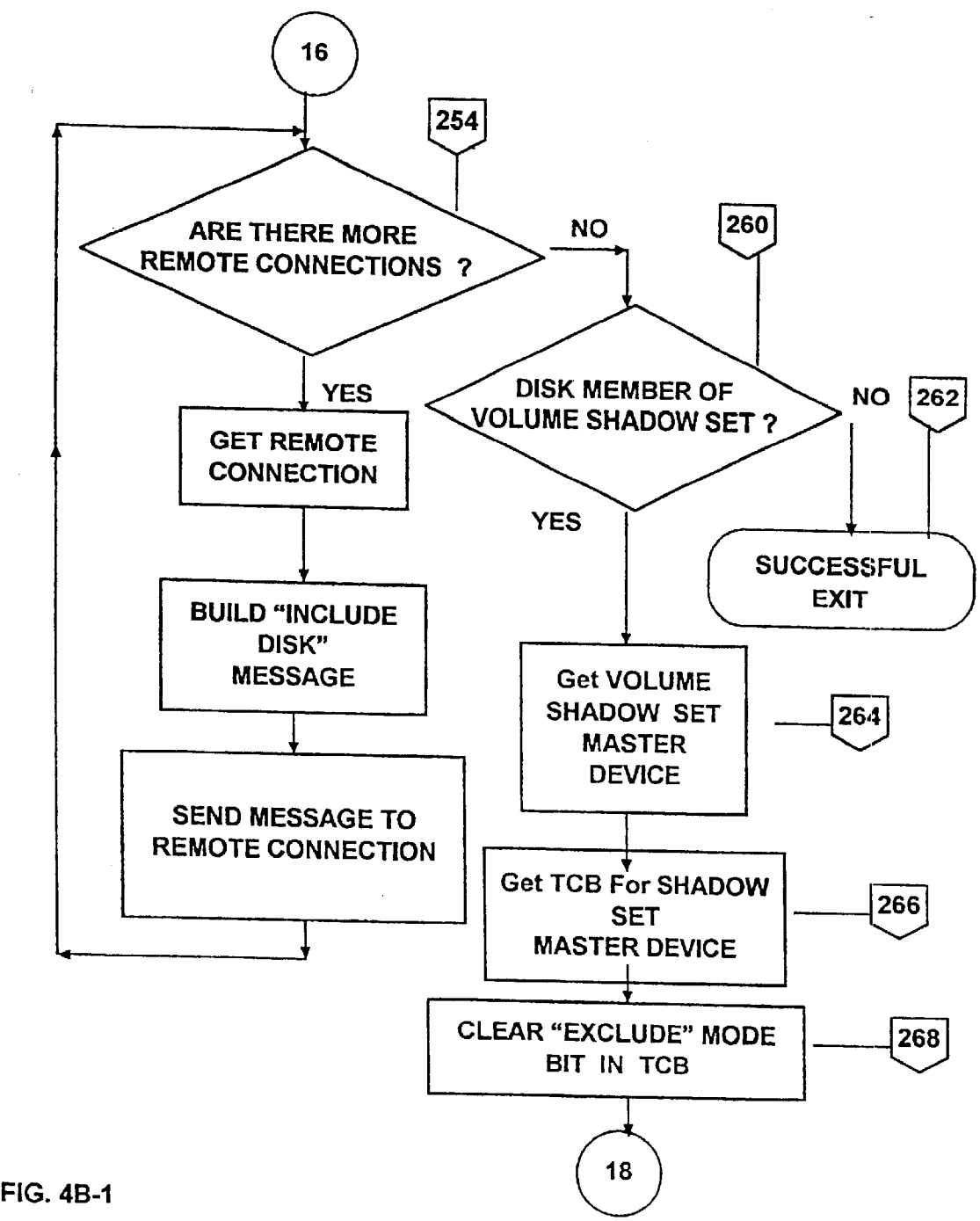
Figure 4C:
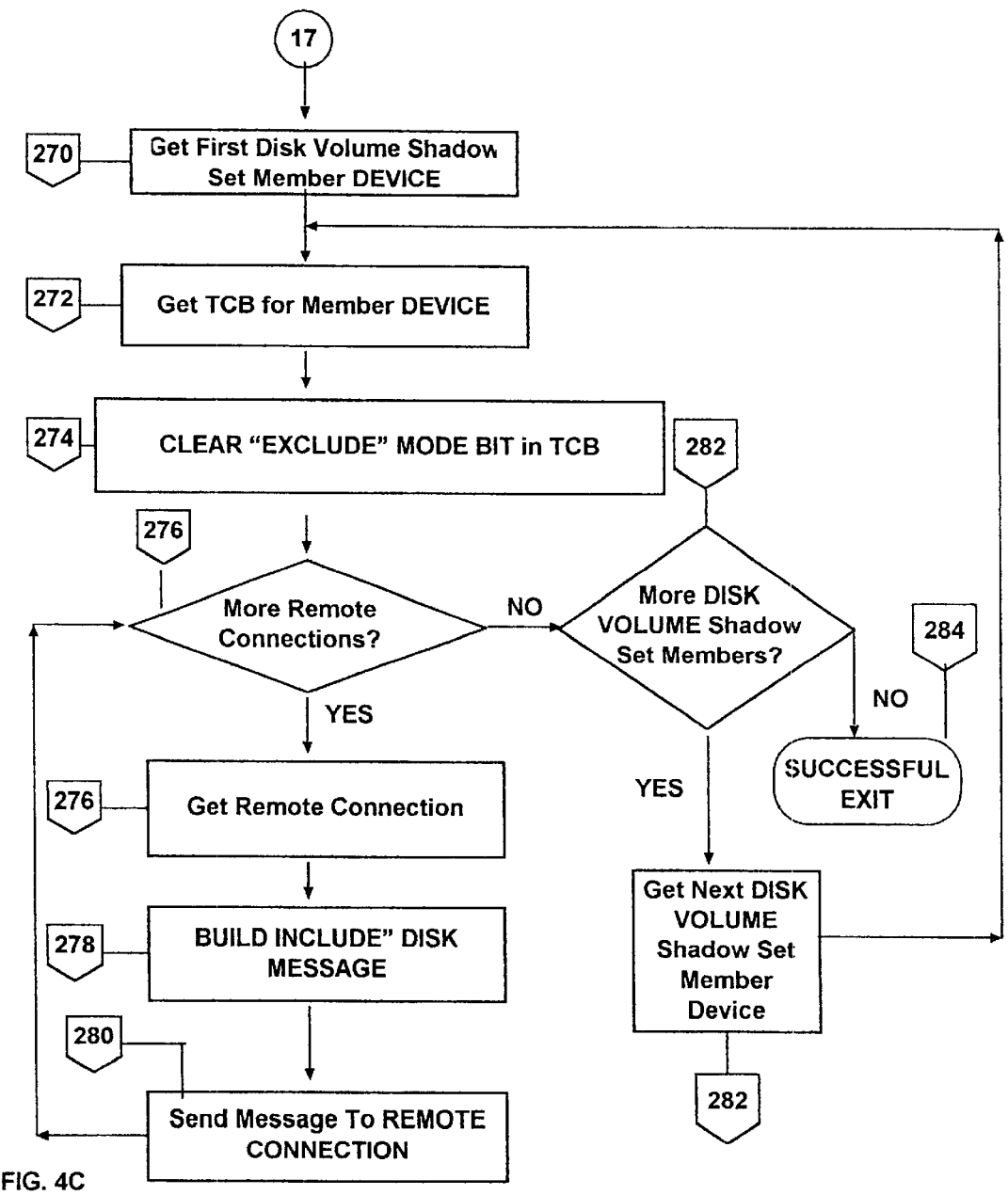

Referring to FIG. 4B, the "include disk" I/O command in the cache driver will now be described. The cache driver (10, FIG. 1A) begins at its "include disk" I/O command entry point (242). Using the disk I/O device in the "include disk" I/O command, the program gets the TCB (16, FIG. 1B) disk control structure for the disk I/O device (244). The program checks the number of disks currently cached against the maximum permitted disks (246). The maximum permitted disks that can be cached by the invention at any one time was set during a CACHE START (FIGS. 3A to 3C) function. If the current amount of disks cached by the invention are at the maximum permitted, the program exits in error (248), else the program counts this disk as one more cached by the invention (250) The TCB (16, FIG. 1B) disk control structure for the disk I/O device to be included in the cache has the 'exclude' mode bit cleared (252). Clearing the 'exclude' mode bit in the TCB for the disk I/O device will allow the disk's data to be cached, as will be seen in the description for active cache operations. The program will check if there are any remote connections to cache drivers (10, FIG. 1A) in other OpenVMS systems of a VMScluster and VAXcluster (254). If there is a remote connection, the program will build an "include disk" communications message (256) and send this message to the remote OpenVMS system (258), specified in the remote connection. The program will then loop to see if there are any more remote connections sending a communications message to each remote connection. If there were no remote connections originally, or the "include disk" communications message has been sent to each remote connection present, the program checks whether the disk I/O device being included in cache operations is part of a disk volume shadow set (260). If not the program exits (262), with the disk I/O device specified in the user CACHE DISK command being successively included in cache operations. If the disk I/O device being included is part of a disk volume shadow set (260), the program gets the name of the shadow set master device (264) from data structures for the disk I/O device from within the OpenVMS system. The program then gets the TCB (16, FIG. 1B) disk control structure for the shadow set master device (266) and clears the 'exclude' mode bit in this TCB (268). From the shadow set master device the program gets the first disk I/O device that is a member of the disk volume shadow set (270). The program locates the TCB (16, FIG. 1B) disk control structure for this disk volume set member disk I/O device (272) and clears the 'exclude' mode bit in this TCB (274). The program will check if there are any remote connections to cache drivers (10, FIG. 1A) in other OpenVMS systems of a VMScluster and VAXcluster (276). If there is a remote connection, the program will build an "include disk" communications message (278) and send this message to the remote OpenVMS system (280), specified in the remote connection. The program will then loop to see if there are any more remote connections, sending a communications message to each remote connection. If there were no remote connections originally, or the "include disk" communications message has been sent to each remote connection present the program gets the next disk I/O device that is a member of the disk volume shadow set (282). The program loops for each successive disk volume shadow set member disk I/O device, clearing the 'exclude' mode bit for each disk I/O device TCB (270–282). When all the disk volume shadow set member disk I/O devices have been dealt with, the program successfully exits (284). This procedure ensures that all members of a disk volume shadow set, including the shadow set master device, are included in cache operations whenever a single disk volume set member disk I/O device, or the shadow set master device, is named as the disk in the CACHE DISK include command, ensuring consistent cache operations for the complete disk volume shadow set.

Figure 4D:
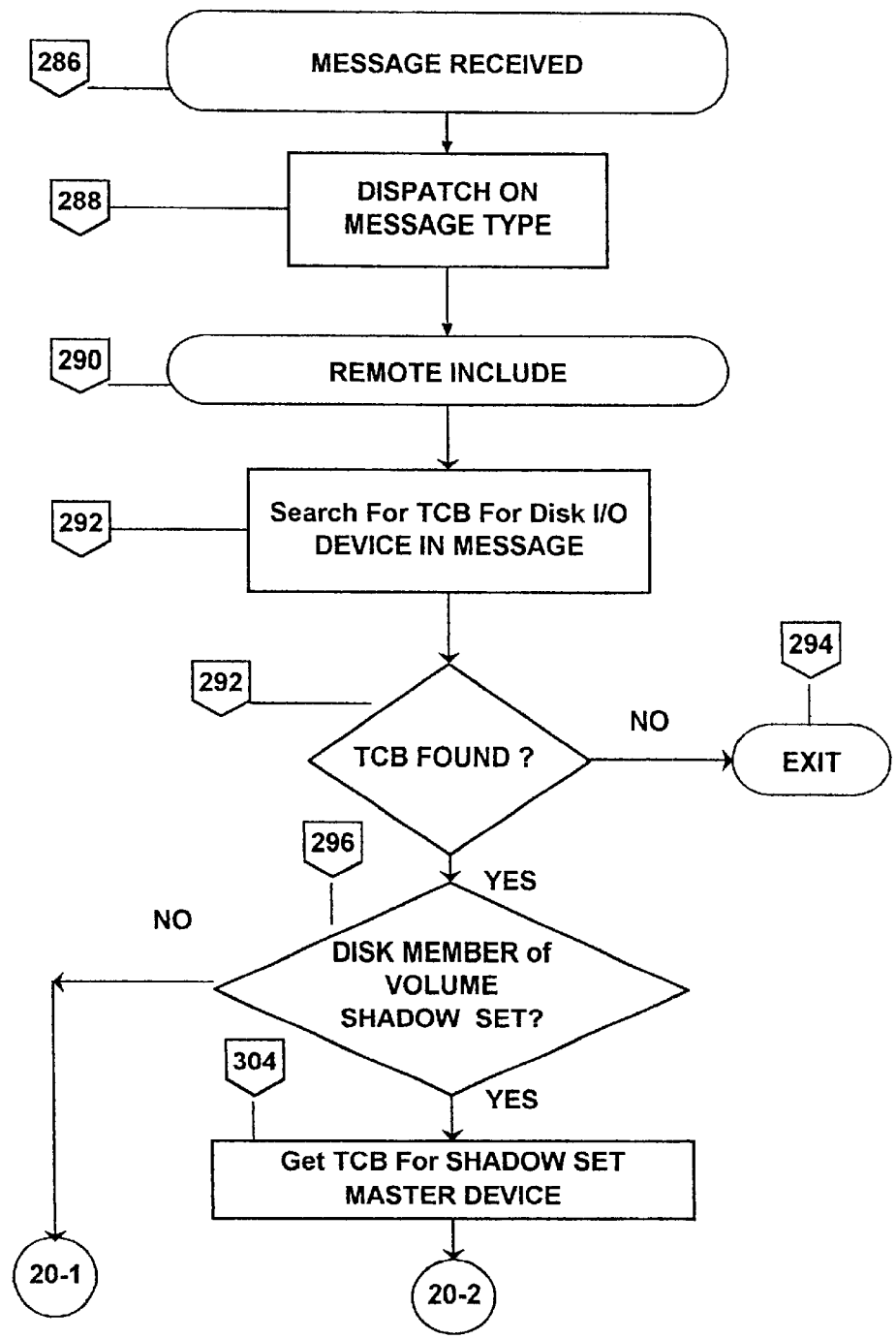
Figures 1, 4D:
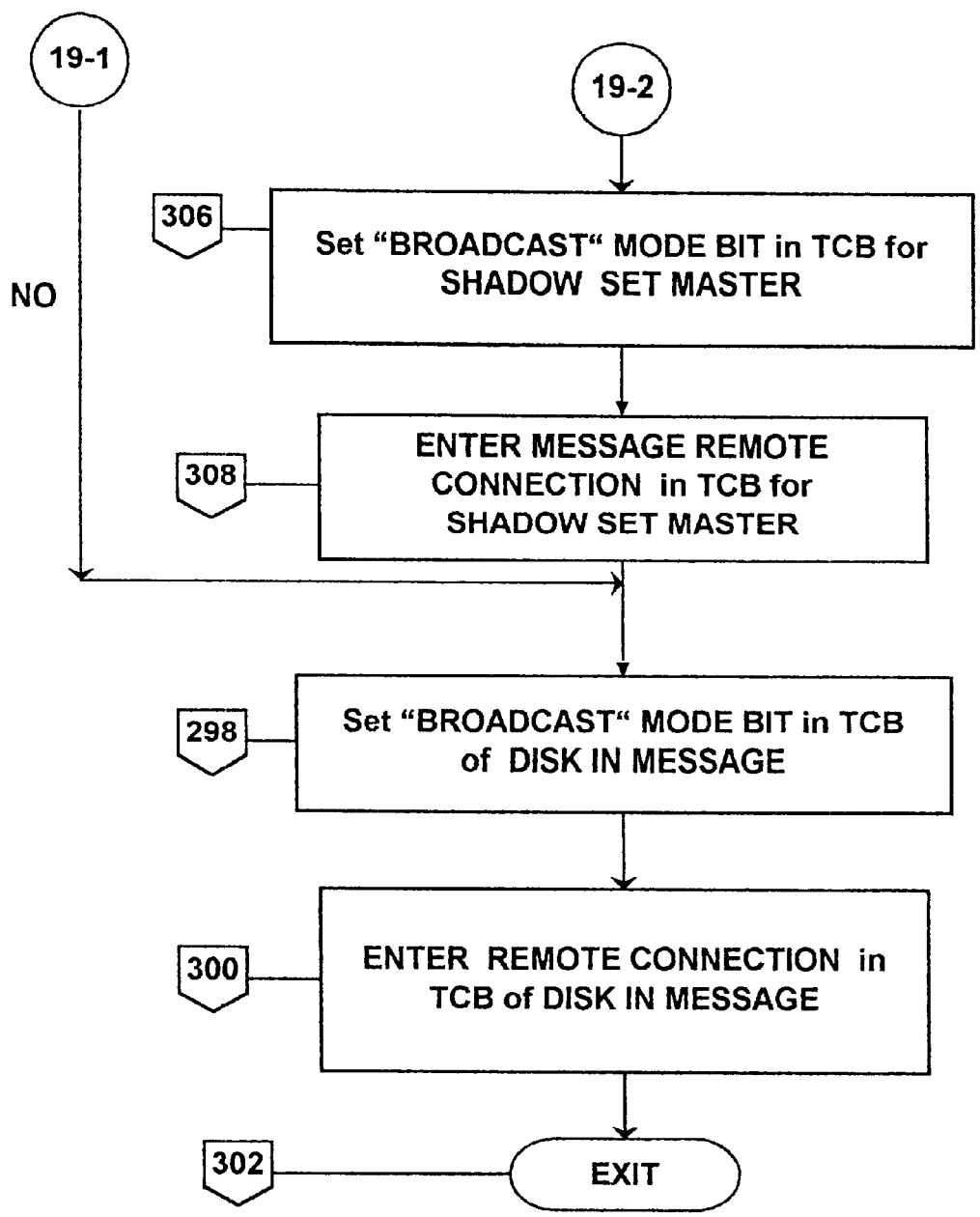

Referring to FIG. 4D, the program flow for an "include disk" message received over a remote communications channel connection will be described. For all received remote communications message the cache software of the invention will be called at the "message receive" (286) entry point. The program gets the message type from the communications message packet (288) and for an "include disk" message dispatches to the "remote include" program flow (290). The communications message contains the name of the disk I/O device being included, the program will search down all TCB (16, FIG. 1B) disk control structures within the cache driver (10, FIG. 1A) on this OpenVMS system (292) looking for a TCB for this disk I/O device. If this OpenVMS system can access the disk I/O device named in the communication message, indicated by the presence of a TCB for that disk I/O device, the program continues, else the program exits (294) and ignores the communications message. The program checks whether the disk I/O device named in the communications message is a member of a disk volume shadow set (296). If not, the program sets the 'broadcast' mode bit in the TCB (16, FIG. 1B) disk control structure for the disk I/O device named in the communications message (298), entering the remote connection address, over which the message was received, in the TCB for the disk I/O device (300). The program then exits (302). The 'broadcast' mode bit will cause the cache software of the invention to communicate to all remote connection addresses, found within the TCB (16, FIG. 1B) disk control structure, any write I/O data operations to the disk I/O device from this OpenVMS system. This will ensure that the cache drivers (10, FIG. 1A), on those remote connections, that have the disk I/O device included in their cache operations maintain a consistent view of the data within their cache. This is described further within the "active cache operations" FIGS. 5A to 5P. If the disk I/O device named in the communications message is a member of a disk volume shadow set (296), the program gets the TCB (16, FIG. 1B) disk control structure for the shadow set master device (304). The 'broadcast' mode bit is set (306) in the shadow set master device (TCB). The remote connection address over which the message was received is entered in the TCB for the shadow set master device (308), before proceeding with the TCB for the disk I/O device (298) as described above.

Referring back to FIG. 4A, the program flow for a CACHE DISK command that excludes a disk from cache operations will now be described. The user CACHE command interface (34, FIG. 1A), having processed the CACHE DISK command for an exclude function would send an "exclude disk" I/O command (228) to the cache driver (10, FIG. 1A), specifying the name of the disk I/O device to be excluded from the active cache operations of the invention.

Figure 4E:
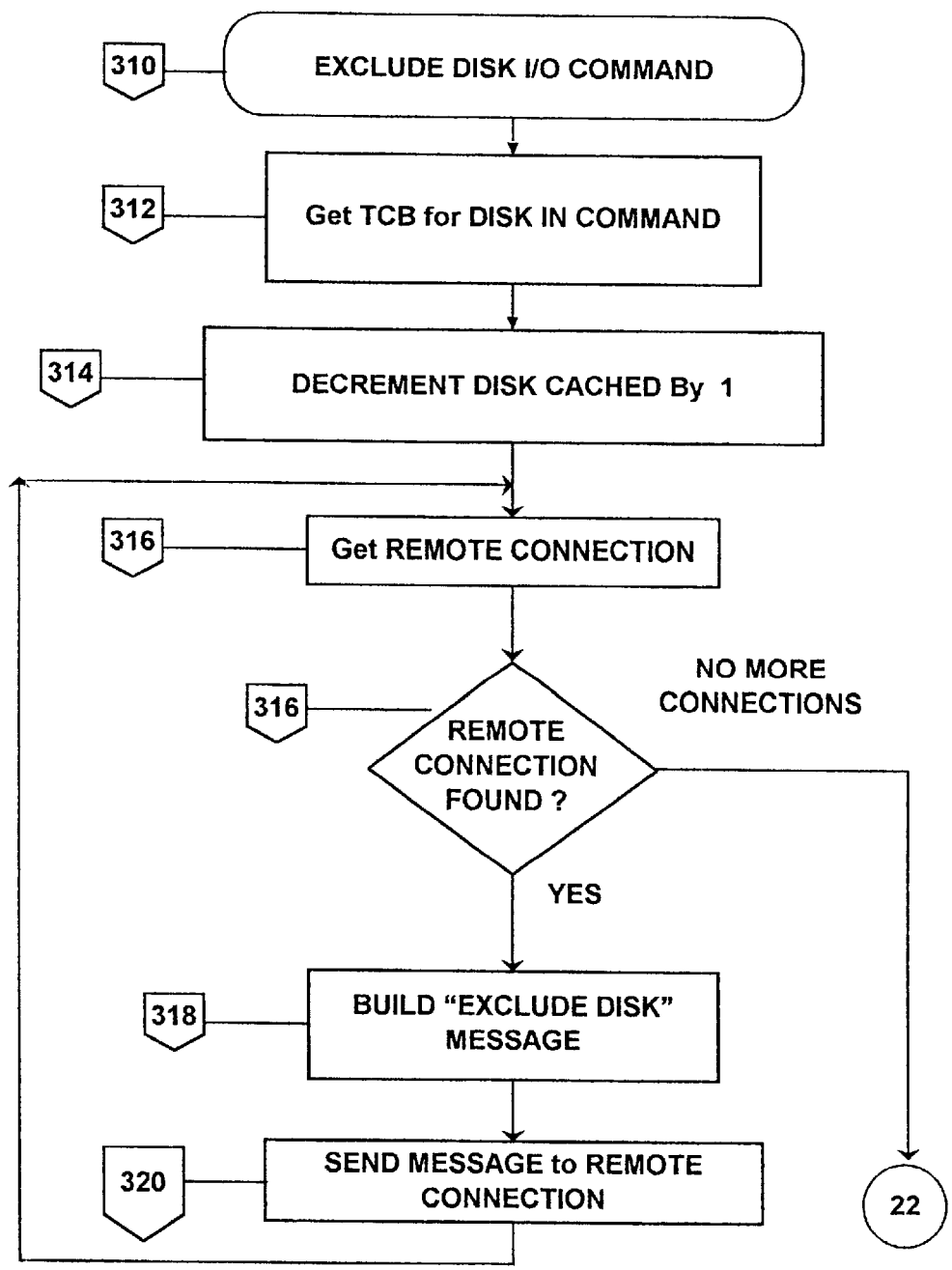
Figures 1, 4E:
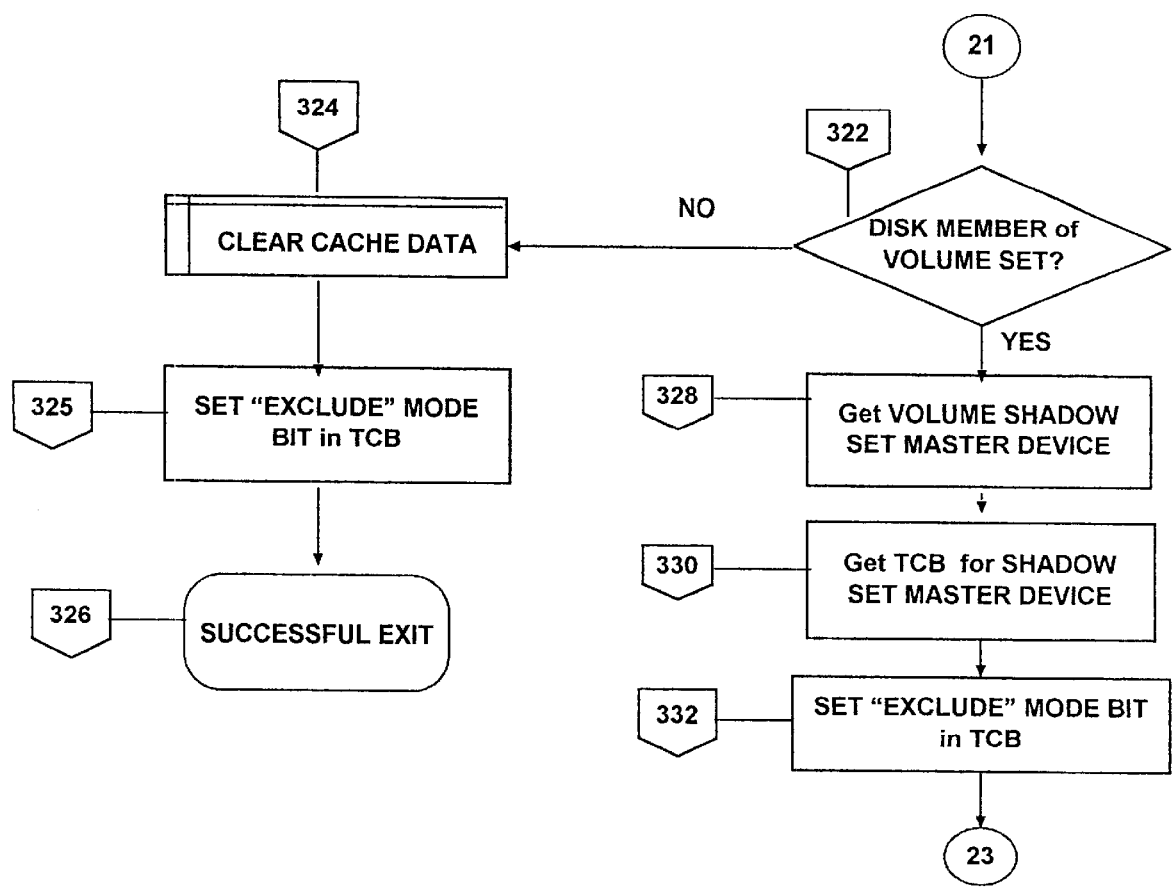
Figure 4F:
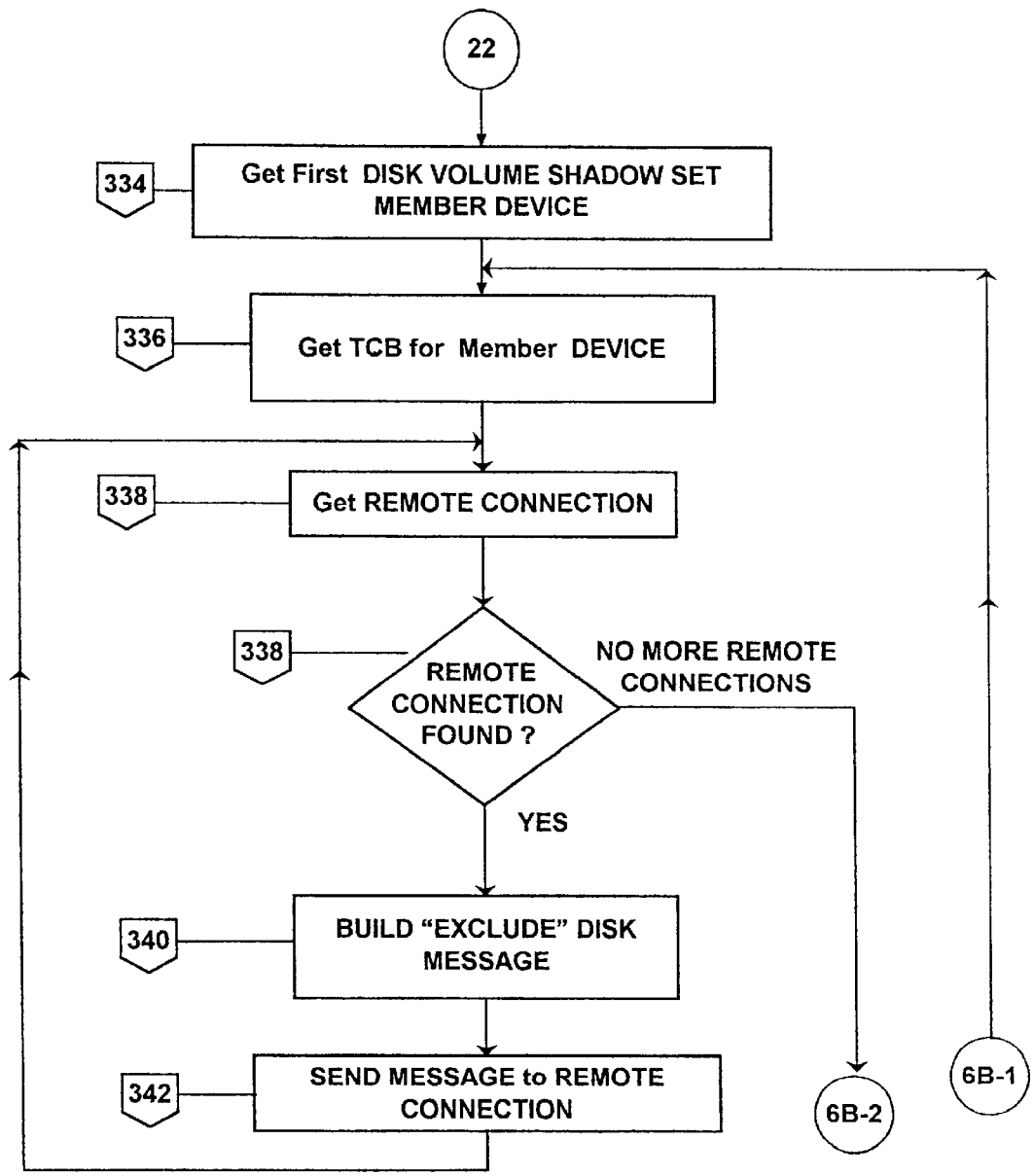
Figures 1, 4F:
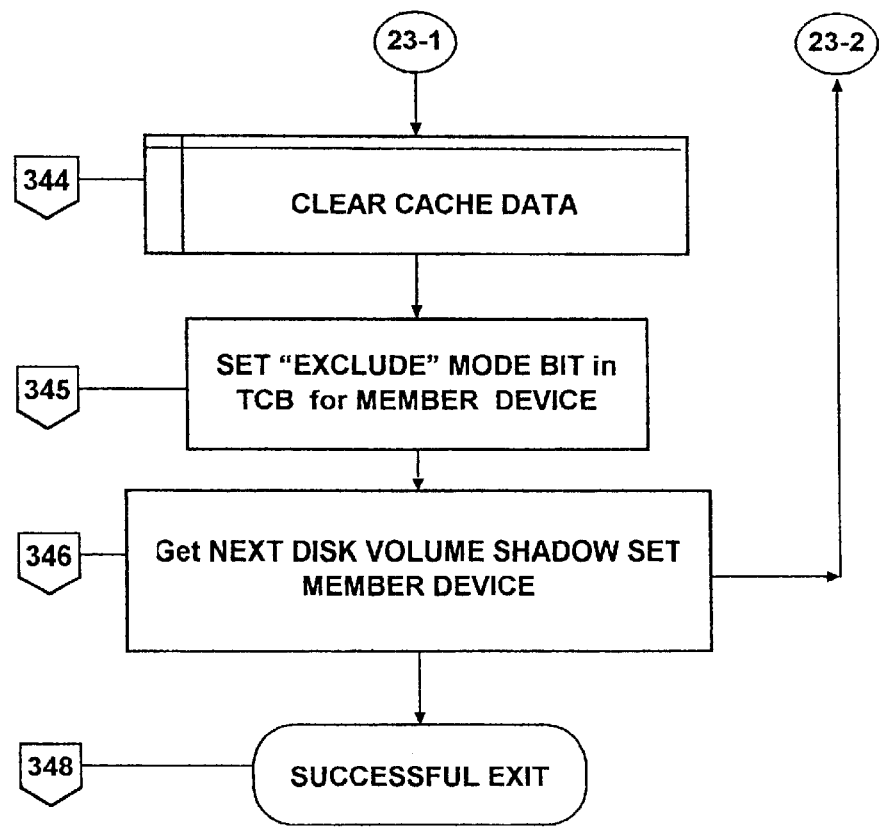

Referring now to FIG. 4E, the "exclude disk" I/O command in the cache driver will now be described. The cache driver (10, FIG. 1A) begins at its "exclude disk" I/O command entry point (310). Using the disk I/O device in the "exclude disk" I/O command, the program gets the TCB (16, FIG. 1A) disk control structure for the disk I/O device (312). The program reduces the number of disks currently cached by one (314). The program will check if there are any remote connections to cache drivers (10, FIG. 1A) in other OpenVMS systems of a VMScluster and VAXcluster (316). If there is a remote connection, the program will build an "exclude disk" communications message (318) and send this message to the remote OpenVMS system (320), specified in the remote connection. The program will then loop to see if there are any more remote connections, sending a communications message to each remote connection. If there were no remote connections originally, or the "exclude disk" communications message has been sent to each remote connection present, the program checks whether the disk I/O device being excluded from cache operations is part of a disk volume shadow set (322). If not, the program calls the routine "clear cache data" (350, FIG. 4G) to remove any cached data for the disk I/O device being excluded (324). On return the program sets the 'exclude' mode bit within the TCB (325) for the disk I/O device and then successfully exits (326). By setting the 'exclude' mode bit in the TCB (16, FIG. 1B) disk control structure, the disk I/O device will have its I/O data excluded from being cached by the invention. If the disk I/O device being excluded from the active cache operations of the invention was a member of a disk volume shadow set (322), the program gets the name of the shadow set master device (328) using data structures within the OpenVMS system. The program then gets the TCB (16, FIG. 1B) disk control structure for the shadow set master device (330) and sets the 'exclude' mode bit within that TCB (332). The program gets the first disk volume shadow set member device (334) using data structures within the OpenVMS system. The TCB (16, FIG. 1B) disk control structure for this shadow member disk I/O device is located (336). The program will check if there are any remote connections to cache drivers (10, FIG. 1A) in other OpenVMS systems of a VMScluster and VAXcluster (338). If there is a remote connection, the program will build an "exclude disk" communications message (340) and send this message to the remote OpenVMS system (342), specified in the remote connection. The program will then loop to see if there are any more remote connections, sending a communications message to each remote connection. If there were no remote connections originally, or the "exclude disk" communications message has been sent to each remote connection present, the program calls (344) the routine "clear cache data" (350, FIG. 4G) to remove any cached data for the shadow set member disk I/O device being excluded. On return the program sets the 'exclude' mode bit in the TCB (16, FIG. 1B disk control structure for the disk volume shadow set member (345). The program gets the next shadow set member disk I/O device (346) and loops (336), sending the "exclude disk" communications message to all remote OpenVMS systems that can access this device and clears the data for this disk I/O device from the cache, using the routine "clear cache data". When the program has dealt with all the disk volume shadow set members the program successfully exits (348). The cache software of the invention ensures a consistent view for a disk volume shadow set, by excluding all members of a disk volume shadow set whenever a single shadow set member disk I/O device is excluded.

Figure 4G:
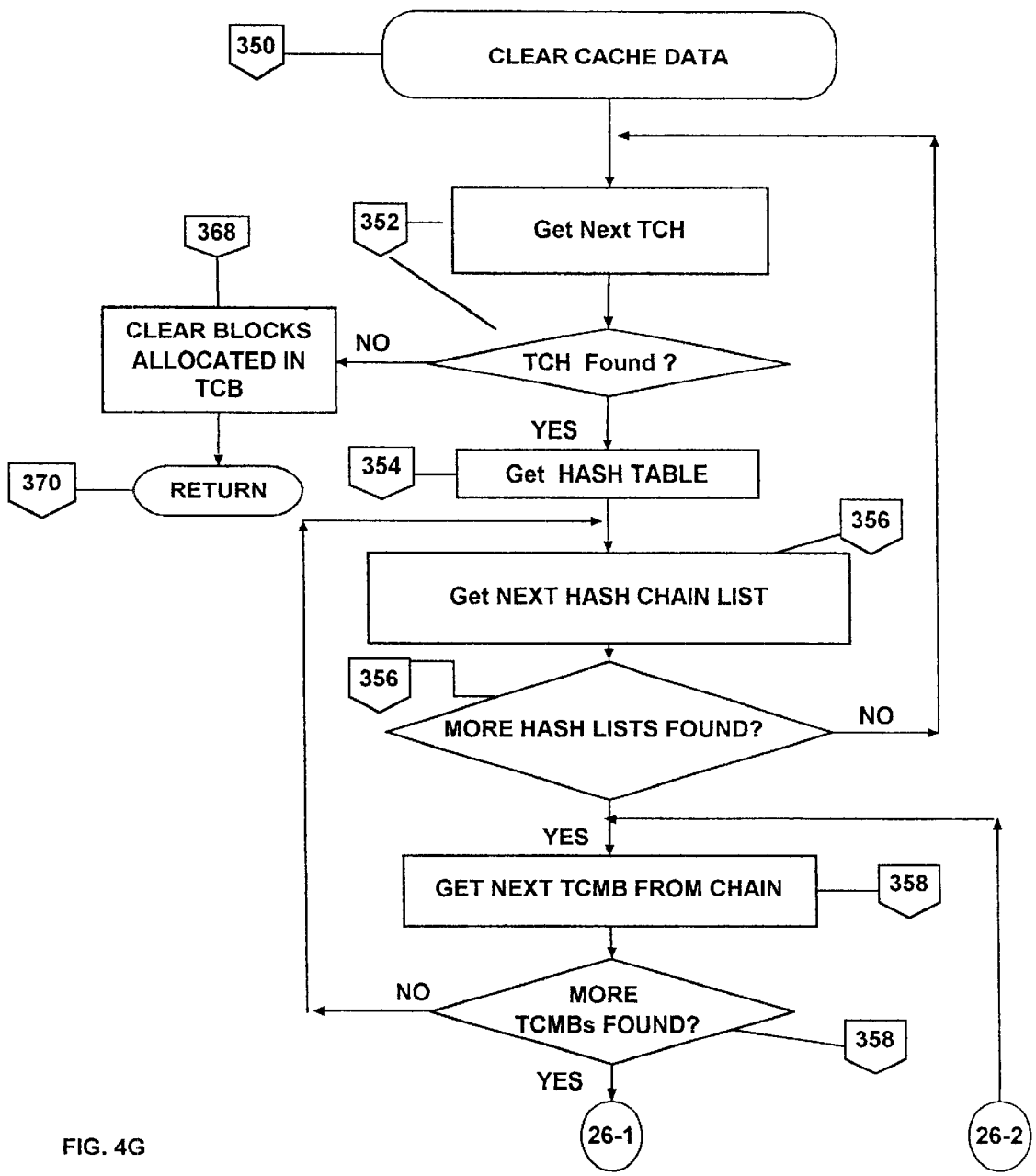
Figures 1, 4G:
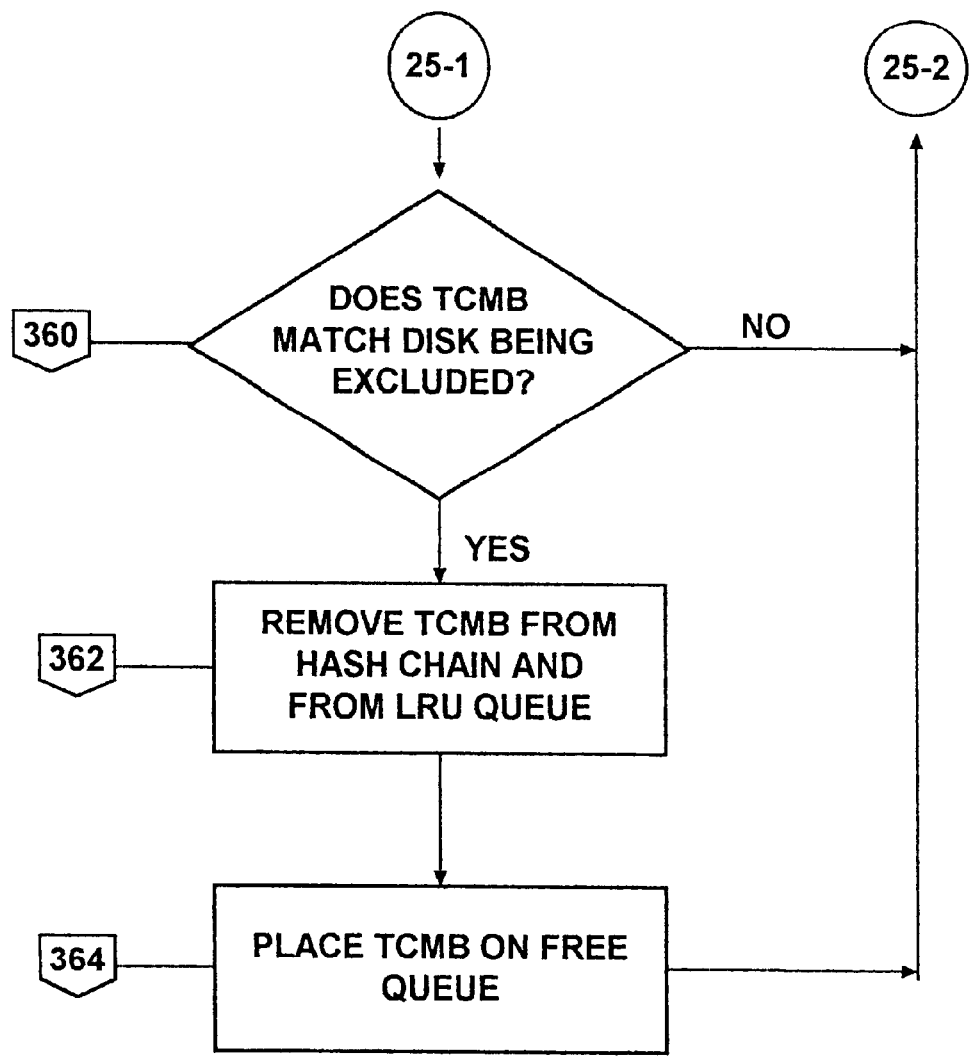

Referring to FIG. 4G, the program flow for the "clear cache data" (350) routine will now be described. The program gets the next—TCH (26, FIG. 1A) cache control structure for the three caches, small, medium, and large, of the invention (352). At this point, this Will be the first TCH in the cache driver (10, FIG. 1A) of the invention. The program gets the disk block value hash table (30, FIG. 1A) for this TCH (354). The disk block value hash table consists of a list of singularly linked lists of TCMB (24, FIG. 1A) bucket control structures with associated cache data buckets (22, FIG. 1B) contained in the cache RAM (20, FIG. 1B). The program gets the next list entry in the disk block value hash table (356) and gets the next TCMB in that list entry (358). If there are no TCMB's in this list, or the program has reached the end of the list, the program loops to get the next list entry in the disk value hash table (356), until the program has dealt with all the list entries in the disk value hash table, when the program loops to get the next TCH (352). When the program locates a TCMB (24, FIG. 1A) bucket control structure in the disk value hash table (30, FIG. 1A), the program checks whether the disk I/O device being excluded from the cache operations if the invention is associated with this TCMB (360). If not, the program loops the get the next TCMB in the list (358). When the program finds a TCMB (24, FIG. 1A) bucket control structure associated with the disk I/O device being excluded from the cache operations of the invention, the program removes the TCMB from the list entry within the disk value hash table (362) and removes the TCMB from the LRU queue (28, FIG. 1A) of TCMB's. The TCMB (24, FIG. 1A) bucket control structure is then placed on the free queue (27, FIG. 1A) of TCMB's (364). The program then loops to deal with the next TCMB from the list entry in the disk value hash table (358). When all three TCH (26) cache control structures for the three caches, small, medium, and large, of the invention have been operated upon, the program clears the disk block allocated count within the TCB (368) and then returns to the caller of the "clear cache data" routine (370). This disk block allocation count, within the TCB, is both used as a performance monitor value and as an indicator that the disk I/O device, associated with this TCB, owns some cache data buckets (22, FIG. 1B) contained in the cache RAM (20, FIG. 1B).

Figure 4H:
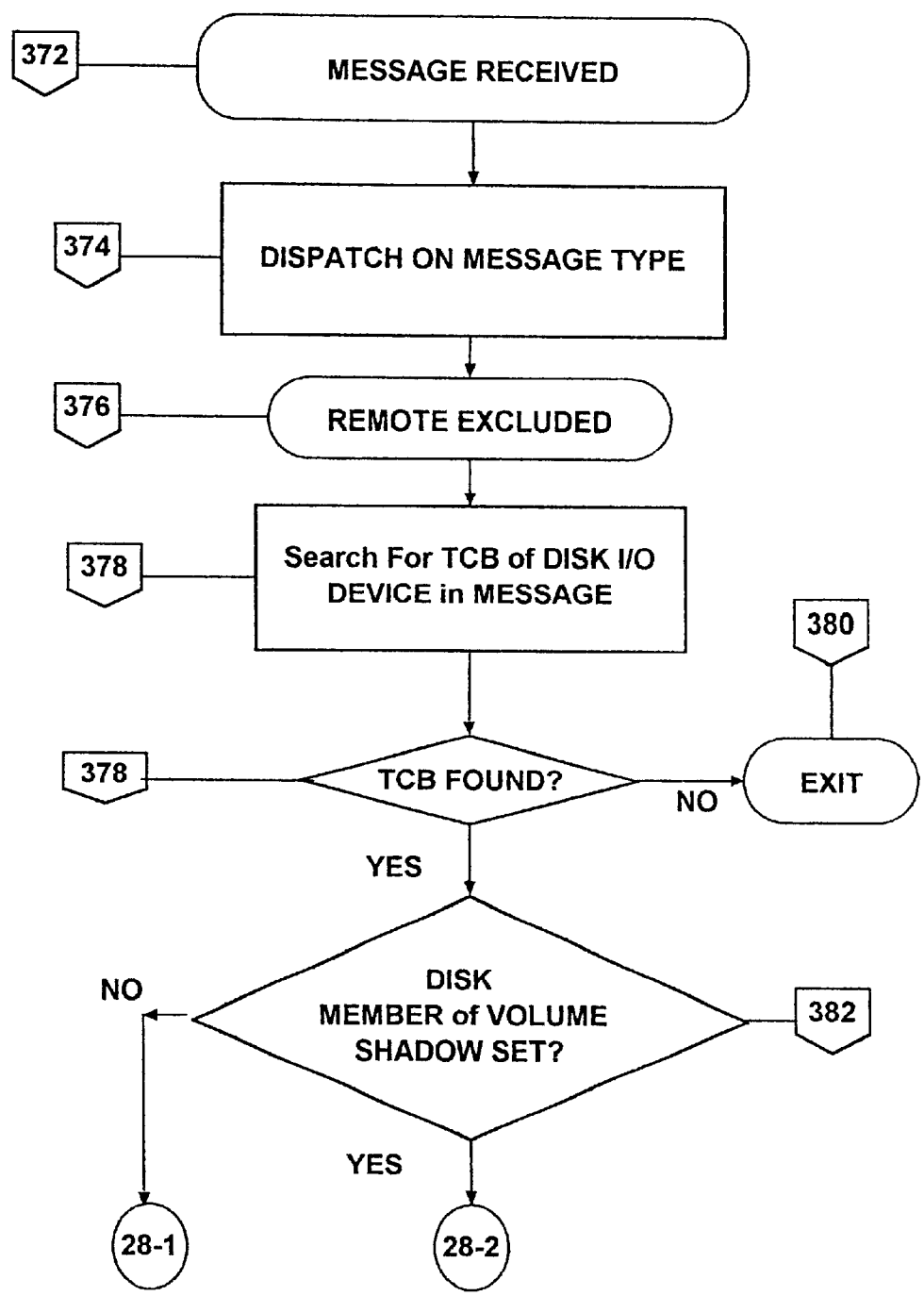
Figures 1, 4H:
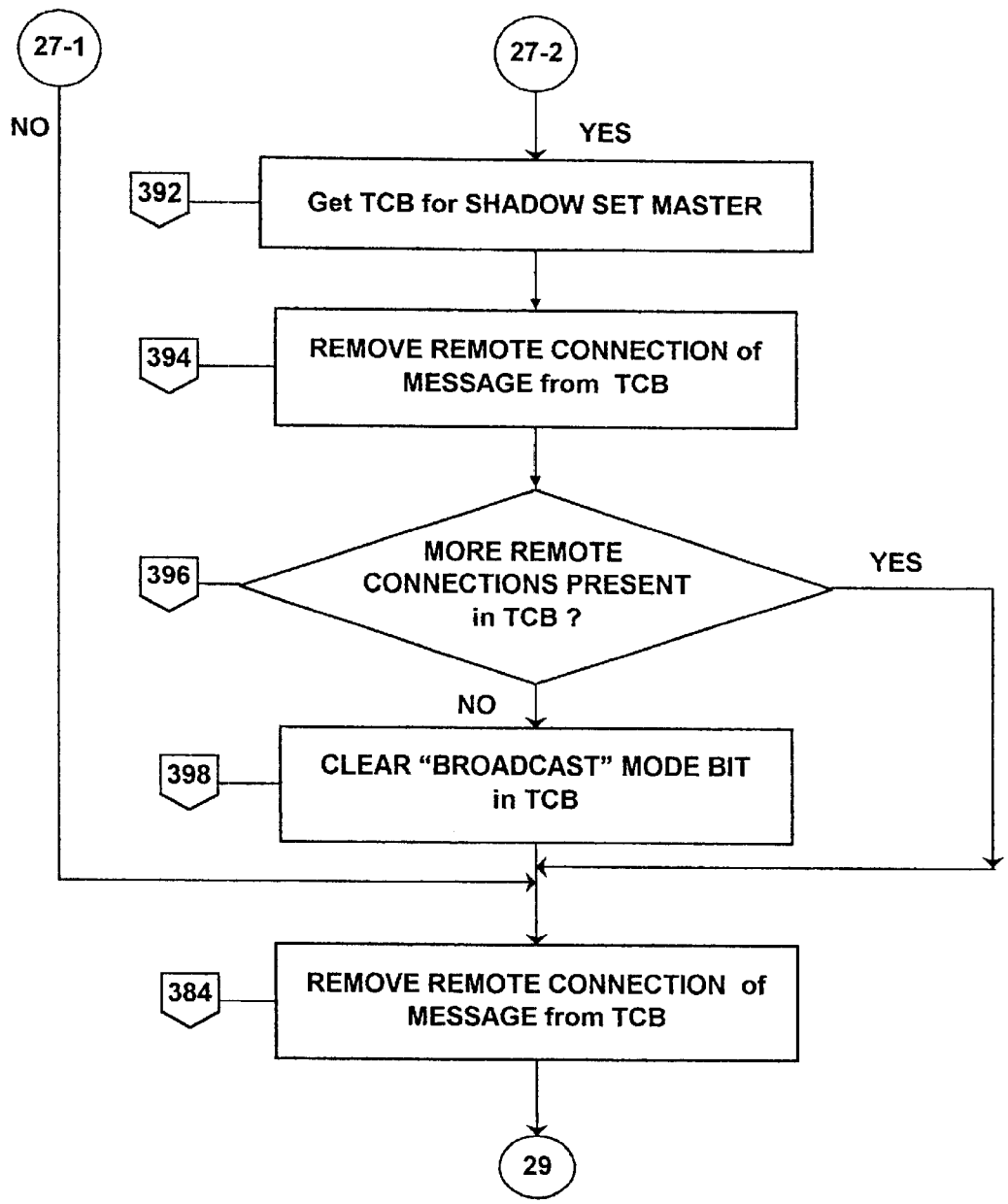
Figures 2, 4H:
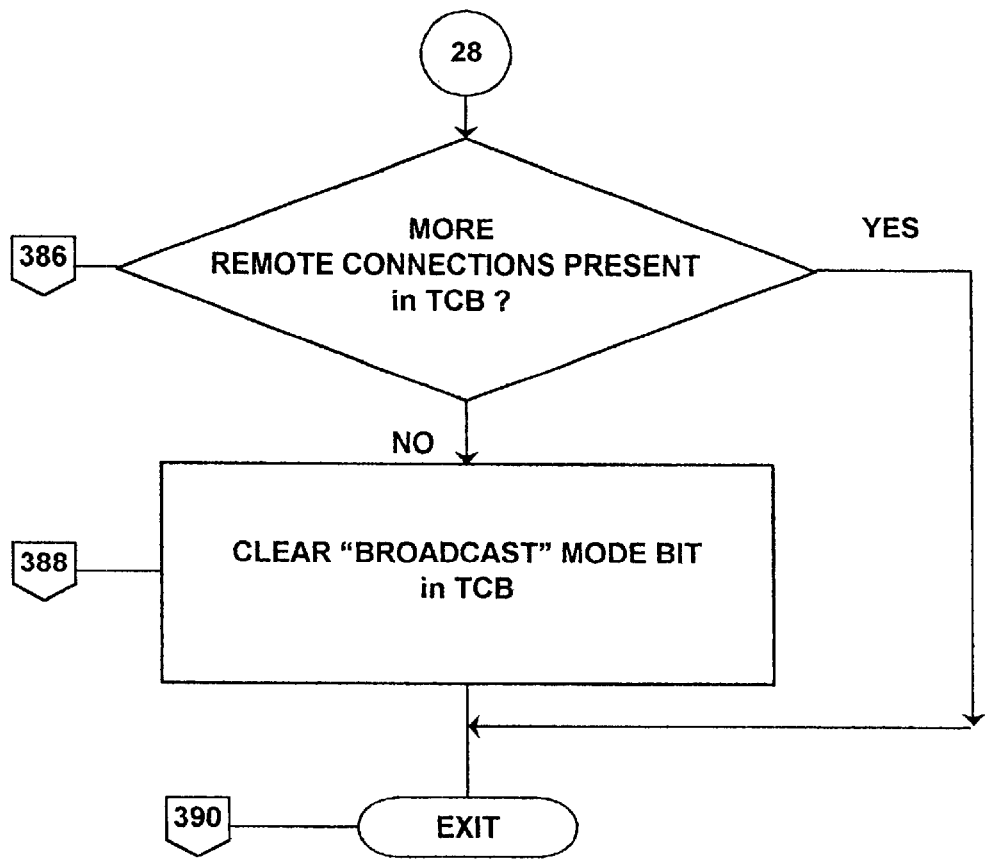

Referring to FIG. 4H, the program flow for an "exclude disk" message received over a remote communications channel connection will be described. For all received remote communications message the cache software of the invention will be called at the "message receive" (372) entry point. The program gets the message type from the communications message packet (374) and for en 'exclude disk' message dispatches to the "remote exclude" program flow (376). The communications message contains the name of the disk I/O device being excluded, the program will search down all TCB (16, FIG. 1B) disk control structures within the cache driver (10, FIG. 1A) on this OpenVMS system (378) looking for a TCB for this disk I/O device. If this OpenVMS system can access the disk I/O device named in the communication message, indicated by the presence of a TCB for that disk I/O device, the program continues, else the program exits (380) and ignores the communications message. The program checks whether the disk I/O device named in the communications message is a member of a disk volume shadow set (382). If not, the program deletes the remote connection address, over which the message was received, from the TCB for the disk I/O device (384). If the TCB for the disk I/O device contains other remote connection addresses (386), the program exits (390), indicating that other remote OpenVMS systems can access the device and have the disk I/O device included in their active cache operations of the invention. If the TCB for the disk I/O device now contains no more remote connection addresses (386), the program clears the 'broadcast' mode bit in this TCB (388) before exiting (390). The 'broadcast' mode bit of the TCB was described above in the "remote include" (290, FIG. 4D) program flow. If the disk I/O device named in the 'exclude disk' communications message was a member of a disk volume shadow set (382), the program gets the TCB (16, FIG. 1B) disk control structure for the shadow set master device (392). As with the disk I/O device named in the 'exclude disk' message described above, the program deletes the remote connection address, over which the message was received, from the TCB for the shadow set master device (394). If there are no other remote connection addresses present in the TCB for the shadow set master device (396), the program clears the 'broadcast' mode in the TCB for the shadow set master device (398), else the 'broadcast' mode bit is left set. The program continues to deal with the TCB for the disk I/O device named in the 'exclude disk' message (384).

Figure 5A:
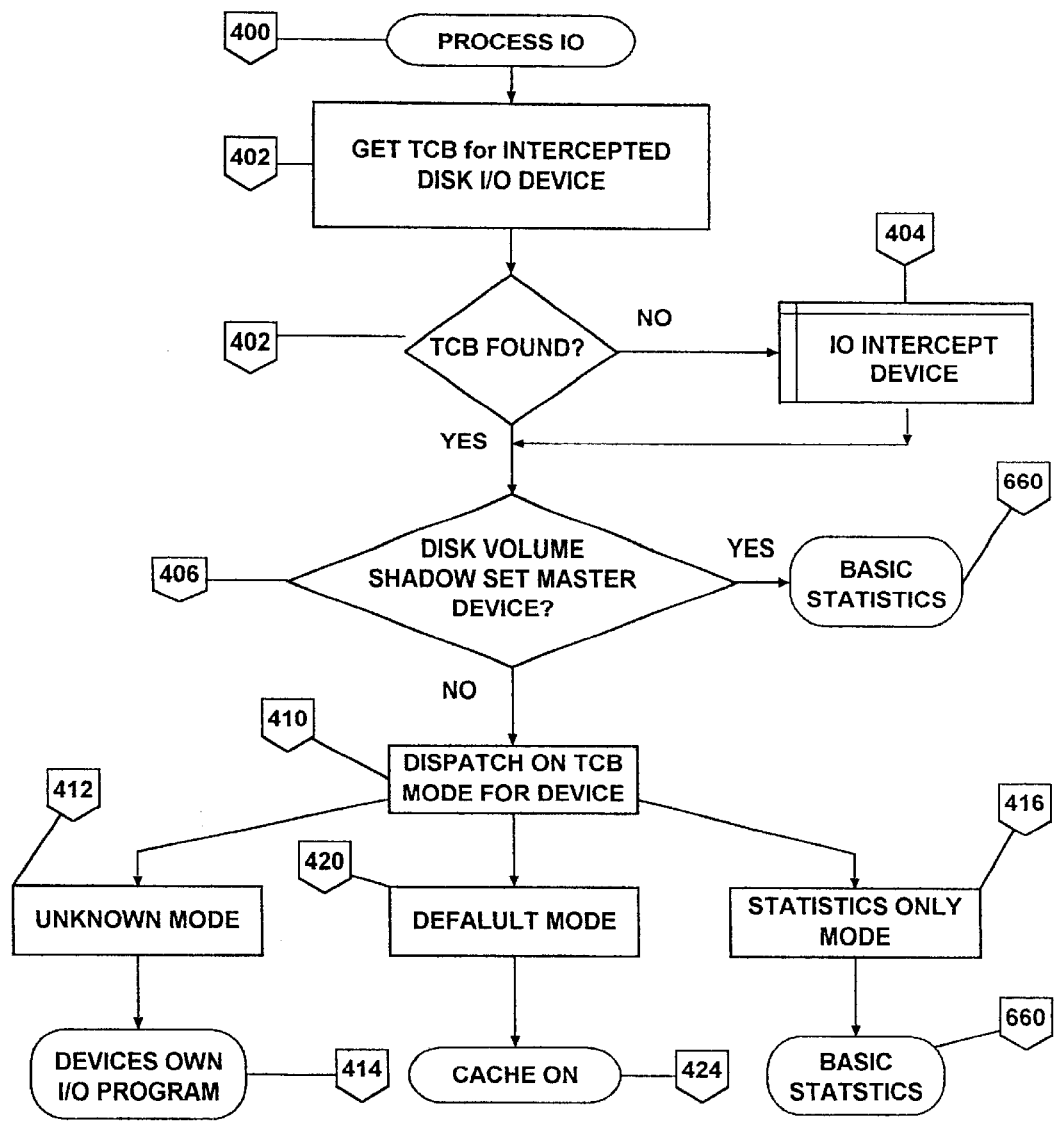
FIGS. 5A to 5P are flow diagrams on the program steps performed by the active data caching of a disk I/O device in the cache software of the invention.
Figure 5B:
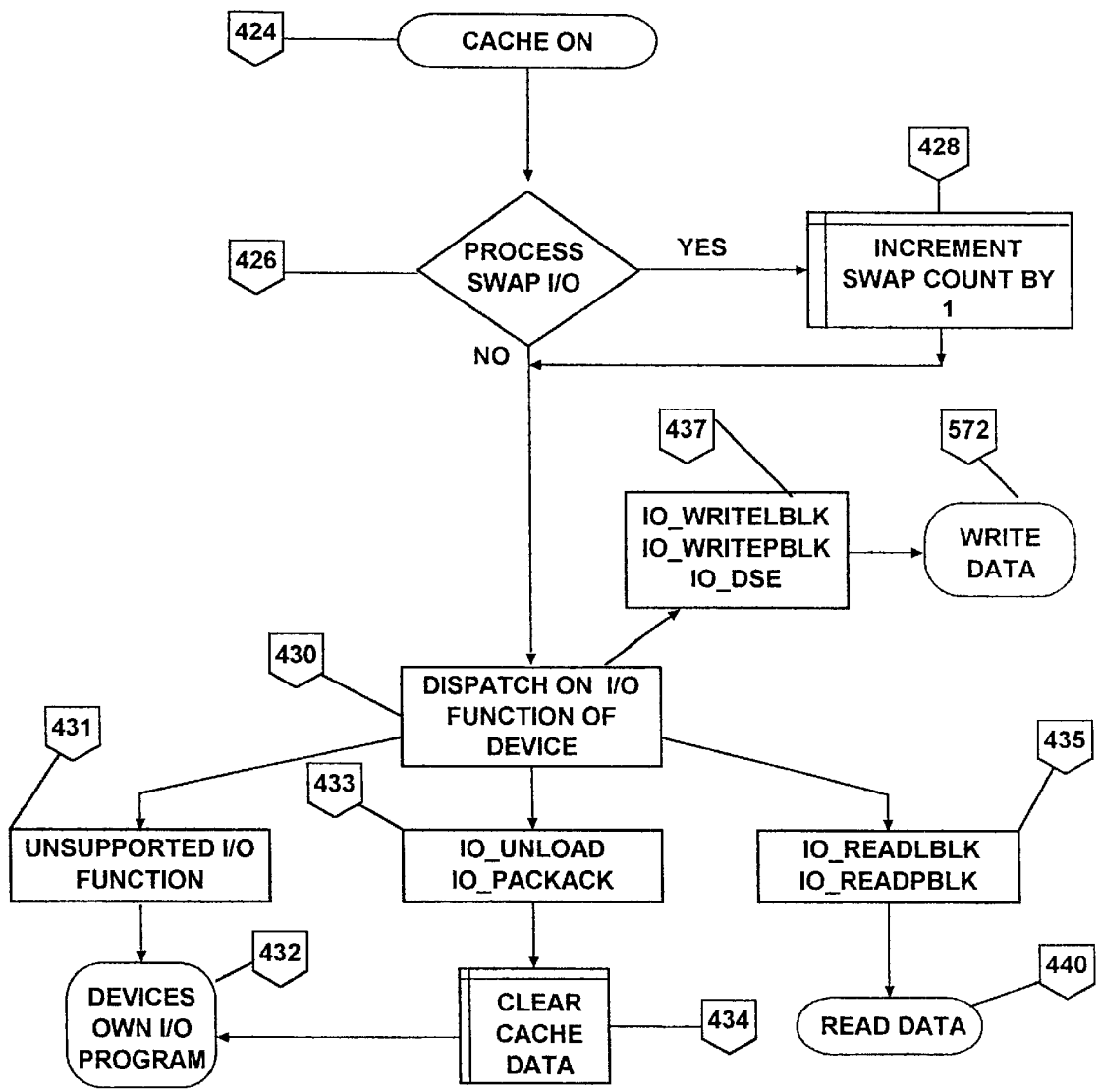
Figure 5C:
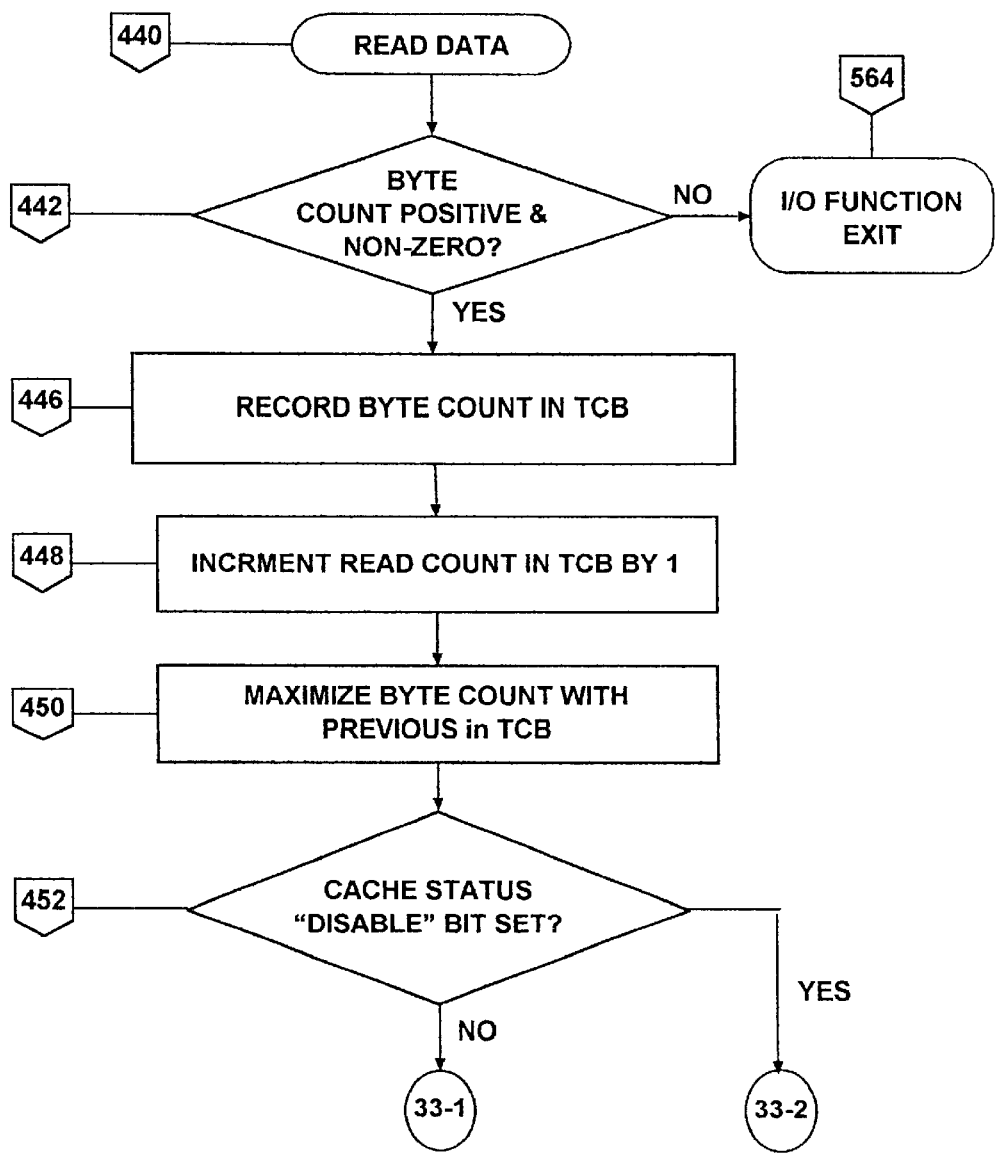
Figures 1, 5C:
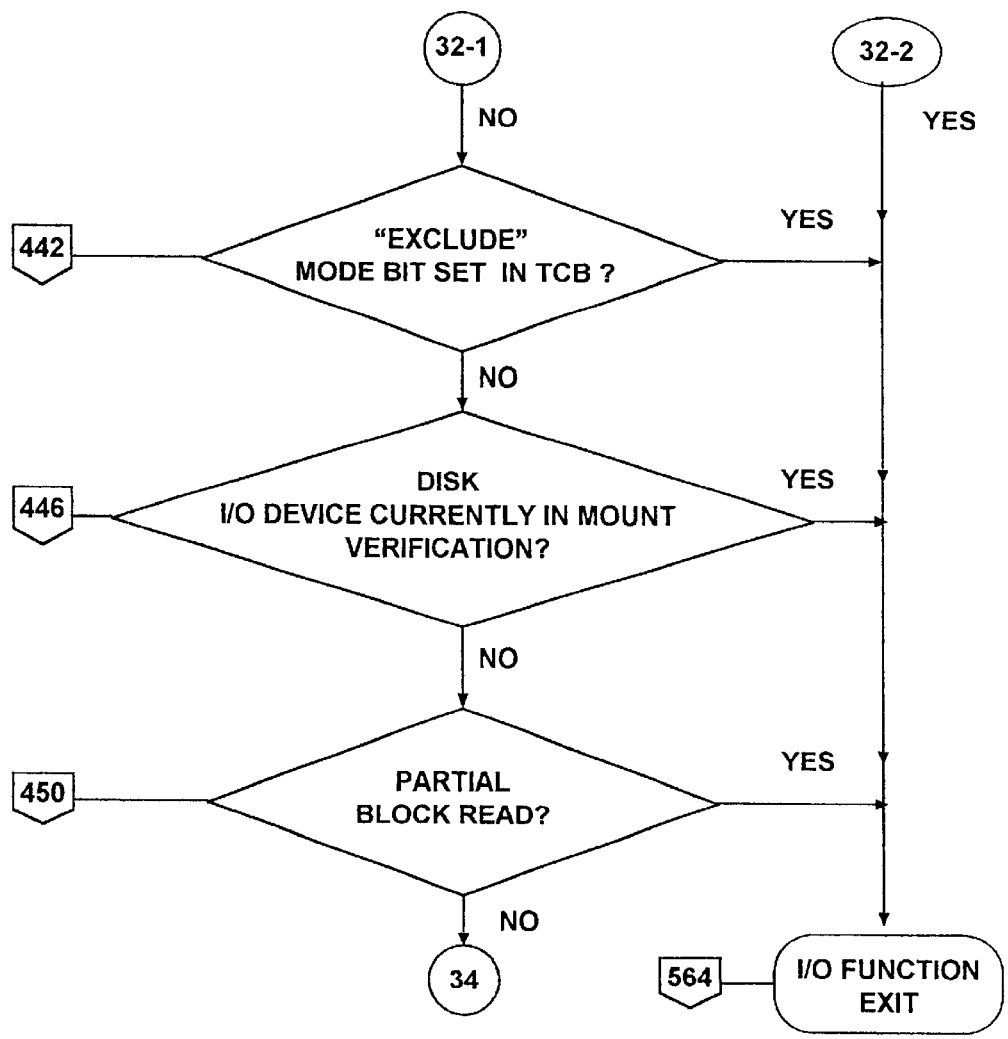
Figure 5D:
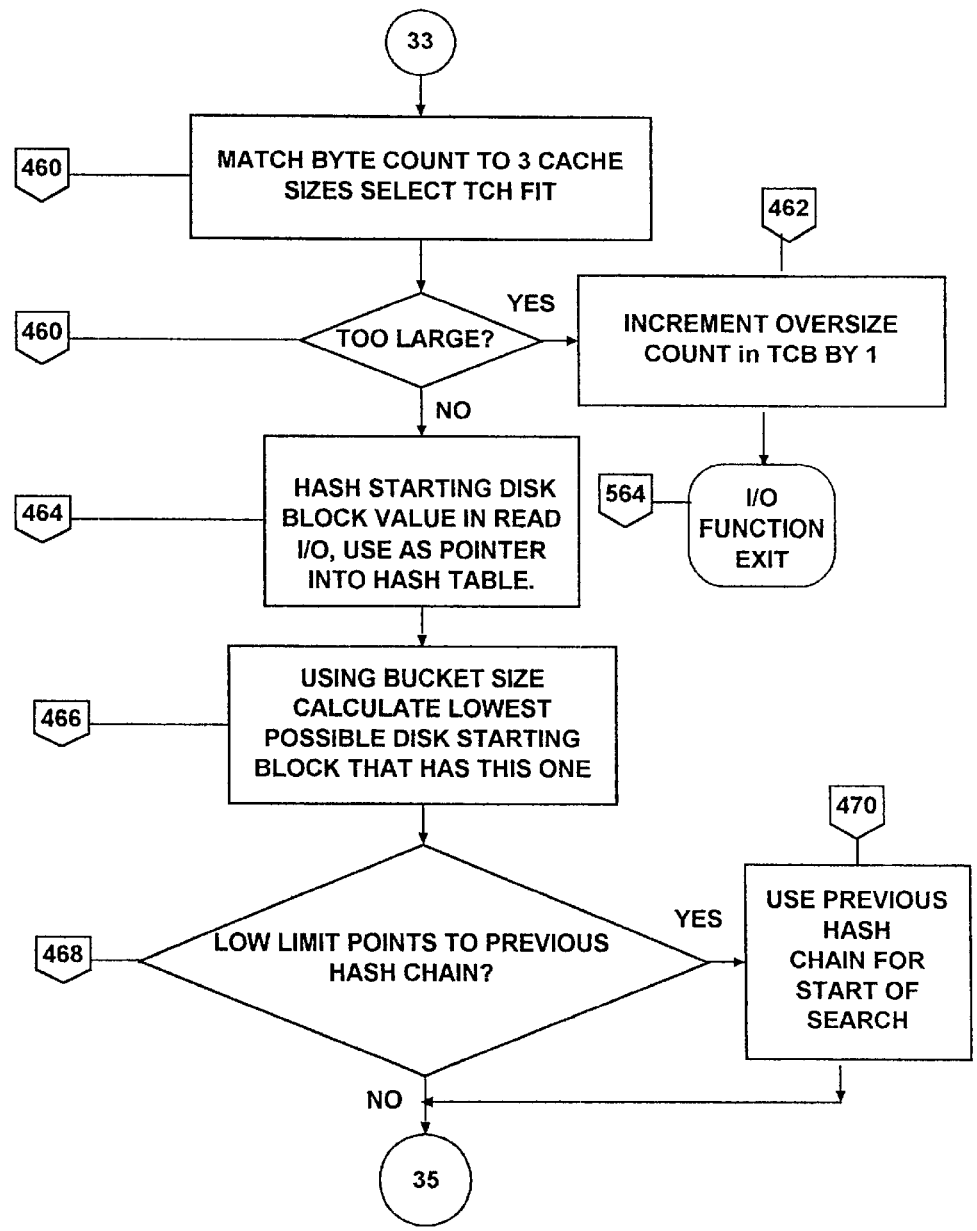
Figure 5E:
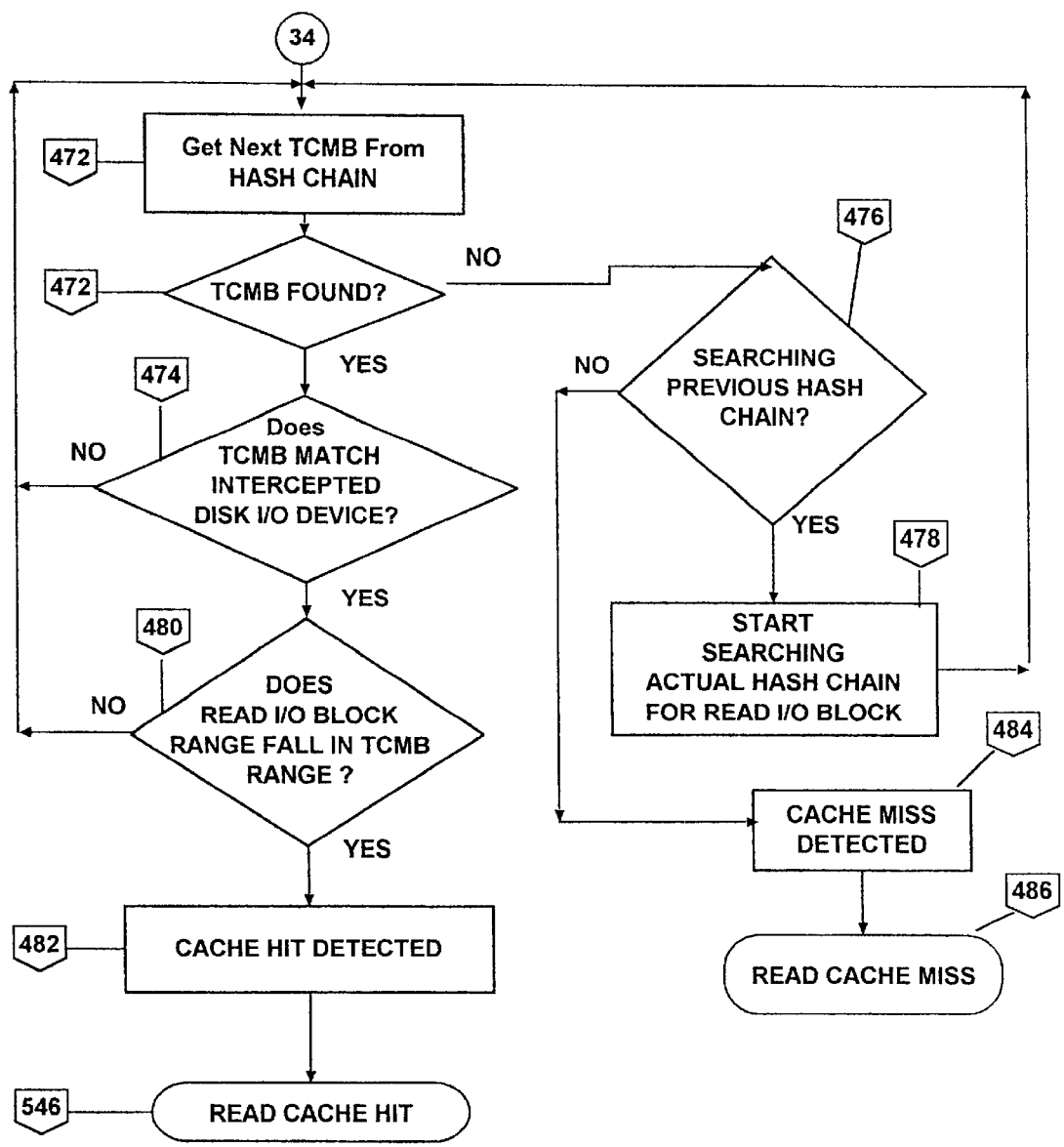
Figure 5F:
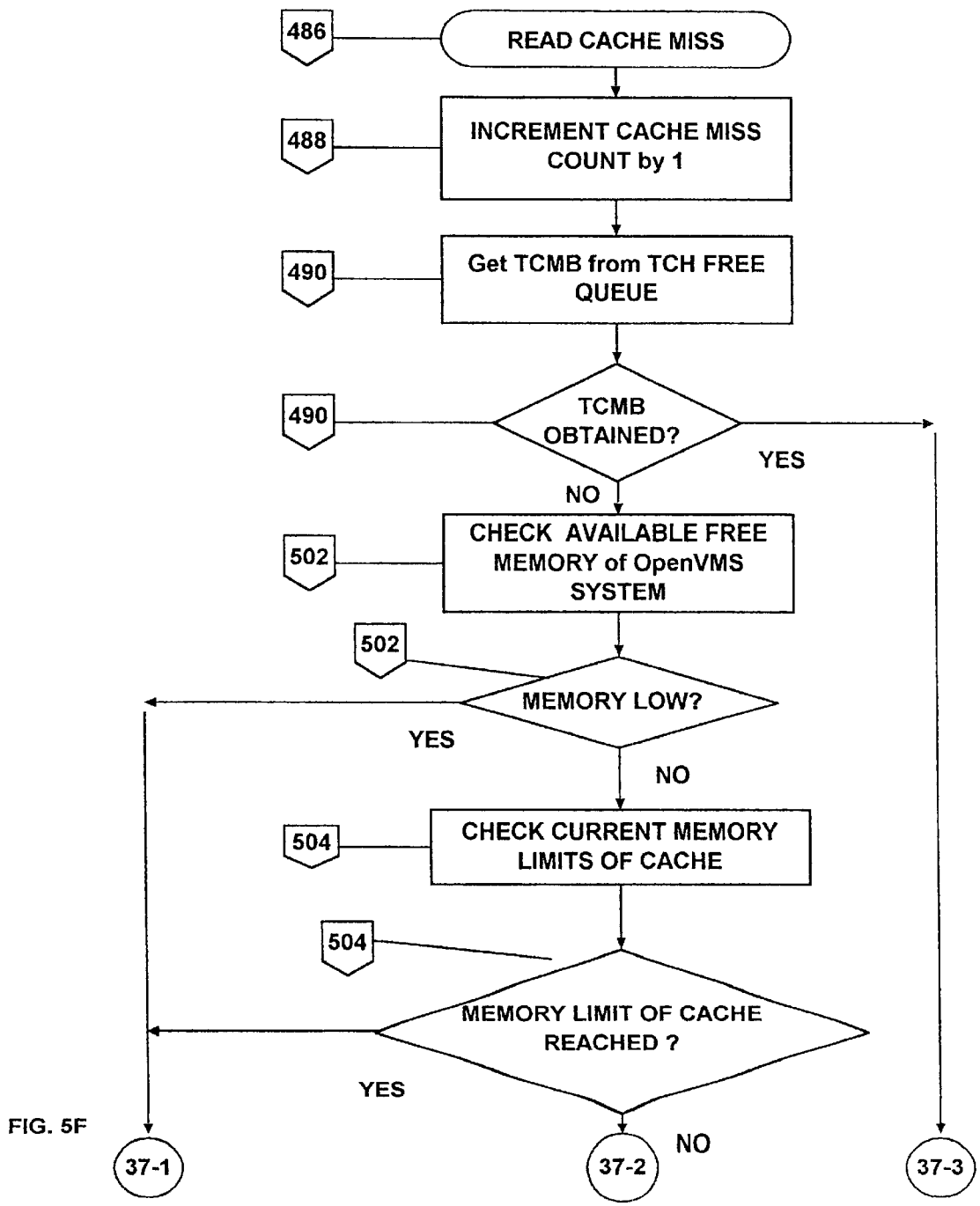
Figures 1, 5F:
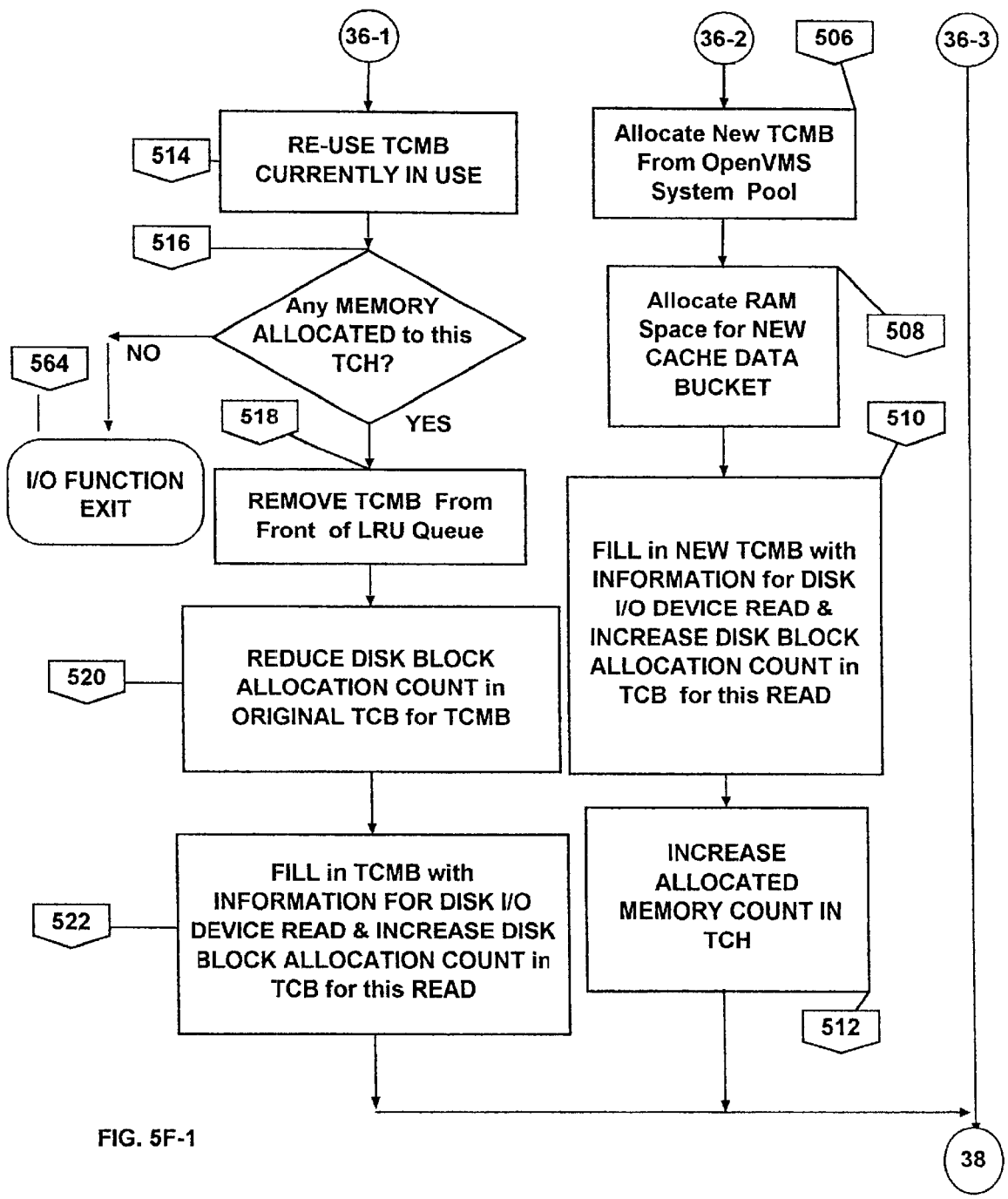
Figure 5G:
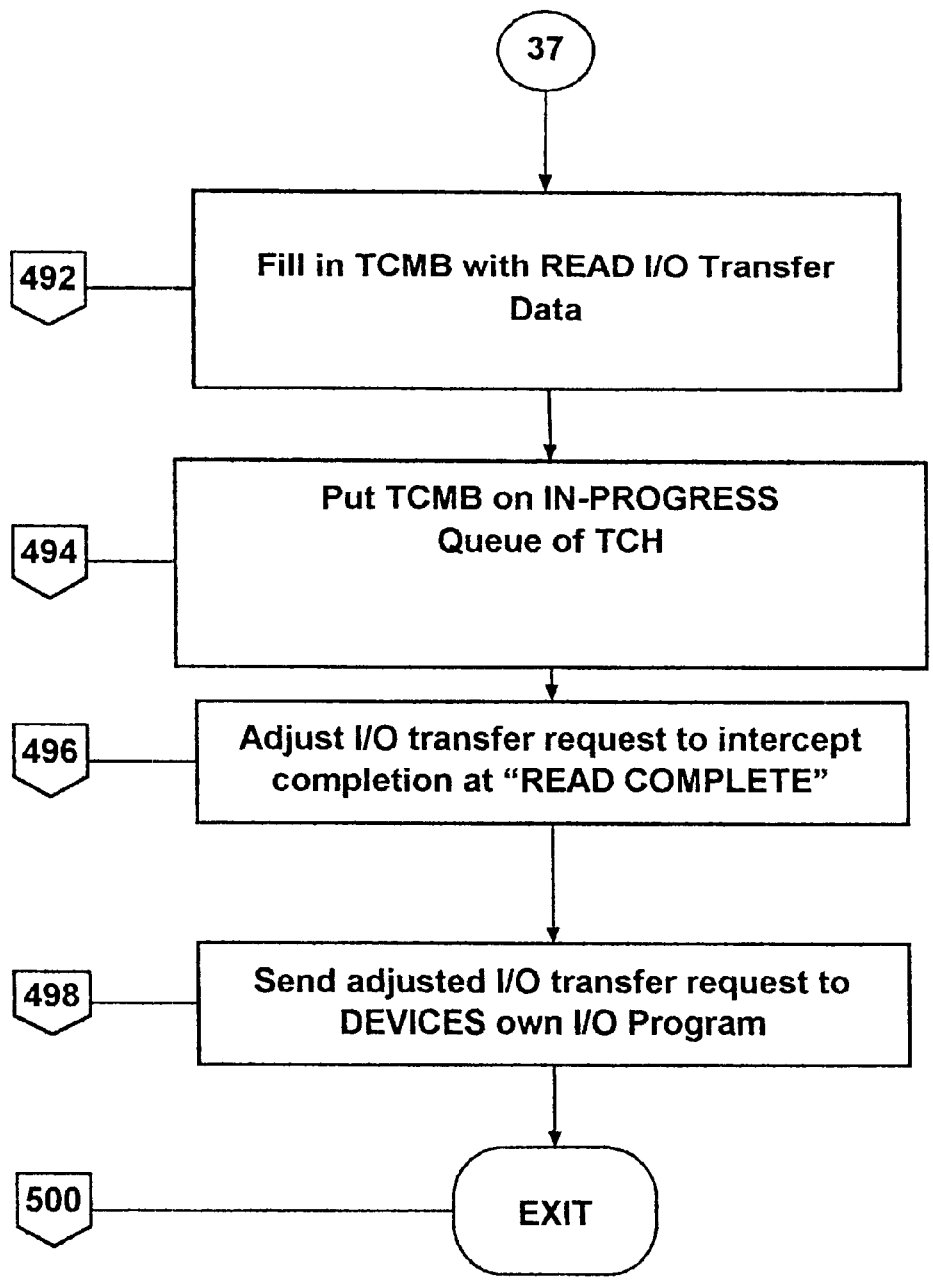
Figure 5H:
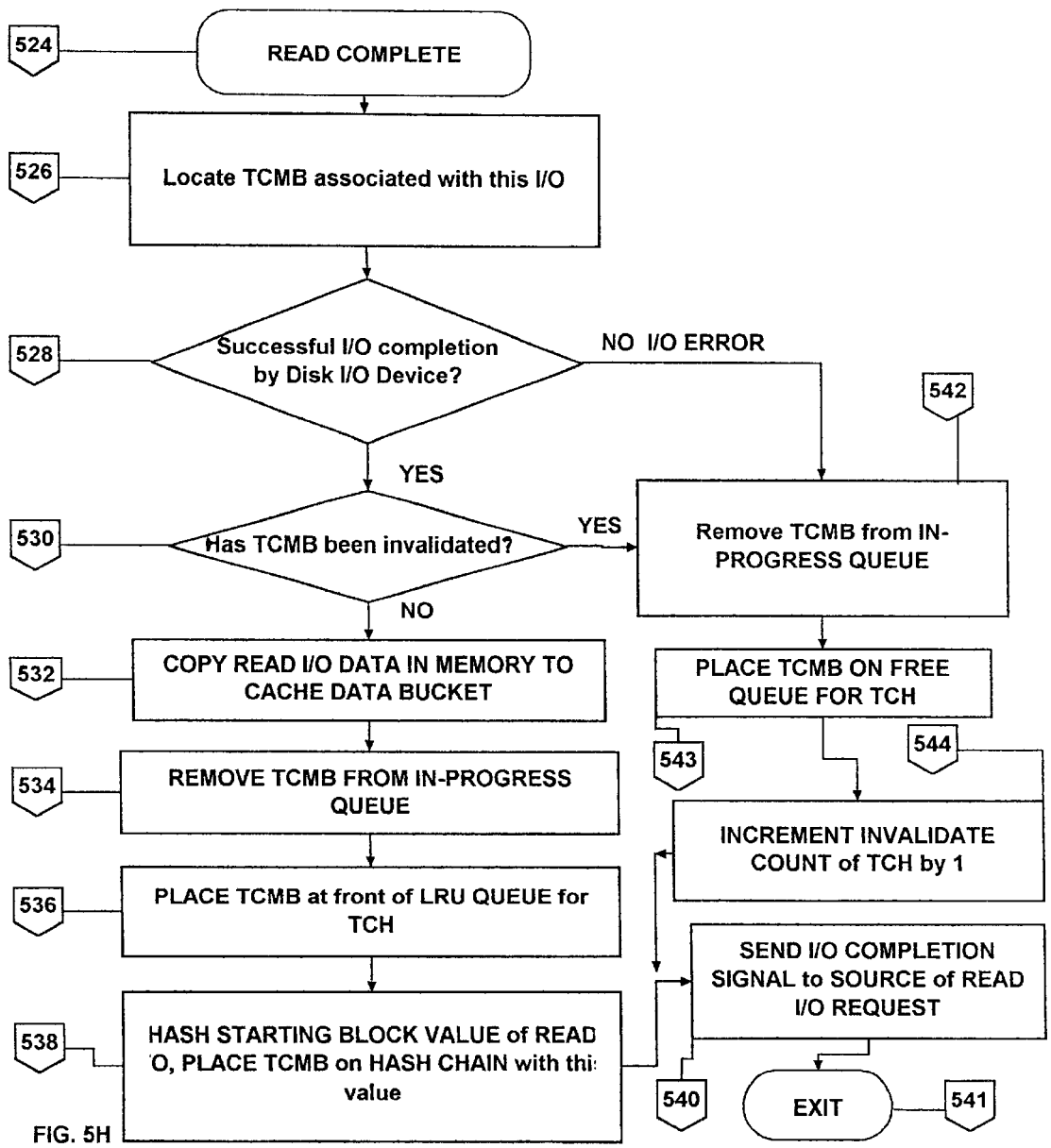
Figure 51:
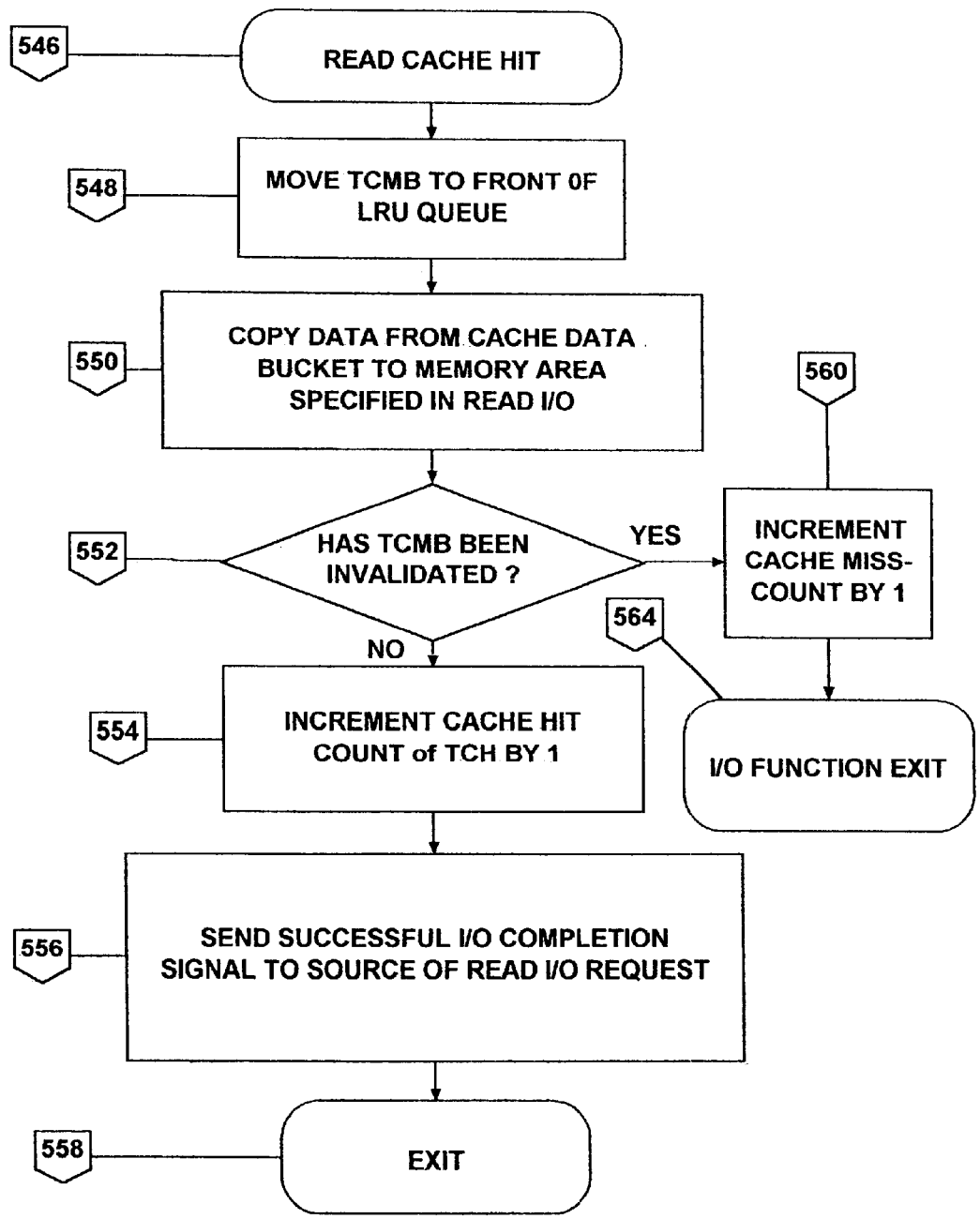
Figure 5J:
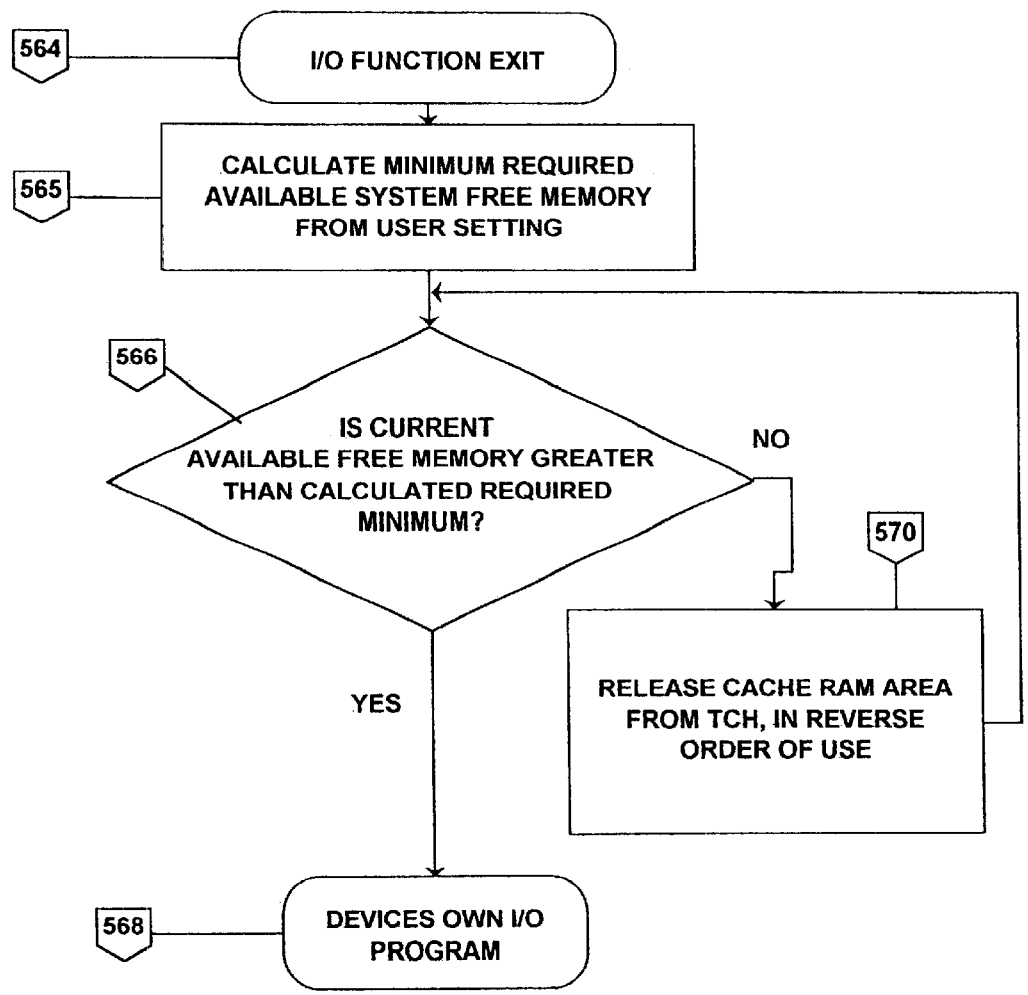
Figure 5K:
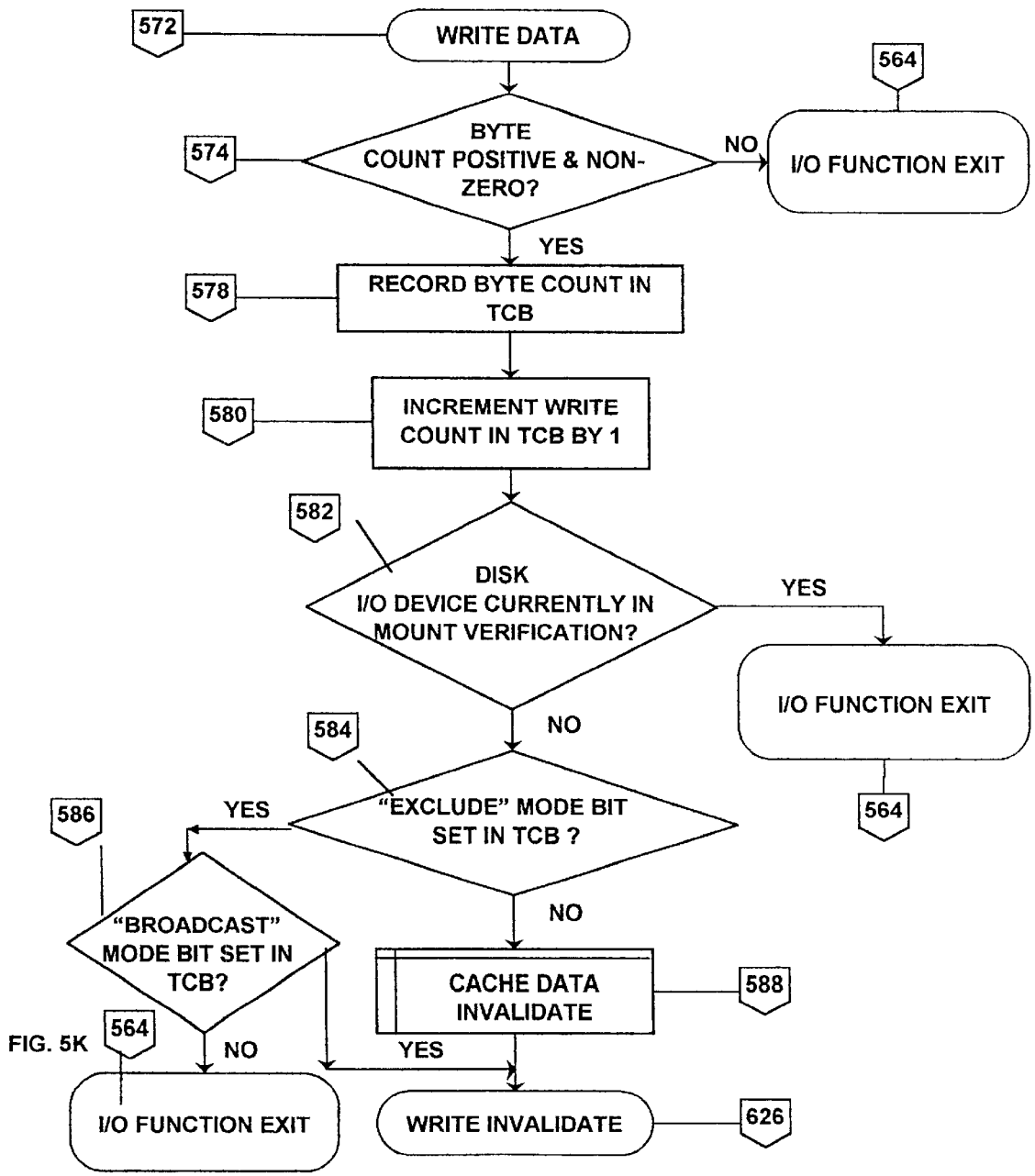
Figure 5L:
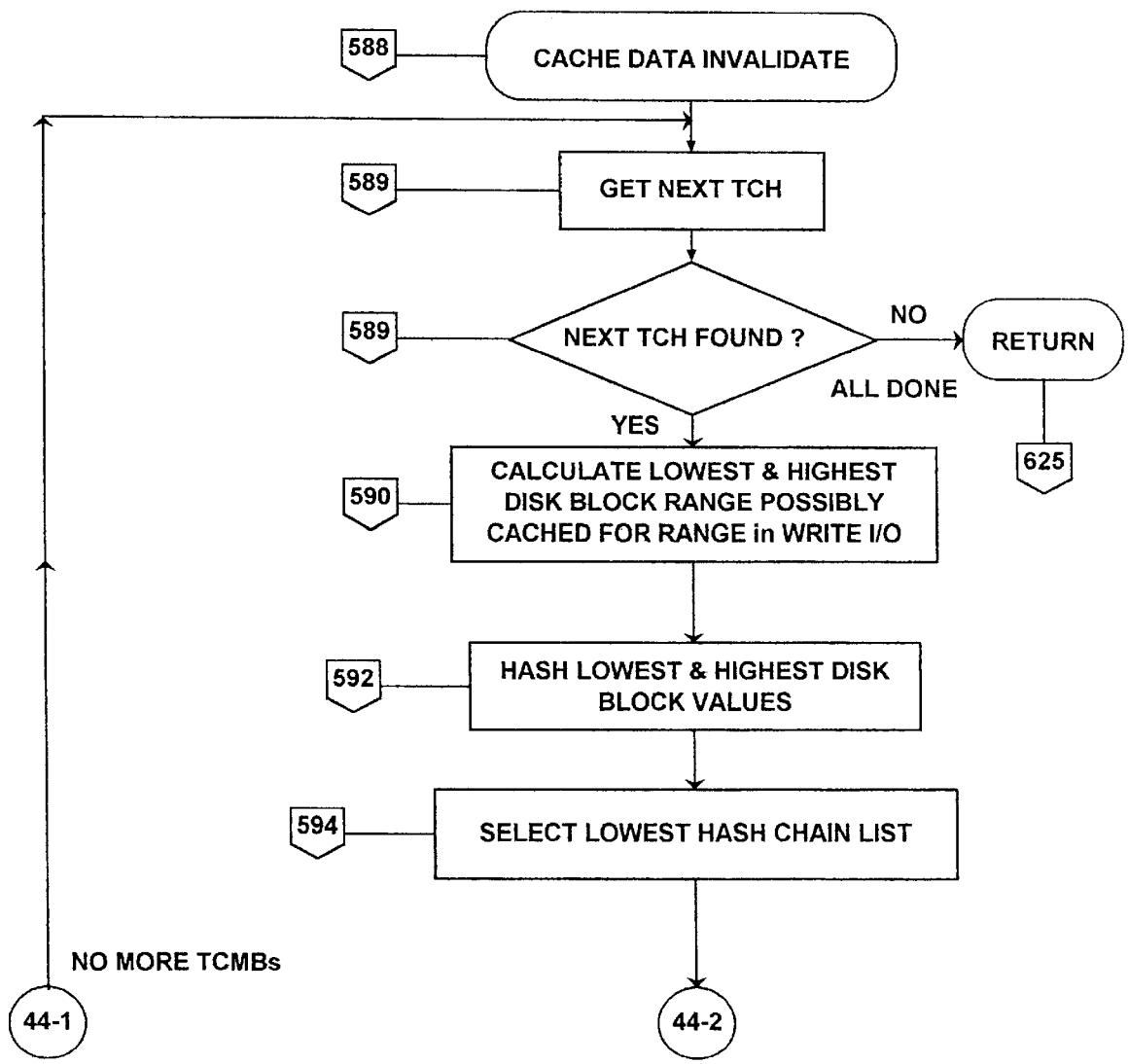
Figures 1, 5L:
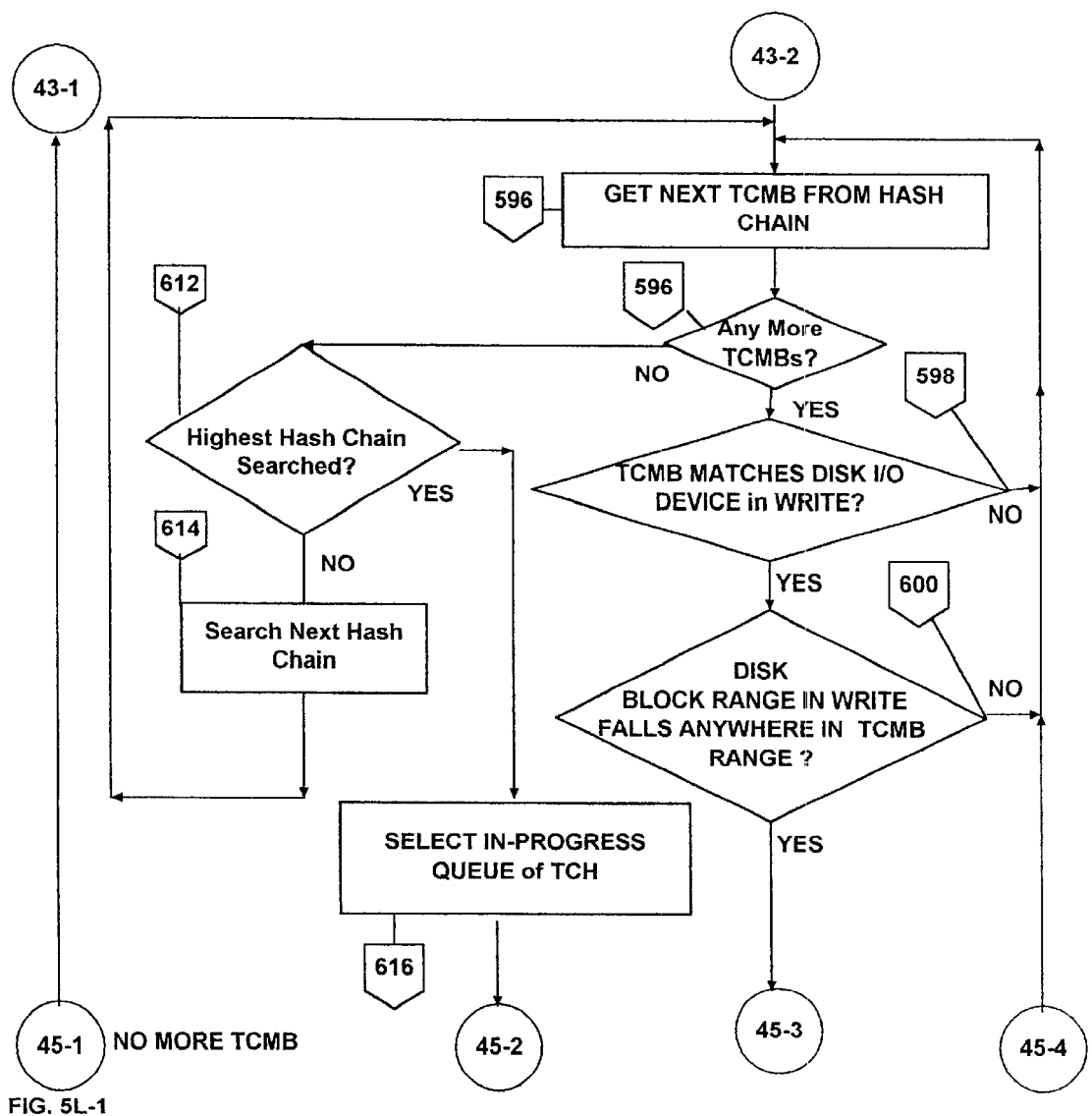
Figures 2, 5L:
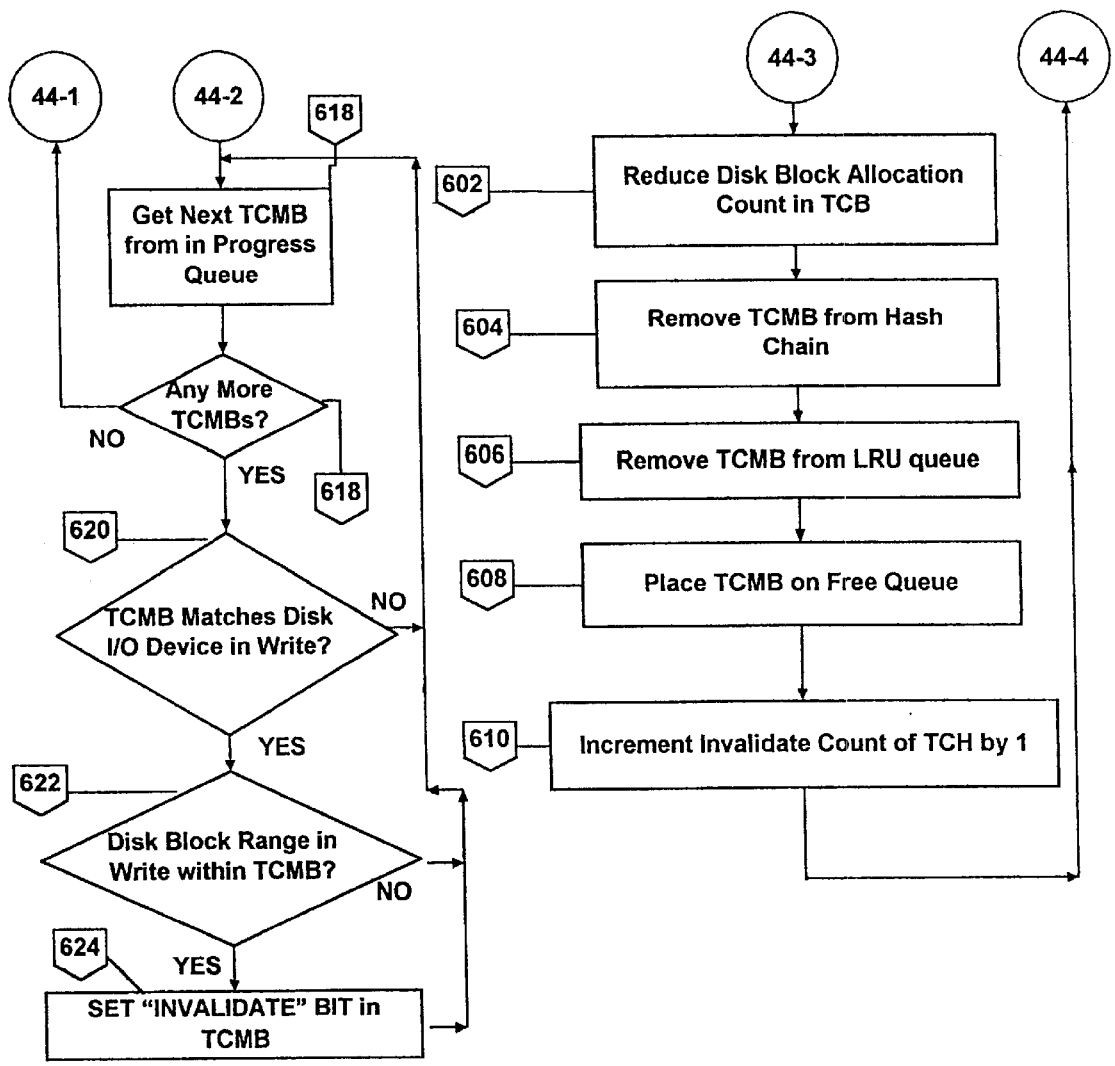
Figure 5P:
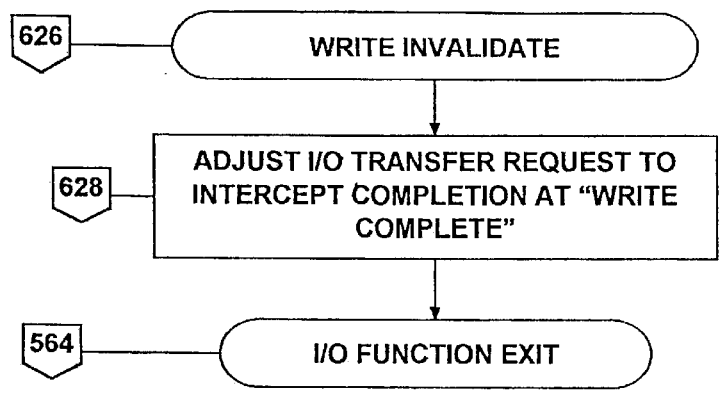

Referring to FIGS. 5A to 5P, program flow performed by the active data caching of a disk I/O device in the cache software of the invention will be described. Whenever any I/O operation is performed on a disk I/O device, that I/O operation will be intercepted by the cache software of the invention and the program will commence running at the "process io" (400) entry point. The disk I/O device interception was enabled for the cache driver (10, FIG. 1B), when the cache software was initially loaded into the OpenVMS system and when a new OpenVMS system joined the systems participating in a VMScluster and VAXcluster, see the description for FIGS. 2A–2D above. The program locates the TCB (16, FIG. 1B) disk control structure for the disk I/O device (402). If the TCB is not found, the program calls "io intercept device" (404) to build a TCB for the device. The program flow for "io intercept device" is not included in the description for the invention. The program flow for "io intercept device" builds a single TCB for a disk I/O device unit, in the same manner as "io intercept global" (64, FIG. 2B) does for all disk I/O device units. The presently preferred embodiment of the invention operates on the OpenVMS system. The OpenVMS system specifies the I/O entry point for an I/O device in the device driver for the controller of the I/O device. The controller of the I/O device can have several I/O device units connected to it, but all these I/O device units share the same I/O entry point for the controller. An I/O device unit is identified by a data structure connected in a list of I/O device unit data structures off a single data structure for the I/O device controller. The program "io intercept global" (64, FIG. 2B), called during initial loading of the cache software of the invention and when a new OpenVMS system joins a VMScluster and VAXcluster, locates all disk I/O device units accessible by the OpenVMS system, building a TCB (16, FIG. 1B) disk control structure for that disk I/O device unit, by looking at all the I/O device unit data structures off all the single data structure for the disk I/O device controllers. OpenVMS systems can implement a storage device architecture, known as Digital Storage Architecture (DSA), along with a communications protocol, known as Mass Storage Control Protocol (MSCP), which dictate that a disk I/O device is allowed to come on-line and available to the OpenVMS system after the OpenVMS system has been loaded and initialised. The software for the DSA and MSCP will cause a new data structure, for this recently available disk I/O device, to be built and connected into the list of other I/O device unit structures off the single data structure for the I/O devices controller. This newly available disk I/O device still shares the same I/O entry point for its controller, in this way the cache software of the invention can intercept an I/O operation for this newly available disk I/O device, but not have a TCB (16, FIG. 1B) disk control structure built for it via "io intercept global" (64, FIG. 2B). Hence the need for the "io intercept device" (404) program within the "process io" (400) program flow. Having located the TCB (402), or having built a new TCB for a newly available disk I/O device (404), the I/O intercept "process io" program flow proceeds.

The program checks whether the disk I/O device, whose I/O operation has been intercepted, is a disk volume shadow set master device (406). If so, the program exits via the "basic statistics" program flow (660, FIG. 5O). Disk volume shadow set master devices are not physical disk I/O device units. Disk volume shadow set master devices are pseudo disk I/O devices generated by an OpenVMS system to bind together a set of physical disk I/O devices forming the disk volume shadow set. Therefore no caching of I/O data is performed by the invention for disk volume shadow set master devices. Any I/O data destined for the disk volume shadow set will be redirected by the software for the disk volume shadow set master device to an appropriate physical disk I/O device, within the disk volume shadow set. The I/O operation intercept "process io" (400) program flow will subsequently intercept the I/O operation to the physical disk I/O device, caching the I/O data for that physical disk I/O device as necessary.

Having determined that the disk I/O device, whose I/O operation has been intercepted, is a physical device (406), the program looks at the current mode of the TCB (16, FIG. 1B) disk control structure for the I/O device (410). If the current mode of the TCB is unknown (412), the program exits via the I/O devices original program for its I/O entry point (414). If the current mode of the TCB is 'statistics only' (416), the program exits via the "basic statistics" program flow (660, FIG. 5O). The mode of 'statistics only' is the mode the TCB is set to when the TCB is initially built and active cache operations have not been started via a user CACHE START command. When active cache operations have been started via a user CACHE START command, all TCB (16, FIG. 1B) disk control structures are set to 'default' mode (202, FIG. 3C). If the current mode of the TCB is 'default' (420), the program exits via the "cache on" program flow (424 FIG. 5B).

Referring now to FIG. 5B, the program flow for "cache on" (424) will be described. The program firstly checks whether this is a process swap I/O operation (426). If so, the program increments by one the count for the number of process swap I/O operations on the OpenVMS system (428). The swap count, not shown in these descriptions of the invention, will affect the total amount of RAM the cache software of the invention is allowed to have for its cached data storage. The program dispatches on the I/O function of the intercepted I/O operation on the disk I/O device (430). The presently preferred embodiment of the invention only supports the OpenVMS I/O functions; 'io_unload', 'io_packack', 'io_readlblk', 'io_readpblk', 'io_writelblk', 'io_writepblk', and 'io_dse'. For all other OpenVMS I/O functions (431) the program exits via the I/O devices original program for its I/O entry point (432). If the OpenVMS I/O function is 'io_unload' (final disk volume dismount operation), or 'io_packack' (initial disk volume mount operation) (433), the program calls (434) the "clear cache data" (350, FIG. 4G) program flow, on return exiting via the I/O devices original program for its I/O entry point (432). If the OpenVMS I/O function is 'io_readlblk' (read logical blocks of disk I/O data), or 'io_readpblk' (read physical blocks of disk I/O data) (435), the program dispatches to the "read data" (440, FIG. 5C) program flow. If the OpenVMS I/O function is 'io_writelblk' (write logical blocks of disk I/O data), or 'io_writepblk' (write physical blocks of disk I/O data), or 'io_dse' (write data security erase pattern) (437), the program dispatches to the "write data" (572, FIG. 5K) program flow.

Referring to FIG. 5C, the "read data" (440) program flow will now be described. The program checks that the byte count for the intercepted read I/O data function is a non-zero positive value (442). If not, the program exits via the "I/O function exit" (564, FIG. 5J) program flow. The program records the positive byte count of the intercepted read I/O data function in the TCB (16, FIG. 1B) disk control structure for the disk I/O device (446). The program increments the read I/O data function count by one in the TCB (448). The byte count of this intercepted read I/O data function is maximised against previous intercepted read I/O data function byte counts for the disk I/O device (450), the maximised value being recorded in the TCB (16, FIG. 1B) disk control structure for the disk I/O device. The above three recorded values form part of the performance monitoring capabilities of the invention. The program checks whether the cache status flag 'disable' is set (452), if so, the program exits via the "I/O function exit" (564, FIG. 5J) program flow. The cache status flag 'disable' indicates that some OpenVMS system in the VMScluster and VAXcluster does not have the cache driver (10, FIG. 1A) of the invention loaded. This normally would indicate that some OpenVMS system is currently joining the VMScluster and VAXcluster and has not yet successfully loaded the cache software of the invention. Alternatively, this would indicate an inconsistent installation of the cache software of the invention. In any case, the cache status flag 'disable' indicates an inconsistent view of the cache for the invention across the VMScluster and VAXcluster, preventing active cache operations (and possible subsequent corruption) of the data contained in a disk I/O device. The program next checks the 'exclude' mode bit in the TCB (16, FIG. 1B) disk control structure for the disk I/O device (454). If this 'exclude' mode bit is set, indicating that the I/O data for the disk I/O device is currently excluded from the cache of the invention, the program exits via the "I/O function exit" (564, FIG. 5J) program flow. The user CACHE DISK command is used to include a disk I/O device into the active cache operations of the invention, by clearing the 'exclude' mode bit in TCB for the disk I/O device (274, FIG. 4C). The program checks whether the disk I/O device is currently subject to mount verification on the OpenVMS system (456), indicating that the OpenVMS system is checking the integrity of the volume mounted in the disk I/O device. If so, the program exits via the "I/O function exit" (564, FIG. 5J) program flow, allowing the read I/O data to come directly from the disk I/O device. The program next checks whether the read I/O data function involves a partial block transfer (458). If so, the program exits via the "I/O function exit" (564, FIG. 5J) program flow. Having carried out the initial checks over the disk I/O device and its intercepted read I/O data transfer, the program can now access the cache of the invention.

The program matches the byte count size of the intercepted read I/O data transfer against the three cache sizes (460), small, medium, or large, attempting to choose which of the three TCH (26, FIG. 1A) cache control structures this read I/O data will be targeted at. If the byte count size of the intercepted read I/O data transfer is larger than the largest of the three caches, the program increments by one (462) the oversize count in the TCB (16, FIG. 1B) disk control structure for the disk I/O device, recording for the performance monitoring capabilities of the invention. The program then exits via the "I/O function exit" (564, FIG. 5J) program flow. Having chosen which of the three caches, small, medium, or large, the byte count size of the intercepted read I/O data fits (460). The program hashes the starting disk block value of the intercepted read I/O data transfer (464) and uses this hash value as a pointer into the disk block value hash table (30, FIG. 1A), to find the start of the hash chain for the TCMB (24, FIG. 1A) bucket control structures with a matching disk block value. Using the cache bucket size against the starting disk block value of the intercepted read I/O data transfer, the program calculates the lowest disk block starting value (466) that could include this intercepted read I/O data transfer starting disk block in its cache bucket. If this lower limit involves searching the previous hash chain list (468), the program starts searching from this previous hash chain (470). The program gets a TCMB (24, FIG. 1A) bucket control structure from the hash chain (472) and checks whether the disk I/O device associated with the TCMB is the same I/O device as in the intercepted read I/O data transfer (474). If not, the program loops to get the next TCMB (472). When the end of the hash chain is reached, the program checks whether the search commenced with the previous hash chain list as to that required from the starting disk block value in the intercepted read I/O data transfer when the lowest disk block limit was calculated (476). If so, the program starts searching at the start of the actual hash chain (478) for the starting disk block value in the intercepted read I/O data transfer and loops to get a TCMB from that hash chain (472). When the program locates a TCMB (24, FIG. 1A) bucket control structure on the hash chain that is associated with the disk I/O device in the intercepted read I/O data transfer (474), the program checks whether the block range limits of the intercepted read I/O data transfer fall within the range of disk blocks in the TCMB cache data bucket (480), if it does then a cache hit is assumed (482) and the "read cache hit" (546, FIG. 5I) program flow is followed. If the disk block range does not match (480), the program loops to get the next TCMB from the hash chain (472). When all the TCMB (24, FIG. 1A) bucket control structures have been searched in the one, or two, hash chains into which the disk block range could fall, with no matching disk block range found for the disk I/O device, a cache miss is assumed (484) and the program follows the "read cache miss" program (486, FIG. 5F) flow.

Referring to FIG. 5F, the "read cache miss" program (486) flow will be described. The cache miss count is incremented by one (488) in the TCH (26, FIG. 1A) cache control structure, for the selected cache, small, medium, or large. This cache miss count in the TCH is used in the performance monitoring by the invention. The program attempts to allocate a TCMB (24, FIG. 1A) bucket control structure, with its corresponding cache data bucket (22, FIG. 1B), from the free queue (27, FIG. 1A) of the selected TCH (26, FIG. 1A) cache control structure (490). If the program obtains a TCMB from the free queue, this TCMB (24, FIG. 1A) bucket control structure is filled in with the I/O transfer specifications from the intercepted read I/O data transfer (492). The TCMB is paced on the in-progress queue (29, FIG. 1A) of the selected TCH (26, FIG. 1A) cache control structure (494). The read data I/O transfer is adjusted (496), so that once again the I/O transfer will be intercepted by the routine "read complete" (524, FIG. 5H) in the cache software of the invention, when the read I/O data has completely transferred from the disk I/O device, into the OpenVMS system memory area originally specified in the intercepted read I/O data transfer. The adjusted read I/O data transfer request is then sent to the disk I/O devices original program for its I/O entry point (498) and the program exits (500).

If the program failed to get a TCMB (24, FIG. 1A) bucket control structure from the free queue (490), the program checks there is sufficient available free memory in the OpenVMS system (502) to allocate a new TCMB and corresponding cache data bucket. If there are sufficient available free memory to allocate more cache space, the program checks whether the cache of the invention has reached its allowable memory limits (504), set by the user when the cache was started with a CACHE START command. If not, the program can allocate a new TCMB (24, FIG. 1A) bucket control structure from the OpenVMS system pool (506) and enough RAM space from the available free memory of OpenVMS to hold the corresponding cache data bucket (508) for the TCMB. The TCMB is associated with the disk I/O device, whose read I/O data transfer was intercepted, and the disk block allocated count within the TCB (16, FIG. 1B) disk control structure, for the disk I/O device, is increased for this intercepted read I/O data transfer (510). The allocated memory count of the selected TCH (26 FIG. 1A) cache control structure, is increased by the equivalent cache bucket size (512), to indicate more RAM allocated to this cache. The program proceeds as if a TCMB (24, FIG. 1A) was obtained from the free queue (492–500).

If there were insufficient available free memory within the OpenVMS system (502), or the cache of the invention has reached its allowable memory limits (504), the program has to try and reuse a current cache bucket for this new intercepted read I/O data transfer (514). The program checks whether the selected TCH (26, FIG. 1A) cache control structure has any RAM space allocated, by checking its allocated memory count (516). If the TCH has no allocated memory space then it cannot have any TCMB (24, FIG. 1A) bucket control structures associated with it, so the program exits via the "I/O function exit" (564, FIG. 5J) program flow. If the TCH (26, FIG. 1A) cache control structure has memory allocated to it, the program removes (518) a TCMB (24, FIG. 1A) bucket control structure from the front of the LRU queue (28, FIG. 1A). The program reduces (520) the disk block allocated count within the TCB (16, FIG. 1B) disk control structure for the disk I/O device, that was originally associated with this TCB. The TCMB (24, FIG. 1A) bucket control structure from the LRU queue is reallocated to the TCB (16, FIG. 1B) disk control structure, for the disk I/O device of this newly intercepted read I/O data transfer (522). The disk block allocated count in the TCB for this disk I/O device incremented for this intercepted read I/O data transfer. The program proceeds as if a TCMB (24, FIG. 1A) was obtained from the free queue (492–500).

Referring to FIG. 5H, after the adjusted read I/O data transfer sent to the disk I/O device completes, the cache software of the invention once again intercepts this I/O completion at its "read complete" (524) program entry point. From the completed read I/O data transfer, the program locates the TCMB (24, FIG. 1A) bucket control structure associated with the originally intercepted read I/O data transfer (526). The program checks whether the I/O completed successfully by the disk I/O device (528). If so, the program verifies that the TCMB (24, FIG. 1A) bucket control structure has not been invalidated (530) whilst it was on the in-progress queue (29, FIG. 1A). If not, the intercepted read I/O data transfer can be cached, so the program copies the read I/O data (532) from the OpenVMS system memory area to which the disk I/O data was transferred into the cache data bucket (22, FIG. 1B) specified in the associated TCMB (24, FIG. 1A) bucket control structure. The TCMB is then removed from the in-progress queue of the selected TCH (26, FIG. 1A) cache control structure (534) and placed at the front of the LRU queue (536). The starting disk block value in the read I/O data transfer is hashed and the TCMB (24, FIG. 1A) bucket control structure is placed at the end of the resultant hash chain, for the selected TCH (26, FIG. 1A) cache control structure (538). The program sends the read I/O data completion onto the originator of the intercepted read I/O data transfer (540), then exits (541). If the I/O completed in error (528), or the TCMB (24, FIG. 1A) bucket control structure was invalidated (530), the read I/O data is not cached. The TCMB is removed from the in-progress queue (542) and placed on the free queue (543) of the selected TCH (26, FIG. 1A) cache control structure. The invalidate count within the TCH is incremented by one (544) for the performance monitoring of the invention. The program sends the read I/O data completion onto the originator of the intercepted read I/O data transfer (540), then exits (541).

Referring back to FIG. 5E, if a TCMB (24, FIG. 1A) bucket control structure, found on a hash chain (472), matches the disk I/O device (474) and the disk block range (480) within the intercepted read I/O data transfer, a cache hit is assumed (482).

Referring now to FIG. 5I, the program follows the "read cache hit" (546) program flow. The matching TCMB is moved to the front of the LRU queue of the selected TCH (26, FIG. 1A) cache control structure (548). The data in the corresponding cache data bucket (22, FIG. 1B) is copied to the OpenVMS system memory area specified in the intercepted read I/O data transfer (550). The program checks whether the TCMB (24, FIG. 1A) bucket control structure has been invalidated (552). If not, the cache hit count of the selected TCH (26, FIG. 1A) cache control structure is incremented by one (554). The read I/O data completion is sent onto the originator of the intercepted read I/O data transfer (556) and the program exits (558). For this cache hit, no disk I/O device data transfer was involved, the requested read I/O data transfer was sent to the requester at memory speed from the RAM area of the cache, illustrating the speed advantage of using the cache of the invention for read I/O data transfers. If the TCMB (24, FIG. 1A) bucket control structure for the cache hit was invalidated (552), the program increments by one the cache miss count (560) in the TCH (26, FIG. 1A) cache control structure. The program exits via the "I/O function exit" (564, FIG. 5J) program flow, with the read I/O data transferring directly from the disk I/O device.

Referring to FIG. 5J, the "I/O function exit" (564) program flow will be described. The "I/O function exit" (564) exit path is followed by the read I/O and write I/O active cache operations of the invention, when the cache has been turned on by a user CACHE START command and the I/O data is not targeted at the cache data held in the RAM (20, FIG. 1B). The program calculates the minimum required OpenVMS system free memory (565) from the set-up information sent to the cache driver (10, FIG. 1A), by the user CACHE START command, and compares this value to the current available free memory on the OpenVMS system (566). If there are more available free memory on the OpenVMS system than the minimum requirements of the cache of the invention, the program exits via the intercepted disk I/O devices original program for its I/O entry point (568). If the value of the current available free memory on the OpenVMS system is less than the minimum requirements of the cache of the invention, the program releases and returns to OpenVMS sufficient cache data buckets (22, FIG. 1B) from the RAM (20, FIG. 1B), until the OpenVMS system available free memory is greater than the requirements of the cache of the invention, or no more RAM (20, FIG. 1B) is owned by the cache of the invention (570). Releasing and returning the cache data buckets (22, FIG. 1B) also entails returning the corresponding TCMB (24, FIG. 1A) bucket control structures to the OpenVMS system pool. The program will choose the cache data buckets (22, FIG. 1B) starting from the cache that has been least used, determined by the cache hit rate in the performance counters of the TCH (26, FIG. 1A) cache control structures, working towards the cache that has most use. The program flow for the release of the cache data buckets and TCMB's is not detailed in these descriptions. Once sufficient cache data buckets (22, FIG. 1B) have been returned to the OpenVMS system, so that there are sufficient available free memory on the OpenVMS system, the program exits via the intercepted disk I/O devices original program for its I/O entry point (568).

Referring to FIG. 5K, the "write data" (572) program flow will now be described. The program checks that the byte count for the intercepted write I/O data function is a non-zero positive value (574). If not, the program exits via the "I/O function exit" (564, FIG. 5J) program flow. The program records the positive byte count of the intercepted write I/O data function in the TCB (16, FIG. 1B) disk control structure for the disk I/O device (578). The program increments the write I/O data function count by one in the TCB (580) The above two recorded values form part of the performance monitoring capabilities of the invention. The program checks whether the intercepted disk I/O device is currently subject to mount verification on the OpenVMS system (582), indicating that the OpenVMS system is checking the integrity of the volume mounted in the disk I/O device. If so, the program exits via the "I/O function exit" (564, FIG. 5J) program flow, allowing the write I/O data to go directly to the disk I/O device. The program next checks the 'exclude' mode bit in the TCB (16, FIG. 1B) disk control structure for the disk I/O device (584). If this 'exclude' mode bit is set, indicating that the I/O data for the disk I/O device is currently excluded from the cache of the invention on this OpenVMS system, the program checks whether other OpenVMS systems in the VMScluster and VAXcluster have the disk I/O device included in their active cache operations of the invention, by checking whether the 'broadcast' mode bit is set in the TCB (586). If no other OpenVMS systems in the VMScluster and VAXcluster have the intercepted disk I/O device included in their active cache operations of the invention, the program exits via the "I/O function exit" (564, FIG. 5J) program flow. If the 'broadcast' mode bit is set in the TCB (16, FIG. 1B) disk control structure for the disk I/O device (586), the "write invalidate" (626, FIG. 5P) program flow is entered.

If the intercepted disk I/O device has been included in the active cache operations of this OpenVMS system (584), the program calls the "cache data invalidate" program (588, FIG. 5L).

Referring to FIG. 5L, the "cache data invalidate" program invalidates the cached data blocks in all three caches, small, medium, and large, that match the disk block range in this intercepted write I/O data transfer for the disk I/O device The program selects a TCH (26, FIG. 1A) cache control structure (589) and calculates the lowest and highest possible cached disk block range, using the starting disk block value and byte count in the intercepted write I/O data transfer against the cache bucket size for the selected cache of the invention (590). The program hashes the lowest and highest disk block range values (592). The program will use these hash values as pointers into the disk block value hash table (30, FIG. 1A) of the TCH (26, FIG. 1A) cache control structure, to find the start of the hash chain for the TCMB (24, FIG. 1A) bucket control structures with matching disk block values. Using the lowest calculated hash pointer the program selects the equivalent hash chain list (594) of TCMB (24, FIG. 1A) bucket control structures in the disk block value hash table (30, FIG. 1A). The program selects a TCMB on the hash chain (596) and checks whether the disk I/O device associated with the TCMB is the same as the disk I/O device in the intercepted write I/O data transfer (598). If not, the program loops to get the next TCMB (24, FIG. 1A) bucket control structure from the hash chain list (596). If this TCMB is associated with the disk I/O device in the intercepted write I/O data transfer, the program checks whether the disk block range in the TCMB falls anywhere within the range of disk blocks in the intercepted write I/O data transfer (600). If not, the program loops to get the next TCMB (596). If any of the disk blocks in the selected TCMB do fall in the range of disk blocks in the intercepted write I/O data transfer, the program reduces the allocated block count in the TCB (16, FIG. 1B) disk control structure for the disk I/O device, by the cache bucket size (602). The program then removes the TCMB (24, FIG. 1A) bucket control structure from the hash chain list (604). The TCMB is removed (606) from the LRU queue (28, FIG. 1A) and inserted (608) on the free queue (27, FIG. 1A) of the selected TCH (26, FIG. 1A) cache control structure. The program increments by one the cache invalidate count of the TCH (610) as part of the performance monitoring of the invention and loops to get the next TCMB (24, FIG. 1A) bucket control structure from the hash chain list (596). Once all the TCMB's in the hash chain has been searched, the program checks whether it has searched all the hash chain lists in the lowest and highest disk block range of the intercepted write I/O data transfer (612). If not, the program selects the next hash chain list to search (614) and loops to get a TCMB (24, FIG. 1A) bucket control structure from that list (596). When all the possible hash chain lists for the range of disk blocks in the intercepted write I/O data transfer have been searched, the program selects (616) the in-progress queue (29, FIG. 1A) of the TCH (26, FIG. 1A) cache control structure to search next. The program selects a TCMB on the in-progress queue (618) and checks whether the disk I/O device associated with the TCMB is the same as the disk I/O device in the intercepted write I/O data transfer (620). If not, the program loops to get the next TCMB (24, FIG. 1A) bucket control structure from the in-progress queue (618). If this TCMB is associated with the disk I/O device in the intercepted write I/O data transfer, the program checks whether the disk block range in the TCMB falls anywhere within the range of disk blocks in the intercepted write I/O data transfer (622). If not, the program loops to get the next TCMB (618) If any of the disk blocks in the selected TCMB do fall in the range of disk blocks in the intercepted write I/O data transfer, the program sets the 'invalidated' bit in the TCMB (624) and loops to get the next TCMB on the in-progress queue (618). When the program has searched all TCMB (24, FIG. 1A) bucket control structures on the in-progress queue, the program loops (589) to get the next TCH (26, FIG. 1A) cache control structure. When the program has dealt with all three TCH's, the "cache data invalidate" program returns to its caller (625).

Referring back to FIG. 5K, on return from the "cache data invalidate" program, the "write invalidate" (626, FIG. 5P) program flow is entered.

Figure 5M:
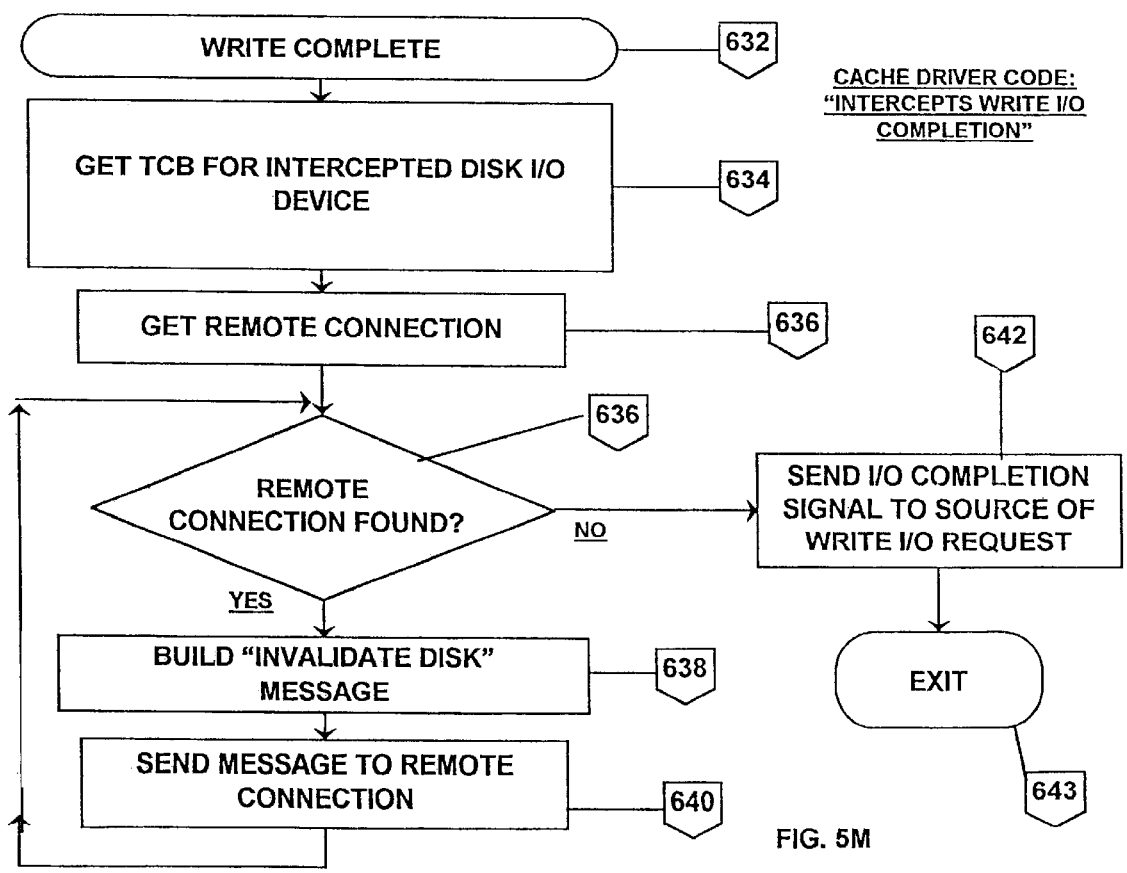

Referring now to FIGS. 5M and 5P, the "write invalidate" (626) program flow will be described. The intercepted write I/O data transfer is altered to once again intercept the I/O transfer when it completes (628). The cache software of the invention will be called at its "write complete" (632) entry point when the write I/O data transfer completes. The program exits via the "I/O function exit" (564, FIG. 5J) program flow, with the adjusted write I/O data transfer being sent to the disk I/O device. When the write I/O data transfer has been completed by the disk I/O device, the cache software of the invention intercepts the I/O completion and is called at its "write complete" (632) entry point. The program gets the TCB (16, FIG. 1B) disk control structure for the intercepted disk I/O device (634). The program will check if there are any remote connections to cache drivers (10, FIG. 1A) in other OpenVMS systems of a VMScluster and VAXcluster (636). If there is a remote connection, the program will build an "invalidate disk" communications message (638) and send this message to the remote OpenVMS system (640), specified in the remote connection. The program will then loop to see if there are any more remote connections (636), sending a communications message to each remote connection. If there were no remote connections originally, or the "invalidate disk" communications message has been sent to each remote connection present, the program sends the write I/O data completion onto the originator of the intercepted write I/O data transfer (642) The program then exits (643).

Figure 5N:
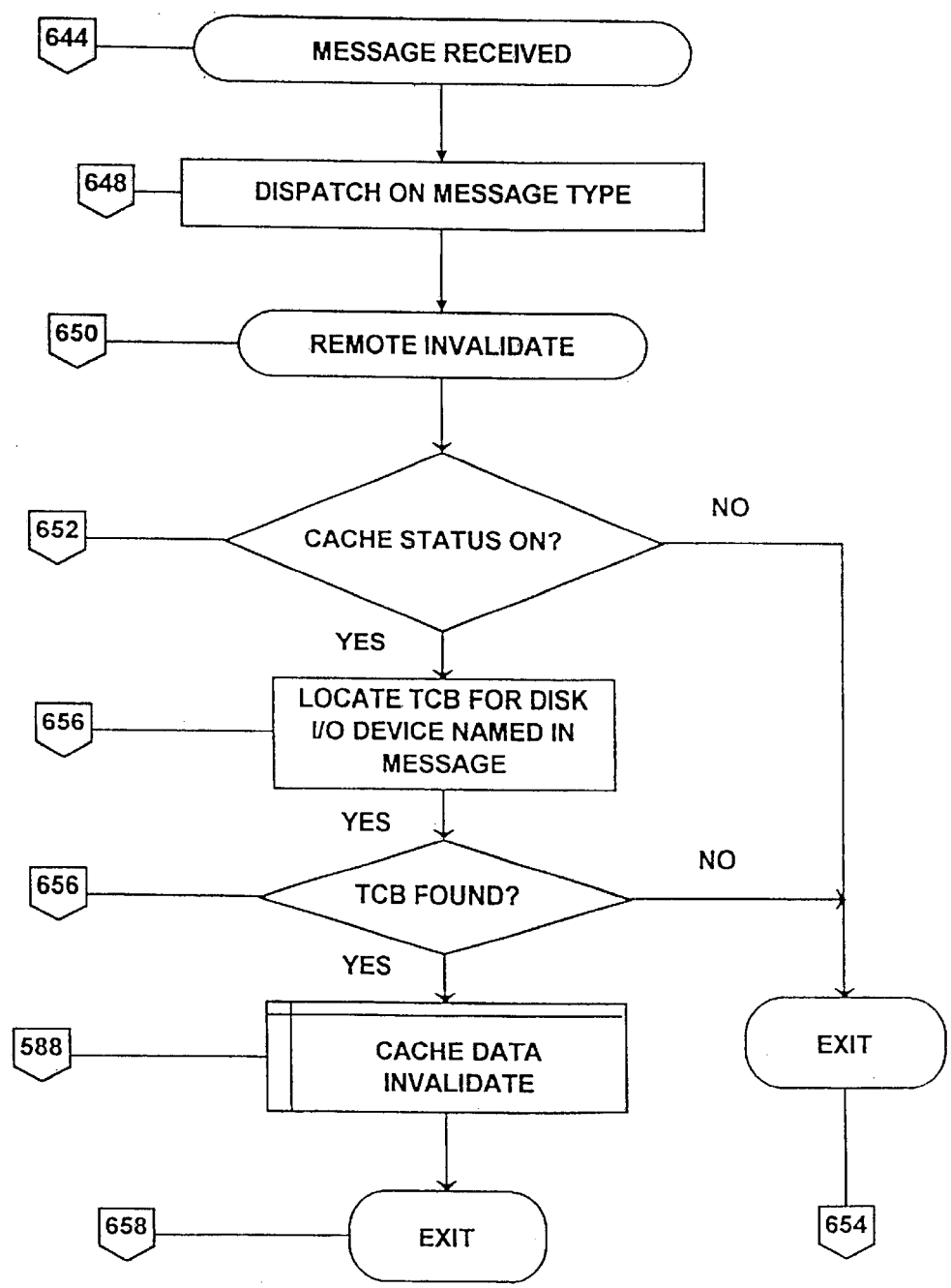
Figure 50:
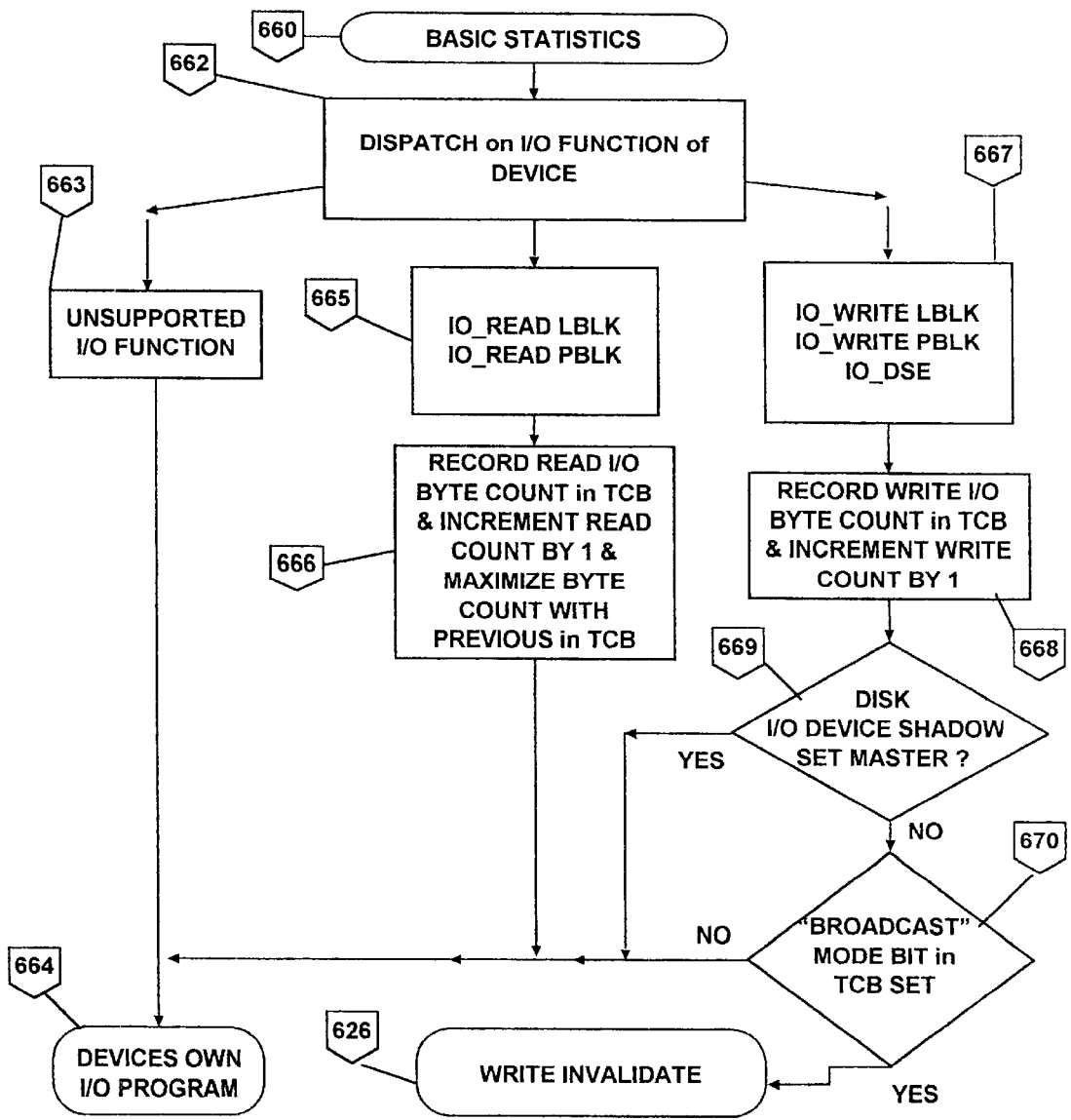

Referring to FIG. 5N, for all received remote communications message the cache software of the invention will be called at the "message receive" (644) entry point. The program gets the message type from the communications message packet (648) and for an 'invalidate disk' message dispatches to the "remote invalidate" program flow (650). The program will check if the cache of the invention has been started (652) on this OpenVMS system, by a user CACHE START command. If not, the program exits (654) ignoring this message. If the cache of the invention has been started, the program attempts to locate a TCB (16, FIG. 1B) disk control structure for the disk I/O device named in the 'invalidate disk' communications message (656). If this OpenVMS system does not have a TCB for the disk I/O device, the program exits (654) ignoring the message. The program then calls the "cache data invalidate" program (588, FIG. 5L), described above and on return exits (658).

Referring back to FIG. 5A, if the intercepted I/O operation was to a disk volume shadow set master or the cache has not been started on the OpenVMS system via a CACHE START command, the active cache operations of the invention calls the "basic statistics" (660, FIG. 5O) program flow.

Referring to FIG. 5O, the "basic statistics" (660) program flow will now be described. The program dispatches on the I/O function of the intercepted I/O operation on the disk I/O device (662). The presently preferred embodiment of the invention only supports the OpenVMS I/O functions; 'io_readlblk', 'io_readpblk', 'io_writelblk', 'io_writepblk', and 'io_dse'. For all other OpenVMS I/O functions (663) the program exits via the I/O devices original program for its I/O entry point (664). For intercepted read I/O data operations, 'io_readlblk' and 'io_readpblk' (665), the program records the performance monitoring read I/O data statistics (666) into the TCB (16, FIG. 1B) disk control structure for the disk I/O device. The program then exits via the I/O devices original program for its I/O entry point (664). For intercepted write I/O data operations, 'io_writelblk', 'io_writepblk', and 'io_dse' (667), the program records the performance monitoring write I/O data statistics (668) into the TCB (16, FIG. 1B) disk control structure for the disk I/O device. The program checks whether the intercepted disk I/O device is a disk volume shadow set master (669). If so, the program exits via the I/O devices original program for its I/O entry point (664), having no cached data for these pseudo devices. If the intercepted disk I/O device is some physical device, the program checks whether the 'broadcast' mode bit is set in the TCB (670). If not, the program exits via the I/O devices original program for its I/O entry point (664). If the 'broadcast' mode bit is set in the TCB for the disk I/O device, some other OpenVMS system in the VMScluster and VAXcluster has this disk I/O device included in their active cache operations, the "write invalidate" (626, FIG. 5P) program flow is then entered.

This now completes the description for active cache operations by the invention.

REFERENCE MATERIAL

The present preferred embodiment of the invention operates under the OpenVMS system. The help in an understanding of the I/O processes in this cache application the reader may find the following OpenVMS documentation useful.

The contents of the following books are hereby incorporated by reference herein.

Title: VAX/VMS Internals and Data Structures: version 5.2
Authors: Ruth E. Goldenberg, Lawrence J. Kenah, with the assistance of Denise E. Dumas
Publisher: Digital Press
ISBN: 1-55558-059-9
Title: VMS File System Internals
Author: Kirby McCoy
Publisher: Digital Press
ISBN: 1-55558-056-4

Open VMS Manuals:

The following manuals are contained in the various OpenVMS Manual documentation sets and kits available from Digital Equipment Corporation.

The following two manuals are contained in the Open VMS Optional Documentation kit:

Title: OpenVMS VAX Device Support Manual
Order No.: AA-PWC8A-TE
Title: OpenVMS VAX Device Support Reference Manual
Order No.: AA-PWC9A-TE The following manual is contained in the Advanced System Management kit within the Open VMS Standard Documentation set:

Title: VMScluster Systems for Open VMS
Order No.: AA-PV5WA-TK

The following two manuals are contained in the Open VMS Systems Integrated Products documentation:

Title: VAX Volume Shadowing Manual
Order No.: AA-LB18A-TE
Title: Volume Shadowing for Open VMS
Order No.: AA-PVXMA-TE The above OpenVMS manuals can be obtained from Digital Equipment Corporation at the following address:

Digital Equipment Corporation
P.O. Box CS2008
Nashua, N.H. 03061
USA

All of the above listed OpenVMS manuals are hereby incorporated by reference herein.

What is claimed is:

1. A method for coherently caching I/O devices available for shared access on a network comprising:

providing a plurality of computers on the network each with cache software;

disabling cache operations upon finding that a new computer joined the network; and enabling caching operations at each computer after each computer has connections in place with the cache software of every other computer on the network.

2. The method of claim 1 further comprising creating a cache in RAM of each of the plurality of computers, each cache being associated with one of the I/O devices connected to the network.

3. The method of claim 1 further comprising listening on the network for a request from a new computer to join the network.

4. The method of claim 1 further comprising comparing a count of the number of computers on the network with a count of the number of connections between the cache software on one of the computers and the cache software of other computers on the network to determine whether connections are in place with the cache software of every other computer on the network.

* * * * *